US011627628B2

(12) United States Patent
Li et al.

(10) Patent No.: US 11,627,628 B2
(45) Date of Patent: Apr. 11, 2023

(54) PACKET TRANSMISSION METHOD, APPARATUS, AND SYSTEM

(71) Applicant: Huawei Technologies Co., Ltd., Shenzhen (CN)

(72) Inventors: Yongcui Li, Beijing (CN); Fangyuan Zhu, Beijing (CN); Yan Li, Beijing (CN); Hui Ni, Beijing (CN); Yang Xin, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 177 days.

(21) Appl. No.: 17/033,070

(22) Filed: Sep. 25, 2020

(65) Prior Publication Data
US 2021/0014925 A1 Jan. 14, 2021

Related U.S. Application Data

(63) Continuation of application No. PCT/CN2019/078176, filed on Mar. 14, 2019.

(30) Foreign Application Priority Data

Apr. 3, 2018 (CN) .......................... 201810291412.3
May 18, 2018 (CN) .......................... 201810483377.5
Nov. 20, 2018 (CN) .......................... 201811386638.8

(51) Int. Cl.
H04W 76/22 (2018.01)
H04L 67/14 (2022.01)
(Continued)

(52) U.S. Cl.
CPC ............ H04W 76/22 (2018.02); H04L 67/14 (2013.01); H04W 28/0268 (2013.01); H04W 72/042 (2013.01)

(58) Field of Classification Search
CPC ............ H04W 76/22; H04W 28/0268; H04W 72/042; H04L 67/14
(Continued)

(56) References Cited

U.S. PATENT DOCUMENTS

| 8,134,963 B1 | 3/2012 | Chen et al. |
| 2016/0242080 A1 | 8/2016 | Vikberg et al. |
| 2017/0366618 A1 | 12/2017 | Vrzic et al. |
| 2018/0007604 A1 | 1/2018 | Pillay-Esnault |

(Continued)

FOREIGN PATENT DOCUMENTS

| CN | 104602256 A | 5/2015 |
| CN | 105704197 A | 6/2016 |

(Continued)

OTHER PUBLICATIONS

Samsung, "Bearer management on supporting PDCP duplication in CA case," 3GPP TSG-RAN WG3 Meeting #97, Berlin, Germany, Aug. 21-25, 2017, R3-172968, 4 pages.

(Continued)

Primary Examiner — Obaidul Huq
(74) Attorney, Agent, or Firm — Conley Rose, P.C.

(57) ABSTRACT

A packet transmission method, including receiving, by a session management function network element, first access network tunnel information and second access network tunnel information that correspond to a first service, and sending a downlink forwarding rule to a user plane function network element, where the downlink forwarding rule includes the first access network tunnel information and the second access network tunnel information, and the downlink forwarding rule indicates the user plane function network element to replicate a received downlink packet of the first service, and send downlink packets of the first service through two paths respectively corresponding to the first (Continued)

access network tunnel information and the second access network tunnel information.

28 Claims, 21 Drawing Sheets

(51) Int. Cl.
  *H04W 28/02* (2009.01)
  *H04W 72/04* (2023.01)
(58) Field of Classification Search
  USPC .................................................. 370/229, 230
  See application file for complete search history.

(56) References Cited

U.S. PATENT DOCUMENTS

| | | | |
|---|---|---|---|
| 2018/0035339 A1 | 2/2018 | Mitsui et al. | |
| 2019/0098682 A1* | 3/2019 | Park | H04W 28/0257 |
| 2019/0268815 A1* | 8/2019 | Zhu | H04W 36/0066 |

FOREIGN PATENT DOCUMENTS

| | | | |
|---|---|---|---|
| CN | 106031237 A | 10/2016 | |
| CN | 106034089 A | 10/2016 | |
| WO | 2007140107 A2 | 12/2007 | |
| WO | 2016163544 A1 | 10/2016 | |

OTHER PUBLICATIONS

3GPP TS 23.501 V15.1 0, "3rd Generation Partnership Project; Technical Specification Group Services and System Aspects; System Architecture for the 5G System; Stage 2 (Release 15)," Mar. 2018, 201 pages.

3GPP TR 38.913 V14.3.0, "3rd Generation Partnership Project; Technical Specification Group Radio Access Network; Study on Scenarios and Requirements for Next Generation Access Technologies (Release 14)," Jun. 2017, 39 pages.

3GPP TS 23.502 V15.1.0, "3rd Generation Partnership Project; Technical Specification Group Services and System Aspects; Procedures for the 5G System; Stage 2 (Release 15)," Mar. 2018, 285 pages.

3GPP TS 29.244 V15.1.0 (Mar. 2018), "3rd Generation Partnership Project; Technical Specification Group Core Network and Terminals; Interface between the Control Plane and the User Plane Nodes; Stage 3 (Release 15)," 170 pages.

3GPP TS 38.300 V15.1.0 (Mar. 2018), "3rd Generation Partnership Project; Technical Specification Group Radio Access Network; NR; NR and NG-RAN Overall Description; Stage 2 (Release 15)," 71 pages.

3GPP TR 23.799 V14.0.0 (Dec. 2016), "3rd Generation Partnership Project; Technical Specification Group Services and System Aspects; Study on Architecture for Next Generation System (Release 14)," 522 pages.

* cited by examiner

PACKET TRANSMISSION METHOD, APPARATUS, AND SYSTEM

CROSS-REFERENCE TO RELATED APPLICATIONS

This application is a continuation of International Patent Application No. PCT/CN2019/078176, filed on Mar. 14, 2019, which claims priority to Chinese Patent Application No. 201810291412.3, filed on Apr. 3, 2018 and Chinese Patent Application No. 201810483377.5, filed on May 18, 2018 and Chinese Patent Application No. 201811386638.8, filed on Nov. 20, 2018. The disclosures of the aforementioned applications are hereby incorporated by reference in their entireties.

TECHNICAL FIELD

The present disclosure relates to the field of communications technologies, and in particular, to a packet transmission method, apparatus, and system.

BACKGROUND

A dual connectivity mechanism is proposed in a 5th generation (5G) communications system. A communications system in the dual connectivity mechanism includes two radio access network (RAN) devices a master RAN (M-RAN) and a secondary RAN (S-RAN).

As shown in FIG. 1, in the dual connectivity mechanism, there are two paths for transmitting an uplink packet/a downlink packet, and one of the path passes through (1) user equipment (UE), an M-RAN, a user plane function (UPF) network element, and a data network (DN), and the other path passes through (2) the UE, an S-RAN, the UPF, and the DN.

The transmission path is described using a downlink packet as an example. When receiving a downlink packet sent by the DN, the UPF network element sends the downlink packet based on a packet characteristic. For example, a packet that meets a specific characteristic is sent to the UE though the M-RAN, and a packet that meets another characteristic is sent to the UE though the S-RAN. That is, different packets are sent through the two transmission paths.

With development of 5G, ultra-reliable low-latency communication (URLLC) scenarios, mainly including services, such as unmanned driving and industrial automation, that require a low-latency and high-reliable connection are defined in a 5G network architecture. Because most of the foregoing URLLC scenarios are services related to life safety or production safety, no error is allowed. In a URLLC scenario, how to improve reliability of packet transmission through dual transmission paths in a dual connectivity mechanism becomes a problem that urgently needs to be resolved.

SUMMARY

Embodiments of the present disclosure provide a packet transmission method, apparatus, and system.

According to a first aspect, an embodiment of this application provides a transmission control method. The method includes receiving, by a session management function (SMF) network element, first access network tunnel information and second access network tunnel information that correspond to a first service, and sending, by the SMF network element, a downlink forwarding rule to a UPF network element, where the downlink forwarding rule includes the first access network tunnel information and the second access network tunnel information, and indicates the UPF network element to replicate a received downlink packet of the first service, and send downlink packets of the first service through two paths respectively corresponding to the first access network tunnel information and the second access network tunnel information. For example, in a dual connectivity scenario, the two paths may be a first path between the UPF network element and a master base station, and a second path between the UPF network element and a secondary base station. In a single connectivity scenario, the two paths may be a first path and a second path between the UPF network element and a base station.

According to the foregoing method, for a specific first service (for example, a URLLC service requiring high reliability), the SMF network element sends, to the UPF network element, the downlink forwarding rule including the first access network tunnel information and the second access network tunnel information such that after subsequently receiving a downlink packet of the first service, the UPF network element replicates the downlink packet of the first service, and sends downlink packets of the first service through the two paths respectively corresponding to the first access network tunnel information and the second access network tunnel information. In this way, reliability of packet transmission of the first service is improved.

In a possible design, if the first service is at a service flow granularity, the downlink forwarding rule further includes a service flow identifier of the first service and a session identifier, or if the first service is at a session granularity, the downlink forwarding rule further includes a session identifier of the first service. Therefore, for services at different granularities, downlink forwarding rules for corresponding granularities may be provided such that the UPF network element can implement more accurate and efficient packet transmission.

In a possible design, the method further includes sending, by the SMF network element, indication information to a base station, where the indication information triggers determining of the first access network tunnel information and the second access network tunnel information. In other words, after receiving the indication information, the base station learns that the first access network tunnel information and the second access network tunnel information need to be determined. For example, the indication information may include at least one of the following a quality of service (QoS) parameter, slice identification information, a DN name, and first core network tunnel information and second core network tunnel information.

In a possible design, the method further includes sending, by the SMF network element, an uplink forwarding rule to the base station, where the uplink forwarding rule includes the first core network tunnel information and the second core network tunnel information, and the uplink forwarding rule indicates the base station to replicate a received uplink packet of the first service, and send uplink packets of the first service to the UPF network element through two paths respectively corresponding to the first core network tunnel information and the second core network tunnel information. The base station herein is a base station in a single connectivity scenario.

Similarly, if the first service is at the service flow granularity, the uplink forwarding rule further includes the service flow identifier of the first service and the session identifier, or if the first service is at the session granularity, the uplink forwarding rule further includes the session identifier of the first service.

In a possible design, the downlink packets of the first service that are sent through the two paths respectively corresponding to the first access network tunnel information and the second access network tunnel information include a first downlink packet and a second downlink packet, where the first downlink packet and the second downlink packet have a same sequence number, the first downlink packet further includes a first service flow identifier, and the second downlink packet further includes a second service flow identifier.

In a possible design, the method further includes allocating, by the SMF network element, the first service flow identifier and the second service flow identifier to the first service, and sending the first service flow identifier and the second service flow identifier to UE.

In a possible design, the method further includes sending, by the SMF network element, an uplink forwarding rule to the UPF network element, where the uplink forwarding rule indicates the UPF network element to deduplicate two uplink packets that have a same sequence number and that respectively have the first service flow identifier and the second service flow identifier.

In a possible design, the method further includes sending, by the SMF network element, indication information to the UE using a non-access stratum (NAS) message, where the indication information indicates the UE to replicate an uplink packet to obtain a first uplink packet and a second uplink packet, and send the first uplink packet and the second uplink packet over different radio bearers, where the first uplink packet and the second uplink packet have a same sequence number. For example, the first uplink packet corresponds to the first service flow identifier, and the second uplink packet corresponds to the second service flow identifier.

According to a second aspect, an embodiment of this application provides a packet transmission method. The method includes determining, by a base station, first access network tunnel information and second access network tunnel information that correspond to a first service, and sending, by the base station, the first access network tunnel information and the second access network tunnel information to a SMF network element, where the first access network tunnel information and the second access network tunnel information are usable for determination of a downlink forwarding rule, and the downlink forwarding rule indicates a UPF network element to replicate a received downlink packet of the first service, and send downlink packets of the first service through two paths respectively corresponding to the first access network tunnel information and the second access network tunnel information. For example, in a dual connectivity scenario, the two paths may be a first path between the UPF network element and a master base station, and a second path between the UPF network element and a secondary base station. The base station is the master base station. In a single connectivity scenario, the two paths may be a first path and a second path between the UPF network element and the base station.

According to the foregoing method, the base station sends the first access network tunnel information and the second access network tunnel information to the SMF network element. For a specific first service (for example, a URLLC service requiring high reliability), the SMF network element sends, to the UPF network element, the downlink forwarding rule including the first access network tunnel information and the second access network tunnel information such that after subsequently receiving a downlink packet of the first service, the UPF network element replicates the downlink packet of the first service, and sends downlink packets of the first service through the two paths respectively corresponding to the first access network tunnel information and the second access network tunnel information. In this way, reliability of packet transmission of the first service is improved.

In a possible design, if the first service is at a service flow granularity, the downlink forwarding rule further includes a service flow identifier of the first service and a session identifier, or if the first service is at a session granularity, the downlink forwarding rule further includes a session identifier of the first service. Therefore, for services at different granularities, downlink forwarding rules for corresponding granularities may be provided such that the UPF network element can implement more accurate and efficient packet transmission.

In a possible design, the method further includes receiving, by the base station, indication information from the SMF network element. Correspondingly, the determining, by a base station, first access network tunnel information and second access network tunnel information that correspond to a first service includes determining, by the base station, the first access network tunnel information and the second access network tunnel information based on the indication information. For example, the indication information may include at least one of the following a QoS parameter, slice identification information, a DN name, and first core network tunnel information and second core network tunnel information.

In a possible design, the method further includes receiving, by the base station, an uplink forwarding rule from the SMF network element, where the uplink forwarding rule includes the first core network tunnel information and the second core network tunnel information, and replicating, by the base station, a received uplink packet of the first service according to the uplink forwarding rule, and sending uplink packets of the first service to the UPF network element through two paths respectively corresponding to the first core network tunnel information and the second core network tunnel information. The base station herein is a base station in a single connectivity scenario.

Similarly, if the first service is at the service flow granularity, the uplink forwarding rule further includes the service flow identifier of the first service and the session identifier, or if the first service is at the session granularity, the uplink forwarding rule further includes the session identifier of the first service.

In a possible design, the method further includes indicating, by the base station, UE to add a service flow identifier to a first uplink packet.

In a possible design, the method further includes, when the base station determines to transmit a packet in a dual connectivity manner, indicating, by the base station, the UE to generate two second uplink packets, where the two second uplink packets have a same sequence number and a same service flow identifier.

In a possible design, the method further includes indicating, by the base station, the UE to deduplicate received downlink packets that have a same sequence number and a same service flow identifier. For example, in a dual connectivity (or dual base station) downlink scenario, the base station indicates the UE to deduplicate received downlink packets that have a same sequence number and a same service flow identifier.

In a possible design, the method further includes receiving, by the base station, the downlink packets of the first service through the two paths respectively corresponding to the first access network tunnel information and the second access network tunnel information, and deduplicating downlink packets that have the same sequence number and the same service flow identifier. For example, in a single connectivity (or single base station) downlink scenario, the base station deduplicates downlink packets that have a same sequence number and a same service flow identifier.

In a possible design, the method further includes sending, by the base station, indication information to the UE using an access stratum (AS) message, where the indication information indicates the UE to replicate an uplink packet to obtain the first uplink packet and the second uplink packet, and send the first uplink packet and the second uplink packet over different radio bearers.

According to a third aspect, an embodiment of this application provides a packet transmission method. The method includes obtaining, by a base station, a first indication, and indicating, according to the first indication, UE to add a service flow identifier to a first uplink packet, where the first indication includes capability information or indication information that is from a session management network element. Therefore, for the UE, a same protocol stack format is used for a single connectivity manner and a dual connectivity manner. After the UE is subsequently switched to the dual connectivity manner, the UE may directly perform processing based on the protocol stack format, to avoid complex operations and signaling exchanges, and reduce a latency, thereby improving user experience.

In a possible design, the indication information indicates the base station to indicate the UE to add the service flow identifier to an uplink packet of a first session or an uplink packet of a first service flow of a first session.

In a possible design, when the first indication includes the capability information, the indicating, by the base station according to the first indication, UE to add a service flow identifier to a first uplink packet includes, when the capability information meets a first condition, indicating, by the base station, the UE to add the service flow identifier to the first uplink packet, where the first condition includes at least one of the following the capability information indicates that the base station has a capability of transmitting or receiving a packet in the dual connectivity manner, the capability information indicates that a neighboring base station of the base station has the capability of transmitting or receiving a packet in the dual connectivity manner, and the capability information indicates that another base station having the capability of transmitting or receiving a packet in the dual connectivity manner is deployed in a slice associated with the base station.

In a possible design, the method further includes, when the base station determines to transmit a packet in the dual connectivity manner, indicating, by the base station, the UE to generate two second uplink packets, where the two second uplink packets have a same sequence number and a same service flow identifier.

In a possible design, the method further includes indicating, by the base station, the UE to deduplicate received downlink packets that have a same sequence number and a same service flow identifier. For example, in a dual connectivity (or dual base station) downlink scenario, the base station indicates the UE to deduplicate received downlink packets that have a same sequence number and a same service flow identifier.

In a possible design, the method further includes receiving, by the base station, downlink packets of a first service through the two paths respectively corresponding to the first access network tunnel information and the second access network tunnel information, and deduplicating downlink packets that have a same sequence number and a same service flow identifier. For example, in a single connectivity (or single base station) downlink scenario, the base station deduplicates downlink packets that have a same sequence number and a same service flow identifier.

According to a fourth aspect, an embodiment of this application provides a packet transmission method. The method includes generating, by UE, a first uplink packet and a second uplink packet according to an indication obtained from a first base station, where the first uplink packet and the second uplink packet have a same first service flow identifier and a same first sequence number, and sending the first uplink packet to the first base station, and sending the second uplink packet to a second base station. Therefore, for a dual connectivity manner, the UE adds the service flow identifier and the sequence number to the uplink packet according to the indication of the base station. For a packet of a specific service (for example, a URLLC service requiring high reliability), the UE replicates a packet. In this way, reliability of packet transmission of the specific service is improved.

In a possible design, the method further includes receiving, by the UE, a first downlink packet and a second downlink packet from the first base station and the second base station respectively, where the first downlink packet and the second downlink packet include a same second service flow identifier and a same second sequence number, and deduplicating, by the UE, the first downlink packet and the second downlink packet according to the indication of the base station.

According to a fifth aspect, an embodiment of this application provides a packet transmission method. The method includes initiating, by a first base station, establishment of a first radio bearer between the first base station and UE, and in a process of establishing a second radio bearer between a second base station and the UE, sending, by the first base station or the second base station, indication information to the UE, where the indication information indicates the UE to associate the first radio bearer and the second radio bearer with a same packet data convergence protocol (PDCP) entity on the UE.

In a possible design, the sending, by the first base station or the second base station, indication information to the UE includes sending, by the first base station or the second base station, the indication information to the UE using a radio resource control (RRC) layer message.

According to a sixth aspect, an embodiment of this application provides a packet transmission method. The method includes interacting, by UE, with a first base station, to establish a first radio bearer between the first base station and the UE, in a process of establishing a second radio bearer between a second base station and the UE, receiving, by the UE, indication information from the first base station or the second base station, where the indication information indicates the UE to associate the first radio bearer and the second radio bearer with a same PDCP entity on the UE, generating, by the UE, a first packet and a second packet based on the indication information, where the first packet and the second packet have a same sequence number, and sending, by the UE, the first packet to the first base station over the first radio bearer, and sending the second packet to the second base station over the second radio bearer.

In a possible design, the generating, by the UE, a first packet and a second packet based on the indication information includes replicating, by the UE, a packet at a PDCP layer based on the indication information, to obtain the first packet and the second packet.

According to a seventh aspect, an embodiment of this application provides a packet transmission method. The method includes obtaining, by UE, indication information from a network side device, and generating, by the UE, a first uplink packet and a second uplink packet based on the indication information, sending the first uplink packet to a first base station over a first radio bearer, and sending the second uplink packet to a second base station over a second radio bearer, where the first uplink packet and the second uplink packet have a same sequence number.

In a possible design, the first uplink packet corresponds to a first service flow identifier, and the second uplink packet corresponds to a second service flow identifier.

In a possible design, the generating, by the UE, a first uplink packet and a second uplink packet based on the indication information includes replicating, by the UE, a packet at a first protocol layer based on the indication information, to obtain the first uplink packet and the second uplink packet. For example, the first protocol layer includes a high reliability protocol (HRP) layer, and the UE obtains the indication information from a SMF network element using a NAS message, or the first protocol layer includes a service data adaptation protocol (SDAP) layer, and the UE obtains the indication information from the first base station using an AS message.

In a possible design, the method further includes receiving, by the UE, a first downlink packet and a second downlink packet from the first base station and the second base station respectively, where the first downlink packet has a second sequence number and corresponds to the first service flow identifier, and the second downlink packet has the second sequence number and corresponds to the second service flow identifier, and deduplicating, by the UE, the first downlink packet and the second downlink packet based on the indication information.

According to an eighth aspect, an embodiment of this application provides a packet transmission method. The method includes receiving, by a UPF network element, an uplink forwarding rule from a SMF network element, receiving, by the UPF network element, a first uplink packet and a second uplink packet, where the first uplink packet has a first service flow identifier and a first sequence number, and the second uplink packet has a second service flow identifier and the first sequence number, and deduplicating, by the UPF network element, the first uplink packet and the second uplink packet according to the uplink forwarding rule.

In a possible design, the uplink forwarding rule indicates the UPF network element to deduplicate the two uplink packets that have the same sequence number and that respectively have the first service flow identifier and the second service flow identifier.

In a possible design, the method further includes receiving, by the UPF network element, a downlink forwarding rule from the SMF network element, and generating, by the UPF network element, a first downlink packet and a second downlink packet according to the downlink forwarding rule, sending the first downlink packet to a first base station, and sending the second downlink packet to a second base station, where the first downlink packet has the first service flow identifier and a second sequence number, and the second downlink packet has the second service flow identifier and the second sequence number.

In a possible design, the generating, by the UPF network element, a first downlink packet and a second downlink packet according to the downlink forwarding rule includes replicating, by the UPF network element, a packet at a first protocol layer according to the downlink forwarding rule, to obtain the first downlink packet and the second downlink packet, where the first protocol layer includes a HRP layer or a General Packet Radio Service (GPRS) Tunneling Protocol-user plane (GTP-U) layer.

According to a ninth aspect, an embodiment of this application provides a packet transmission apparatus. The apparatus may be a SMF network element or a chip. The apparatus has a function of implementing behavior of the SMF network element according to the first aspect or the possible designs of the first aspect. The function may be implemented by hardware, or may be implemented by hardware executing corresponding software. The hardware or software includes one or more modules corresponding to the foregoing function. In a possible design, a structure of the apparatus includes a processor and a transceiver. The processor is configured to perform a corresponding function according to the first aspect or the possible designs of the first aspect. The transceiver is configured to implement communication between the apparatus and a UPF network element and between the apparatus and a base station. The apparatus may further include a memory. The memory is configured to couple to the processor, and store a program instruction and data that are necessary for the apparatus.

According to a tenth aspect, an embodiment of this application provides a packet transmission apparatus. The apparatus may be a base station, or may be a chip. The apparatus has a function of implementing behavior of the base station according to the second aspect or the possible designs of the second aspect, or has a function of implementing behavior of the base station according to the third aspect or the possible designs of the third aspect, or has a function of implementing behavior of the base station according to the fifth aspect or the possible designs of the fifth aspect. The function may be implemented by hardware, or may be implemented by hardware executing corresponding software. The hardware or software includes one or more modules corresponding to the foregoing function. In a possible design, a structure of the apparatus includes a processor and a transceiver. The processor is configured to perform a corresponding function according to the second aspect or the possible designs of the second aspect, or perform a corresponding function according to the third aspect or the possible designs of the third aspect, or perform a corresponding function according to the fifth aspect or the possible designs of the fifth aspect. The transceiver is configured to implement communication between the apparatus and a SMF network element and between the apparatus and a UPF network element. The apparatus may further include a memory. The memory is configured to couple to the processor, and store a program instruction and data that are necessary for the apparatus.

According to an eleventh aspect, an embodiment of this application provides a packet transmission apparatus. The apparatus may be UE, or may be a chip. The apparatus has a function of implementing behavior of the UE according to the fourth aspect or the possible designs of the fourth aspect, or has a function of implementing behavior of the UE according to the sixth aspect or the possible designs of the sixth aspect, or has a function of implementing behavior of the base station according to the seventh aspect or the possible designs of the seventh aspect. The function may be implemented by hardware, or may be implemented by hardware executing corresponding software. The hardware or software includes one or more modules corresponding to the foregoing function. In a possible design, a structure of the apparatus includes a processor and a transceiver. The processor is configured to perform a corresponding function according to the fourth aspect or the possible designs of the fourth aspect, or perform a corresponding function according to the sixth aspect or the possible designs of the sixth aspect, or perform a corresponding function according to the seventh aspect or the possible designs of the seventh aspect. The transceiver is configured to implement communication between the apparatus and a base station and between the apparatus and a SMF network element. The apparatus may further include a memory. The memory is configured to couple to the processor, and store a program instruction and data that are necessary for the apparatus.

According to a twelfth aspect, an embodiment of this application provides a packet transmission apparatus. The apparatus may be a UPF network element or a chip. The apparatus has a function of implementing behavior of the UPF network element according to the eighth aspect or the possible designs of the eighth aspect. The function may be implemented by hardware, or may be implemented by hardware executing corresponding software. The hardware or software includes one or more modules corresponding to the foregoing function. In a possible design, a structure of the apparatus includes a processor and a transceiver. The processor is configured to perform a corresponding function according to the eighth aspect or the possible designs of the eighth aspect. The transceiver is configured to implement communication between the apparatus and a SMF network element and between the apparatus and a base station. The apparatus may further include a memory. The memory is configured to couple to the processor, and store a program instruction and data that are necessary for the apparatus.

According to a thirteenth aspect, an embodiment of this application provides a packet transmission system. The system includes a SMF network element configured to perform the method according to the first aspect or the possible designs of the first aspect, and a base station configured to perform the method according to the second aspect or the possible designs of the second aspect. In a dual connectivity scenario, the base station that performs the method according to the second aspect or the possible designs of the second aspect is a master base station. Optionally, the system may further include a secondary base station configured to implement dual connectivities.

According to a fourteenth aspect, an embodiment of this application further provides a computer-readable storage medium. The computer-readable storage medium stores an instruction, and when the instruction is run on a computer, the computer is enabled to perform the methods according to the foregoing aspects.

According to a fifteenth aspect, an embodiment of this application provides a computer program product including an instruction. When the computer program product is run on a computer, the computer is enabled to perform the methods according to the foregoing aspects.

DESCRIPTION OF EMBODIMENTS

The following clearly describes the technical solutions in the embodiments of this application with reference to the accompanying drawings in the embodiments of this application.

In a 5G mobile network architecture, a core network includes a control plane (CP) network element and a user plane network element. The CP network element is a unified CP that integrates a conventional 3rd Generation Partnership Project (3GPP) control network element mobility management entity (MME), a CP function of a serving gateway (SGW), a CP function of a packet data network gateway (PGW), and the like. The UPF network element can implement a UPF of the SGW (SGW-U) and a UPF of the PGW (PGW-U). Further, the unified CP network element may be decomposed into an access and mobility management function (AMF) network element and a SMF network element.

Figure 1:
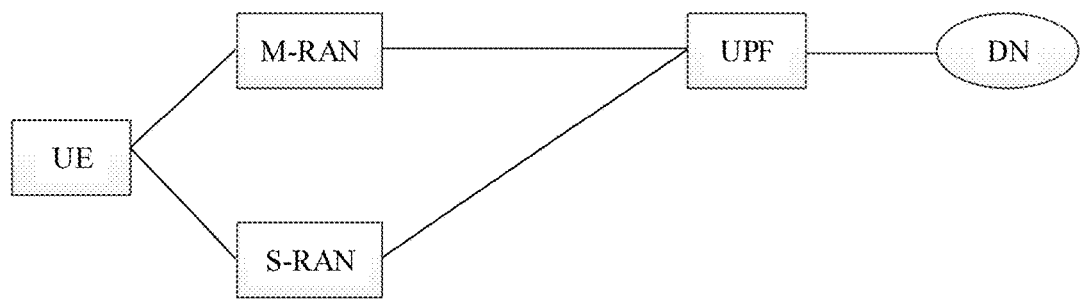
FIG. 1 is a schematic diagram of dual transmission paths in a 5G dual connectivity mechanism.
Figure 2:
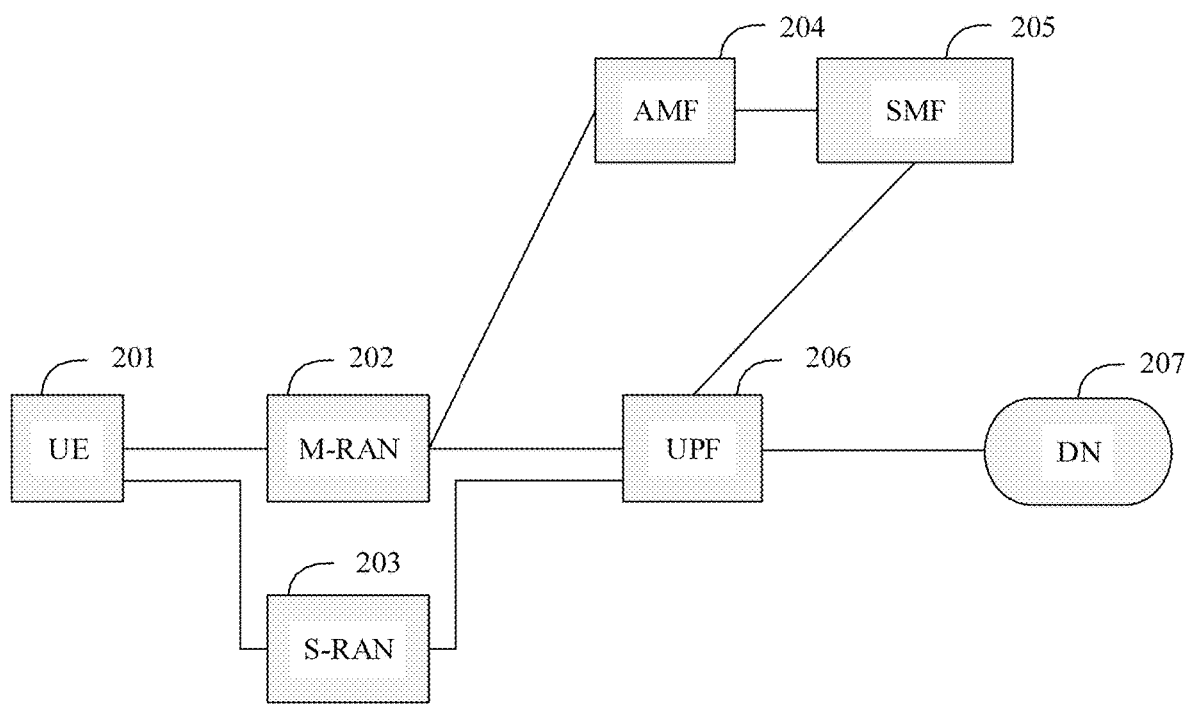
FIG. 2 is a schematic diagram of dual connectivities in a 5G communications system.

FIG. 2 is a schematic diagram of a 5G communications system according to an embodiment of this application. As shown in FIG. 2, the communications system includes at least UE 201, a RAN device (for example, an M-RAN device 202 and an S-RAN device 203), an AMF network element 204, an SMF network element 205, and a UPF network element 206.

The UE 201 in this system is not limited to being in a 5G network, and includes a mobile phone, an internet of things device, a smart home device, an industrial control device, a vehicle device, and the like. The UE may also be referred to as a terminal, a terminal device, a mobile station, a remote station, a remote terminal, an access terminal, a user terminal, or a user agent. This is not limited herein. The UE may alternatively be a vehicle in vehicle-to-vehicle (V2V) communication, a machine in machine type communication, or the like.

The RAN device is an apparatus configured to provide a wireless communication function for the UE 201. The M-RAN device 202 is used as an example. The M-RAN device 202 may include base stations in various forms, for example, a macro base station, a micro base station (also referred to as a small cell), a relay station, or an access point. In systems using different radio access technologies, names of devices having a base station function may be different. For example, in a third generation (3G) system, the device is referred to as a NodeB. In a Long-Term Evolution (LTE) system, the device is referred to as an evolved NodeB (eNB). In a 5G system, the device is referred to as a gNodeB (gNB). The M-RAN device 202 is referred to as an M-RAN 202 for short below. The S-RAN device 203 is similar to the M-RAN device 202, and details are not described again.

The AMF network element 204 may be responsible for registration, mobility management, a tracking area update procedure, and the like of the UE 201. The AMF network element 204 is referred to as an AMF 204 for short below.

The SMF network element 205 may be responsible for session management of the UE 201. For example, the session management includes establishment, modification, and release of a session, UPF network element selection and reselection, and internet protocol (IP) address assignment. The SMF network element 205 is referred to as an SMF 205 for short below.

The UPF network element 206 may be connected to a DN 207, and is configured to transmit a data packet of a service. The UPF network element 206 is referred to as a UPF 206 for short below.

In a dual connectivity mechanism, there are two paths for transmitting an uplink packet/a downlink packet one path passes through (1) the UE 201, the M-RAN 202, the UPF 206, and the DN 207, and the other path passes through (2) the UE 201, the S-RAN 203, the UPF 206, and the DN 207. There is a signaling connection between the M-RAN 202 and the S-RAN 203, and there is a signaling connection between the M-RAN 202 and a CP network element, such as the AMF 204 or the SMF 205. Optionally, there is no signaling connection between the S-RAN and the CP.

The foregoing network elements may also be referred to as devices or entities. For example, the AMF network element may also be referred to as an AMF device or an AMF entity.

The foregoing network elements may be implemented by specified hardware, or may be implemented by a software instance on specified hardware, or may be implemented by a virtual function instantiated on an appropriate platform. This is not limited in the present disclosure.

Optionally, the communications system is applicable to a service framework. In the service framework, a service-based interface is used on a CP. For example, the AMF network element 204 and the SMF network element 204 respectively have a service-based interface Namf and a service-based interface Nsmf. One function network element may expose its capability to another authorized function network element through a service-based interface, to provide a network function (NF) service. In other words, the NF service refers to various capabilities that can be provided.

In addition, this embodiment of this application is further applicable to another future-oriented communications technology. The network architecture and the service scenario described in this application are intended to describe the technical solutions in this application more clearly, and do not constitute a limitation on the technical solutions provided in this application. A person of ordinary skill in the art may know that with evolution of the network architecture and emergence of a new service scenario, the technical solutions provided in this application are also applicable to similar technical problems.

The 3GPP defines three main 5G scenarios enhanced mobile broadband (eMBB), massive machine-type communications (mMTC), and URLLC. Features of the URLLC include high reliability and a low latency, and the URLLC may be applied to unmanned driving, industrial automation, remote manufacturing, remote training, remote surgery, and the like. For example, for the URLLC, a desired uplink user plane latency is 0.5 milliseconds (ms), and a desired downlink user plane latency is 0.5 ms. An objective of reliability is that a packet loss rate for a 32-byte packet does not exceed 1 to $10^{(-5)}$ within a user plane latency of 1 ms.

This application is intended to provide a packet transmission solution having high reliability. For example, the packet transmission solution may be applied to a URLLC scenario.

Figure 3A:
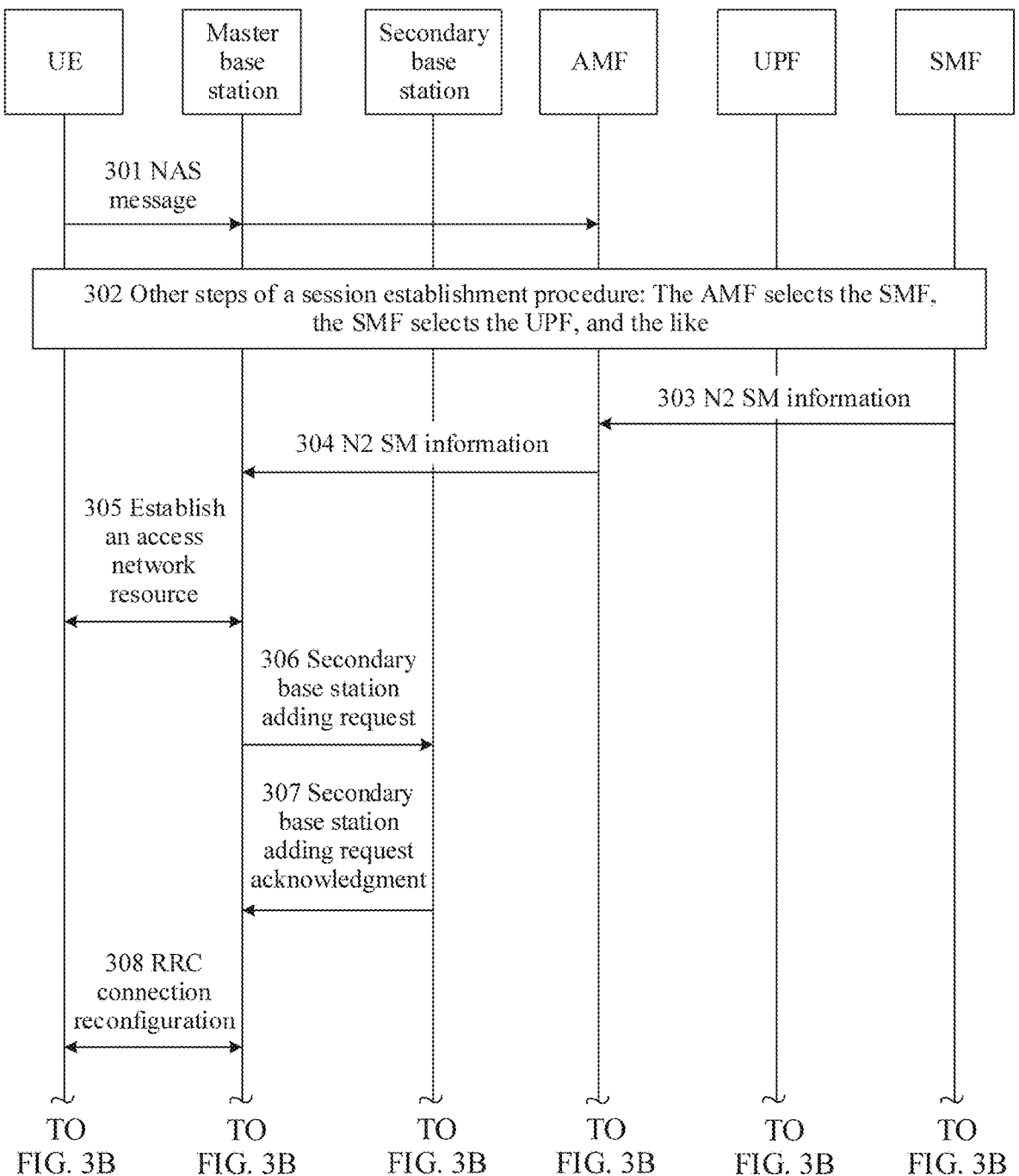
FIG. 3A and FIG. 3B are a signaling exchange diagram of a packet transmission method according to an embodiment of this application.
Figure 3B:
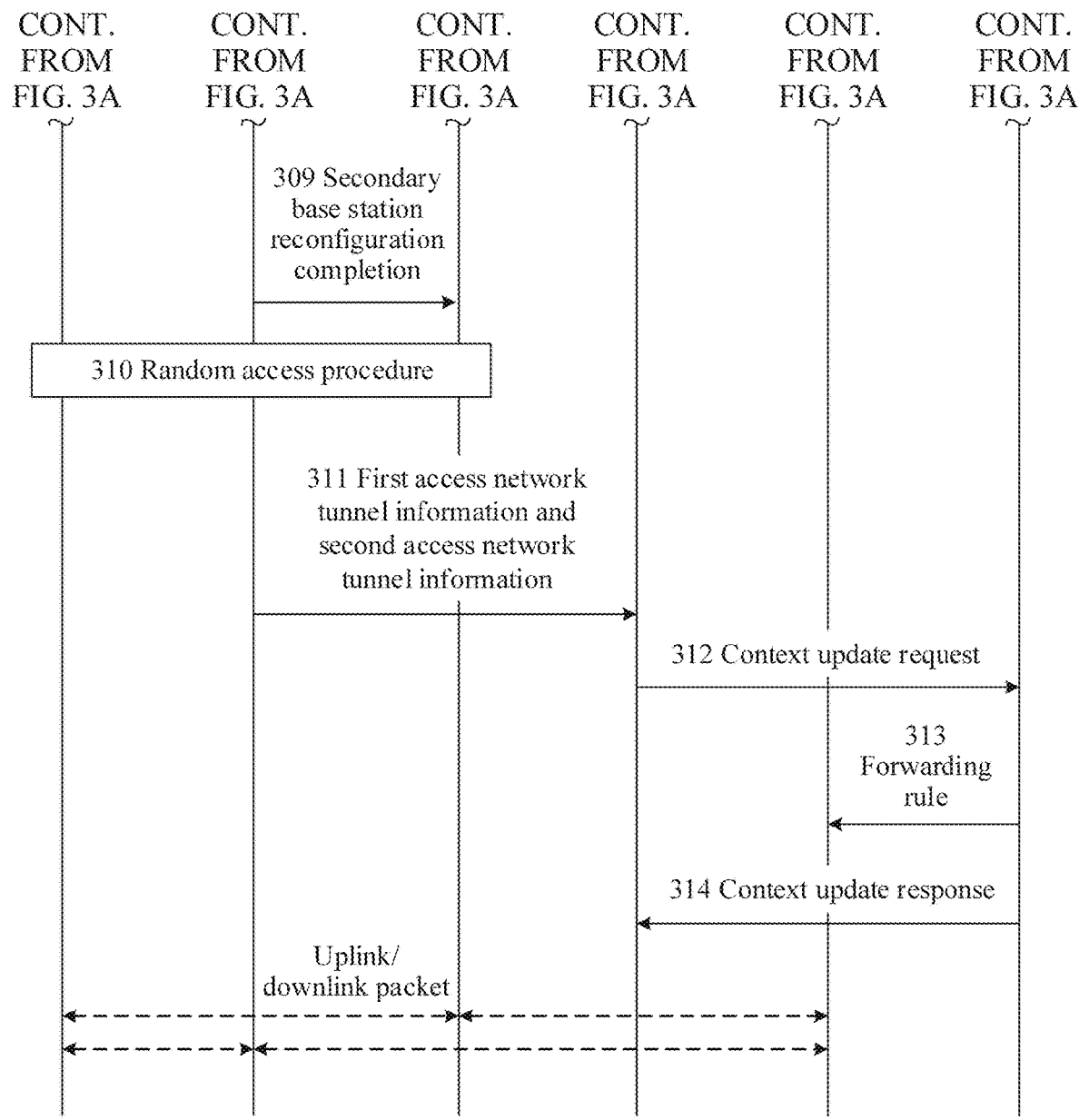

FIG. 3A and FIG. 3B are a signaling exchange diagram of a packet transmission method according to an embodiment of this application. FIG. 3A and FIG. 3B relate to interaction between UE, a master base station, a secondary base station, an AMF, an SMF, and a UPF. For example, the UE, the master base station, the secondary base station, the AMF, the SMF, and the UPF may be respectively the UE 201, the M-RAN 202, the S-RAN 203, the AMF 204, the SMF 205, and the UPF 206 in FIG. 2.

As shown in FIG. 3A and FIG. 3B, the method includes the following steps.

Step 301. The UE sends, to the AMF via the master base station, a NAS message that carries a session establishment request, to request to establish a packet data unit (PDU) session for the UE.

The NAS message may further include a PDU session identifier (ID), single network slice selection assistance information (S-NSSAI), and a DN name (DNN) that are allocated by the UE to the session. The S-NSSAI indicates a slice type corresponding to the session. The DNN indicates a DN corresponding to the session.

Step 302. Other steps of a session establishment procedure are performed.

For example, the foregoing other steps include at least the AMF selects the SMF, and the SMF selects the UPF. Details are not described herein.

Step 303. The SMF transmits N2 session management (SM) information to the AMF.

For example, the SMF sends the N2 SM information to the AMF to invoke an N1N2 message transfer service (Namf_Communication_N1N2MessageTransfer) of the AMF. The N2 SM information includes at least the PDU session identifier and core network tunnel information. The N2 SM information may further include a QoS parameter, a QoS flow identifier (QFI), slice identification information (for example, the S-NSSAI), a session-aggregate maximum bit rate (session-AMBR), and a PDU session type. Optionally, the N2 SM information may further include the DNN. In addition, an N1 SM container including a session accept message may further be sent to the AMF by invoking the service.

Step 304. The AMF sends the N2 SM information to the master base station.

For example, the AMF sends an N2 session request to the master base station, and the N2 session request includes the N2 SM information and a NAS message. The NAS message includes the PDU session identifier and the N1 SM container.

The core network tunnel information includes first core network tunnel information and second core network tunnel information. The first core network tunnel information and the second core network tunnel information may be allocated by the SMF and sent to the master base station by being forwarded by the AMF, or may be allocated by the UPF and sent to the SMF, and then sent by the SMF to the master base station by being forwarded by the AMF.

For example, the first core network tunnel information includes a first IP address of the UPF and a first tunnel endpoint identifier (TEID) of the UPF. The second core network tunnel information includes a second IP address of the UPF and a second TEID of the UPF. The first IP address and the second IP address may be the same or may be different. The first TEID and the second TEID are different.

When the first IP address and the second IP address are different, the first IP address and the second IP address may identify two paths that are independent of each other. The two paths that are independent of each other are two paths that pass through different transmission entities (such as a switch and a router). Details are not described below again.

When the first IP address and the second IP address are the same, the N2 SM information further includes first network identification information corresponding to the first TEID and second network identification information corresponding to the second TEID. The first network identification information and the second network identification information identify two paths that are independent of each other. The first network identification information is as an example. The first TEID and the first network identification information may be allocated by different network elements. The first network identification information may include a virtual local area network (VLAN) ID or a multi-protocol label switching (MPLS) label. For example, the network identification information corresponding to the first TEID is a VLAN ID 1, and the network identification information corresponding to the second TEID is a VLAN ID 2. In this way, when the first IP address and the second IP address are the same, when the first core network tunnel information and the second core network tunnel information are subsequently sent, the first network identification information corresponding to the first TEID and the second network identification information corresponding to the second TEID are also sent. Details are not described below again. For example, the first core network tunnel information and the first network identification information may be sent using a first container, and the second core network tunnel information and the second network identification information may be sent using a second container.

Step 305. The master base station initiates establishment of an access network resource between the master base station and the UE.

Step 306. The master base station determines to add the secondary base station, and sends a secondary base station adding request to the secondary base station.

The master base station may determine, based on indication information, to transmit an uplink packet of a first service through dual paths, to determine that the secondary base station needs to be added. The first service includes a URLLC service. For example, any one or a combination of the QoS parameter, the slice identification information, the DNN, and the first core network tunnel information and the second core network tunnel information that are included in the N2 SM information may be used as the indication information. The QoS parameter includes at least one of a 5G QoS identifier (5QI) and a QFI. For example, if the master base station determines, based on the QoS parameter in the N2 SM information, that the session requires high reliability, the master base station determines to add the secondary base station, or if the master base station determines, based on the slice identification information in the N2 SM information, that the session is associated with a slice in URLLC, the master base station determines to add the secondary base station, or if the master base station determines, based on the DNN in the N2 SM information, that the session is associated with a DN in URLLC, the master base station determines to add the secondary base station, or if the master base station directly determines, based on the first core network tunnel information and the second core network tunnel information in the N2 SM information, to transmit the uplink packet through the dual paths, the master base station determines to add the secondary base station. Because first access network tunnel information and second access network tunnel information need to be used for transmission of the downlink packet through the dual paths, it may also be considered that the indication information triggers determining of the first access network tunnel information and the second access network tunnel information. The first access network tunnel information may be determined by the master base station, and the second access network tunnel information may be determined by the secondary base station and sent to the master base station.

For example, the first access network tunnel information includes a third IP address of the master base station and a third TEID of the master base station, and the second access network tunnel information includes a fourth IP address of the secondary base station and a fourth TEID of the secondary base station.

Optionally, if the master base station finds that the downlink packet of the first service cannot be transmitted through the dual paths in a current environment (as described in a measurement report reported by the UE), the master base station feeds back indication information to the AMF, and the AMF sends the indication information to the SMF, where the indication information indicates that the downlink packet of the first service cannot be transmitted through the dual paths. After receiving the indication information, the SMF rejects the session establishment procedure or performs a subsequent step in a session establishment procedure in other approaches.

Step 307. The secondary base station returns a secondary base station adding request acknowledgment to the master base station.

For example, the secondary base station adding request acknowledgment includes the second access network tunnel information determined by the secondary base station.

Optionally, if the first service is at a session granularity, the secondary base station adding request sent in step 306 includes a session identifier of the first service. Therefore, the second access network tunnel information determined by the secondary base station is also at the session granularity and corresponds to the session identifier. If the first service is at a service flow granularity, the secondary base station adding request sent in step 306 includes a QFI of a service flow of the first service. Therefore, the second access network tunnel information determined by the secondary base station is also at the service flow granularity and corresponds to the QFI. From a perspective of a protocol stack, if the master base station determines to add the secondary base station, the master base station generates a PDCP entity for the QFI, and after receiving the secondary base station adding request, the secondary base station generates a PDCP entity for the QFI. In this way, the QFI is associated with the two PDCP entities. Therefore, that the master base station determines to add the secondary base station, in an embodiment, transmits a packet in a dual connectivity manner, may also be understood as that the QFI is associated with the two PDCP entities.

As described above, the first access network tunnel information includes the third IP address of the master base station and the third TEID of the master base station, and the second access network tunnel information includes the fourth IP address of the secondary base station and the fourth TEID of the secondary base station. The third IP address and the fourth IP address may be the same or may be different. The third TEID and the fourth TEID are different.

When the third IP address and the fourth IP address are different, the third IP address and the fourth IP address identify two paths that are independent of each other.

When the third IP address and the fourth IP address are the same, after receiving the second access network tunnel information, the master base station allocates third network identification information corresponding to the third TEID and fourth network identification information corresponding to the fourth TEID. The third network identification information and the fourth network identification information identify two paths that are independent of each other. For the third/fourth network identification information, refer to the descriptions of the first network identification information. Details are not described herein again. In this way, when the third IP address and the fourth IP address are the same, when subsequently sending the first access network tunnel information and the second access network tunnel information, the master base station further sends the third network identification information corresponding to the third TEID, and sends the fourth network identification information corresponding to the fourth TEID. Details are not described below again. For example, the master base station may send the first access network tunnel information and the third network identification information using a third container, and send the second access network tunnel information and the fourth network identification information using a fourth container.

Step 308. The master base station initiates RRC connection reconfiguration to the UE.

Step 309. The master base station feeds back secondary base station reconfiguration completion to the secondary base station, to notify the secondary base station that the UE successfully completes the RRC connection reconfiguration.

Optionally, if the secondary base station has an RRC function, the foregoing step 307 to step 309 may be replaced with the following steps.

307'. The secondary base station initiates an RRC connection establishment process to the UE.

308'. The secondary base station returns a secondary base station adding request acknowledgment to the master base station. For details, refer to the descriptions of step 307. Details are not described again.

Step 310. Random access procedure is performed.

It should be noted that, a sequence of step 308, step 309, and step 310 is not limited herein, or the random access procedure may be first performed, and then step 308 and step 309 are performed.

Optionally, in another embodiment, the master base station may determine, before step 305, whether the secondary base station needs to be added. For how the master base station determines whether the secondary base station needs to be added, refer to the descriptions of step 306. Details are not described herein again. If the master base station determines to add the secondary base station (in an embodiment, transmit a packet in the dual connectivity manner), the master base station may indicate, through step 305 or step 308, the UE to add a service flow identifier and a sequence number to an uplink packet (replicate the uplink packet, where the replicated uplink packets have the same service flow identifier and the same sequence number). If the master base station determines not to add the secondary base station (in an embodiment, transmit a packet in a single connectivity manner), the master base station further determines whether obtained capability information meets a first condition. When the capability information meets the first condition, the master base station may indicate, through step 305 or step 308, the UE to add a service flow identifier to an uplink packet.

For example, the capability information indicates at least one of the following, whether the base station (namely, the master base station) has a capability of transmitting or receiving a packet in the dual connectivity manner, whether a neighboring base station (namely, a base station, for example, the secondary base station, having an Xn interface with the base station) of the base station has the capability of transmitting or receiving a packet in the dual connectivity manner, and whether another base station (for example, the secondary base station) that has the capability of transmitting or receiving a packet in the dual connectivity manner is deployed in a slice associated with the base station.

For example, the master base station may obtain the capability information through configuration, in an Xn connection establishment process between the master base station and the neighboring base station, or in an N2 session establishment process. For example, in the Xn connection establishment process between the base station and the neighboring base station, the neighboring base station sends capability information of the neighboring base station to the base station. In the N2 session establishment process between the base station and the AMF, the SMF sends a deployment status in the slice to the base station in the N2 session establishment process.

In addition, the base station may determine, using allowed network slice selection assistance information (NSSAI)

returned by the AMF in a registration procedure, the slice associated with the base station, or the base station may determine, based on S-NSSAI that corresponds to a session and that is returned by the SMF in the session establishment process, the slice associated with the base station. Therefore, the base station may determine, with reference to the obtained base station deployment status in the slice, whether another base station having the capability of transmitting or receiving a packet in the dual connectivity manner is deployed in the slice associated with the base station.

The first condition includes at least one of the following. The base station (namely, the master base station) has the capability of transmitting or receiving a packet in the dual connectivity manner, the neighboring base station (namely, the secondary base station) of the base station has the capability of transmitting or receiving a packet in the dual connectivity manner, and the other base station (for example, the secondary base station) that has the capability of transmitting or receiving a packet in the dual connectivity manner is deployed in the slice associated with the master base station.

In other words, the capability information meets the first condition when the capability information indicates at least one of the following indicating that the base station has the capability of transmitting or receiving a packet in the dual connectivity manner, indicating that the neighboring base station (for example, the secondary base station) of the base station has the capability of transmitting or receiving a packet in the dual connectivity manner, and indicating that the other base station (for example, the secondary base station) that has the capability of transmitting or receiving a packet in the dual connectivity manner is deployed in the slice associated with the base station. It may be understood that when the capability information meets the first condition, it indicates that the UE has a possibility of transmitting or receiving a packet in the dual connectivity manner. Even if the UE currently uses the single connectivity manner, the UE may be subsequently switched to the dual connectivity manner.

Therefore, when the dual connectivity manner is used or the dual connectivity manner may be used subsequently, the base station indicates the UE to add the service flow identifier to the uplink packet. For example, the base station may indicate the UE to enable the SDAP, to indicate the UE to add the service flow identifier to the uplink packet. The service flow identifier may be included in an SDAP header. That the UE enables the SDAP means that the UE adds the SDAP header to the uplink packet.

The service flow identifier may include at least one of a session identifier, a QFI, and a 5-tuple.

Therefore, if the dual connectivity manner may be used subsequently, even currently single connectivity is used, the base station also indicates the UE to add the service flow identifier. In this way, for the UE, a same protocol stack format is used for the single connectivity manner and the dual connectivity manner. After the UE is subsequently switched to the dual connectivity manner, the UE may directly perform processing based on the protocol stack format, to avoid complex operations and signaling exchanges, and reduce a latency, thereby improving user experience.

However, in the dual connectivity manner, because the UE needs to replicate the uplink packet, the master base station indicates the UE to add the sequence number. It may be understood that the UE may process the uplink packet in various manners, and a plurality of processed uplink packets have a same sequence number. For example, the UE may first add a sequence number to a first uplink packet, and then replicate the first uplink packet to which the sequence number is added, to obtain a second uplink packet having the same sequence number, or the UE may first replicate a first uplink packet to obtain a second uplink packet, and then add a same sequence number to the first uplink packet and the second uplink packet. This is not limited in this application.

Optionally, the base station further indicates the UE to deduplicate received downlink packets that have a same sequence number and a same service flow identifier.

Optionally, in another embodiment, the base station (namely, the master base station) may determine, before step 305, whether the obtained capability information meets the first condition. When the capability information meets the first condition, the UE may be indicated, through step 305, to add the service flow identifier to the uplink packet. If the master base station determines, in step 306, that the secondary base station needs to be added, the master base station may indicate, through step 308, the UE to add the sequence number to the uplink packet. For how to determine whether the capability information meets the first condition, how to determine whether the secondary base station needs to be added, how to indicate the UE to add the service flow identifier to the uplink packet, and how to indicate the UE to add the sequence number to the uplink packet, refer to the foregoing descriptions. Details are not described herein again.

Optionally, the base station further indicates the UE to deduplicate received downlink packets that have a same sequence number and a same service flow identifier.

Optionally, in still another embodiment, the N2 SM information transmitted in step 303 and step 304 further includes indication information, and the indication information indicates the base station (namely, the master base station) to indicate the UE to add the service flow identifier to an uplink packet of a first session or an uplink packet of a first service flow of a first session. That is, the SMF may determine whether the UE needs to add the service flow identifier to the uplink packet. For example, when the SMF determines, based on the QFI in the N2 SM information sent by the UE to the SMF, that the session requires high reliability, and/or determines, based on the slice identification information in the N2 SM information, that the session is associated with a slice in URLLC, and/or determines, based on the DNN in the N2 SM information, that the session is associated with a DN in URLLC, and/or determines, based on subscription data of the UE, that the UE is UE in URLLC, the SMF determines that the UE needs to add the service flow identifier to the uplink packet, and therefore sends the indication information to the base station, and after the base station receives the indication information, the base station indicates the UE to add the service flow identifier to the uplink packet. In this way, the base station may not perform determining, thereby simplifying an operation on a base station side.

Optionally, the base station further indicates the UE to deduplicate received downlink packets that have a same sequence number and a same service flow identifier.

Step 311. The master base station sends the first access network tunnel information and the second access network tunnel information to the AMF.

For example, the master base station returns an N2 session response to the AMF. The N2 session response includes the PDU session identifier and the N2 SM information. The N2 SM information includes the first access network tunnel information and the second access network tunnel information. Optionally, when the first service is at the session granularity, the N2 SM information may further include the session identifier corresponding to the first service, or when the first service is at the service flow granularity, the N2 SM information may further include the session identifier and the QFI that correspond to the first service.

Step 312. The AMF sends a context update request to the SMF.

For example, the AMF sends an Nsmf_PDUSession_UpdateSMContext request to invoke an SM context update service (Nsmf_PDUSession_UpdateSMContext) of the SMF. The AMF forwards, to the SMF using the request, the N2 SM information received in step 311.

Step 313. The SMF sends a downlink forwarding rule to the UPF.

For example, the SMF sends an N4 session modification request to the UPF, and the session modification request includes the downlink forwarding rule. The UPF returns an N4 session modification response.

It should be noted that, in another implementation, the core network tunnel information in step 303 may include only the first core network tunnel information, but the first access network tunnel information and the second access network tunnel information are included in step 311. After receiving the first access network tunnel information and the second access network tunnel information, the SMF allocates the second core network tunnel information, sends the second core network tunnel information to the UPF in step 313, and sends the second core network tunnel information to the master base station via the AMF, or after receiving the first access network tunnel information and the second access network tunnel information from the SMF, the UPF allocates the second core network tunnel information, and returns the second core network tunnel information to the SMF using the N4 session modification response. The SMF sends the second core network tunnel information to the master base station via the AMF. The master base station sends the second core network tunnel information to the secondary base station.

The downlink forwarding rule includes the first access network tunnel information and the second access network tunnel information. The downlink forwarding rule indicates the UPF to replicate a received downlink packet of the first service (add a flow identifier and a sequence number to the downlink packet), and send downlink packets of the first service through the two paths corresponding to the first access network tunnel information and the second access network tunnel information, separately, in an embodiment, send one downlink packet of the first service to the master base station through a first path corresponding to the first access network tunnel information, and send another downlink packet of the first service to the secondary base station through a second path corresponding to the second access network tunnel information. The downlink forwarding rule further indicates the UPF to deduplicate received uplink packets that have a same flow identifier and a same sequence number.

Optionally, when the first service is at the session granularity, the N2 SM information received by the SMF in step 312 further includes the session identifier corresponding to the first service. Therefore, the downlink forwarding rule further includes the session identifier corresponding to the first service. When the first service is at the service flow granularity, the N2 SM information received by the SMF in step 312 further includes the session identifier and the QFI that correspond to the first service. Therefore, the downlink forwarding rule further includes the session identifier and the QFI that correspond to the first service.

Optionally, the session identifier corresponding to the first service in the N2 SM information received in step 312 and the session identifier corresponding to the first service in the downlink forwarding rule may be different, but are associated with each other. For example, the session identifier corresponding to the first service in the N2 SM information received in step 312 is the PDU session identifier. The SMF converts the PDU session identifier into an N4 session identifier, uses the N4 session identifier as the session identifier corresponding to the first service in the downlink forwarding rule, and sends the N4 session identifier to the UPF.

In addition, the downlink forwarding rule further includes information about the first service.

For example, the information about the first service includes at least a 5-tuple of the first service. For example, the information about the first service may indicate IP addresses of which packets correspond to the packet of the first service. In other words, the information about the first service functions as a packet filter configured to obtain the packet of the first service through filtering. For example, the SMF may obtain the information about the first service from a policy control function (PCF) network element, or locally configure the information about the first service.

Step 314. The SMF sends a context update response to the AMF.

Then, after receiving the downlink packet of the first service, the UPF sends the downlink packets of the first service to the master base station and the secondary base station according to the forwarding rule through the first path corresponding to the first access network tunnel information and the second path corresponding to the second access network tunnel information separately. That the downlink packets of the first service are transmitted through the two paths also means that the downlink packets sent through the two paths are the same.

For example, after receiving a downlink packet, the UPF matches a packet header characteristic of the downlink packet with the information about the first service in the forwarding rule, to determine that the downlink packet is a packet of the first service.

After determining that the downlink packet is the packet of the first service, the UPF may replicate the packet. In a possible implementation, the UPF sends an original packet to the UE through the first path that is between the UPF and the master base station and that corresponds to the first access network tunnel information, and sends a replicated packet to the UE through the second path that is between the UPF and the secondary base station and that corresponds to the second access network tunnel information. In another possible implementation, the UPF sends a replicated packet to the UE through the first path that is between the UPF and the master base station and that corresponds to the first access network tunnel information, and sends an original packet to the UE through the second path that is between the UPF and the secondary base station and that corresponds to the second access network tunnel information. In still another possible implementation, the UPF performs packet replication to obtain two packets, and sends the replicated packets to the UE through the first path that is between the UPF and the master base station and that corresponds to the first access network tunnel information and through the second path that is between the UPF and the secondary base station and that corresponds to the second access network tunnel information, respectively. In the foregoing several manners, the downlink packets transmitted through the dual paths are the same.

In addition, in an uplink direction, after receiving the first core network tunnel information and the second core network tunnel information that are included in the N2 SM information in step 304, the master base station learns that the UE may subsequently transmit an uplink packet of the first service through the two paths respectively corresponding to the first core network tunnel information and the second core network tunnel information. For example, the master base station corresponds to a first path corresponding to the first core network tunnel information, and the secondary base station corresponds to a second path corresponding to the second core network tunnel information. Therefore, the master base station may send the second core network tunnel information to the secondary base station using the secondary base station adding request in step 306. In step 308, after receiving the second access network tunnel information determined by the secondary base station, the master base station sends an uplink forwarding rule to the UE in the RRC connection reconfiguration process. The uplink forwarding rule includes the first access network tunnel information and the second access network tunnel information, and the uplink forwarding rule indicates the UE to replicate a received uplink packet of the first service, and send uplink packets of the first service to the master base station through the path corresponding to the first access network tunnel information, and sends the information to the secondary base station through the path corresponding to the second access network tunnel information.

Similarly, the uplink forwarding rule further includes the information about the first service. Details are not described herein again. After determining, based on the information about the first service, that an uplink packet is a packet of the first service, the UE may replicate the packet. In a possible implementation, the UE sends an original packet to the master base station through the first path corresponding to the first access network tunnel information, and sends a replicated packet to the secondary base station through the second path corresponding to the second access network tunnel information. In another possible implementation, the UE sends a replicated packet to the master base station through the first path corresponding to the first access network tunnel information, and sends an original packet to the secondary base station through the second path corresponding to the second access network tunnel information. In still another possible implementation, the UE performs packet replication to obtain two packets, sends one of the replicated packets to the master base station through the first path corresponding to the first access network tunnel information, and sends the other one of the replicated packets to the secondary base station through the second path corresponding to the second access network tunnel information. In the foregoing several manners, the uplink packets transmitted through the dual paths are the same. After receiving the uplink packet, the master base station sends the uplink packet to the UPF based on the first core network tunnel information. After receiving the uplink packet, the secondary base station sends the uplink packet to the UPF based on the second core network tunnel information.

Therefore, according to the packet transmission method in this embodiment of the present disclosure, the uplink/downlink packets of the first service (for example, the URLLC service) may be transmitted through the two paths. Similarly, the method in this embodiment of this application may further be used to transmit an uplink packet/a downlink packet of the first service through a plurality of (more than two) paths. Details are not described again. Therefore, reliability of packet transmission of the URLLC service is improved.

Figure 4:
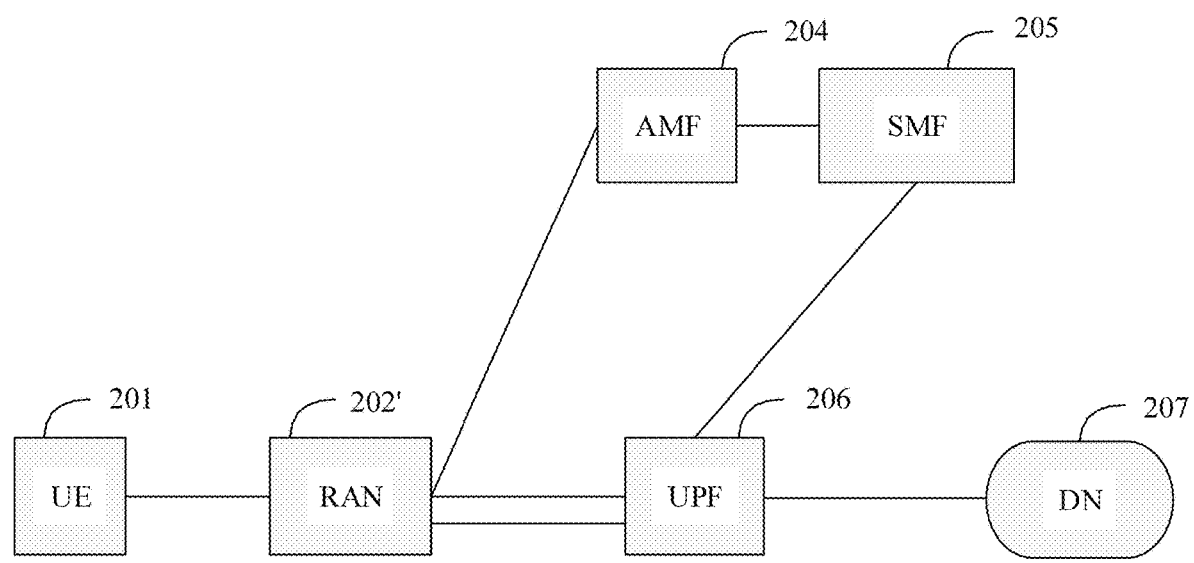
FIG. 4 is a schematic diagram of a single connectivity in a 5G communications system.

In addition, the packet transmission solution in this application is also applicable to a single connectivity (or referred to as single base station) scenario, as shown in FIG. 4. In this scenario, there are at least two transmission paths between the RAN 202' and the UPF 206.

Figure 5:
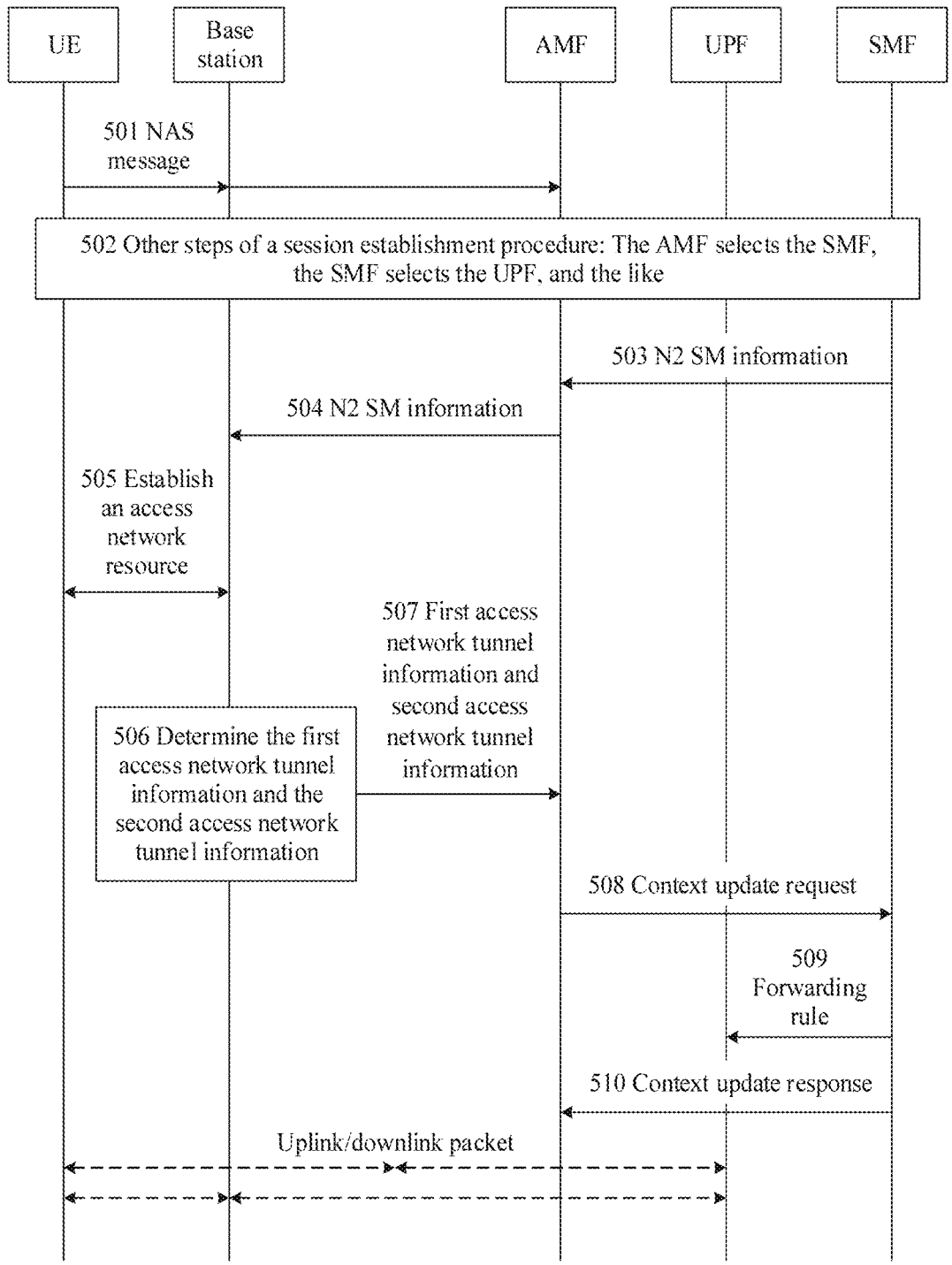
FIG. 5 is a signaling exchange diagram of a packet transmission method according to another embodiment of this application.

FIG. 5 is a signaling exchange diagram of a packet transmission method according to another embodiment of this application. FIG. 5 relates to interaction between UE, a base station, an AMF, an SMF, and a UPF. For example, the UE, the base station, the AMF, the SMF, and the UPF may be respectively the UE 201, the RAN 202', the AMF 204, the SMF 205, and the UPF 206 in FIG. 4.

As shown in FIG. 5, the method includes the following steps.

Step 501. The UE sends, to the AMF via the base station, a NAS message that carries a session establishment request, to request to establish a PDU session for the UE.

Step 502. Other steps of a session establishment procedure are performed.

Step 503. The SMF transmits N2 SM information to the AMF.

Step 504. The AMF sends the N2 SM information to the base station.

Step 505. The base station initiates establishment of an access network resource between the base station and the UE.

For step 501 to step 505, refer to the descriptions of step 301 to step 305 in FIG. 3A and FIG. 3B. Details are not described herein again. The base station in FIG. 5 may perform the steps of the method performed by the master base station in FIG. 3A and FIG. 3B.

Similarly, when the base station receives indication information from the SMF, or determines that capability information meets a first condition, the base station may indicate, through step 505, the UE to add a service flow identifier. Refer to the descriptions of FIG. 3A and FIG. 3B herein, and details are not described herein again.

Step 506. The base station determines first access network tunnel information and second access network tunnel information.

The base station may determine, based on the indication information, to transmit an uplink packet of a first service through dual paths, to determine that the two pieces of access network tunnel information need to be determined. The first service includes a URLLC service. For example, any one or a combination of the QoS parameter, the slice identification information, the DNN, and the first core network tunnel information and the second core network tunnel information that are included in the N2 SM information transmitted in the foregoing step 503 and step 504 may be used as the indication information. The QoS parameter includes at least one of a 5QI and a QFI. For example, if the base station determines, based on the QoS parameter in the N2 SM information, that the session requires high reliability, or determines, based on the slice identification information in the N2 SM information, that the session is associated with a slice in URLLC, or if the base station determines, based on the DNN in the N2 SM information, that the session is associated with a DN in URLLC, or directly determines, based on the first core network tunnel information and the second core network tunnel information in the N2 SM information, to transmit the uplink packet through the dual paths, the base station determines that the two pieces of access network tunnel information need to be determined.

Because the first access network tunnel information and the second access network tunnel information need to be used for transmission of the downlink packet through the dual paths, it may further be considered that the indication information triggers determining of the first access network tunnel information and the second access network tunnel information.

Optionally, if the base station finds that the downlink packet of the first service cannot be transmitted through the dual paths in a current environment, the base station feeds back indication information to the AMF, and the AMF sends the indication information to the SMF, where the indication information indicates that the downlink packet of the first service cannot be transmitted through the dual paths. After receiving the indication information, the SMF rejects the session establishment procedure or performs a subsequent step in a session establishment procedure in other approaches.

Similarly, the first access network tunnel information includes a third IP address and a third TEID that are of the base station, and identifies a first path between the base station and the UPF. The second access network tunnel information includes a fourth IP address and a fourth TEID that are of the base station, and identifies a second path between the base station and the UPF. The third TEID and the fourth TEID are different. The third IP address and the fourth IP address may be the same or may be different.

When the third IP address and the fourth IP address are different, the third IP address and the fourth IP address identify two paths that are independent of each other.

When the third IP address and the fourth IP address are the same, the base station further allocates third network identification information corresponding to the third TEID and fourth network identification information corresponding to the fourth TEID. The third network identification information and the fourth network identification information identify two paths that are independent of each other. For the third/fourth network identification information, refer to the descriptions of the first network identification information. Details are not described herein again. In this way, when the third IP address and the fourth IP address are the same, when subsequently sending the first access network tunnel information and the second access network tunnel information, the base station further sends the third network identification information corresponding to the third TEID and the fourth network identification information corresponding to the fourth TEID. Details are not described below again. For example, the base station may send the first access network tunnel information and the third network identification information using a third container, and send the second access network tunnel information and the fourth network identification information using a fourth container.

Step 507. The base station sends the first access network tunnel information and the second access network tunnel information to the AMF.

For example, the base station returns an N2 session response to the AMF. The N2 session response includes the PDU session identifier and the N2 SM information. The N2 SM information includes the first access network tunnel information and the second access network tunnel information.

Optionally, when the first service is at a session granularity, the N2 SM information may further include a session identifier corresponding to the first service, or when the first service is at a service flow granularity, the N2 SM information may further include a session identifier and a QFI that correspond to the first service.

Step 508. The AMF sends a context update request to the SMF.

For example, the AMF sends an Nsmf_PDUSession_UpdateSMContext request to invoke an SM context update service Nsmf_PDUSession_UpdateSMContext of the SMF. The AMF forwards, to the SMF using the request, the N2 SM information received in step 507.

Step 509. The SMF sends a downlink forwarding rule to the UPF.

For example, the SMF sends an N4 session modification request to the UPF, and the session modification request includes the downlink forwarding rule. The UPF returns an N4 session modification response.

It should be noted that, in another implementation, the core network tunnel information in step 503 may include only the first core network tunnel information, however, the first access network tunnel information and the second access network tunnel information are included in step 506. After receiving the first access network tunnel information and the second access network tunnel information, the SMF allocates second core network tunnel information, sends the second core network tunnel information to the UPF in step 509, and sends the second core network tunnel information to the base station via the AMF, or after receiving the first access network tunnel information and the second access network tunnel information from the SMF, the UPF allocates second core network tunnel information, and returns the second core network tunnel information to the SMF using the N4 session modification response. The SMF sends the second core network tunnel information to the base station via the AMF.

The downlink forwarding rule includes the first access network tunnel information and the second access network tunnel information. The downlink forwarding rule indicates the UPF to replicate a received downlink packet of the first service, and send downlink packets of the first service through the two paths respectively corresponding to the first access network tunnel information and the second access network tunnel information, in an embodiment, send one of the downlink packets of the first service through the first path that is between the UPF and the base station and that corresponds to the first access network tunnel information, and send the other of downlink packets of the first service through the second path that is between the UPF and the base station and that corresponds to the second access network tunnel information.

Optionally, when the first service is at the session granularity, the N2 SM information received by the SMF in step 508 further includes the session identifier corresponding to the first service. Therefore, the downlink forwarding rule further includes the session identifier corresponding to the first service. When the first service is at the service flow granularity, the N2 SM information received by the SMF in step 508 further includes the session identifier and the QFI that correspond to the first service. Therefore, the downlink forwarding rule further includes the session identifier and the QFI that correspond to the first service.

Optionally, the session identifier corresponding to the first service in the N2 SM information received in step 508 and the session identifier corresponding to the first service in the downlink forwarding rule may be different, but are associated with each other. For example, the session identifier corresponding to the first service in the N2 SM information received in step 508 is the PDU session identifier. The SMF converts the PDU session identifier into an N4 session identifier, uses the N4 session identifier as the session identifier corresponding to the first service in the downlink forwarding rule, and sends the N4 session identifier to the UPF.

In addition, the downlink forwarding rule further includes information about the first service (for example, the URLLC service). Refer to the descriptions of step 313 in FIG. 3A and FIG. 3B. Details are not described herein again.

Step 510. The SMF sends a context update response to the AMF.

Then, after receiving the downlink packet of the first service, the UPF sends the downlink packets of the first service according to the forwarding rule through the first path that is between the UPF and the base station and that corresponds to the first access network tunnel information, and the second path that is between the UPF and the base station and that corresponds to the second access network tunnel information, separately. That the downlink packets of the first service are transmitted through the two paths also means that the downlink packets sent through the two paths are the same.

For example, after receiving a downlink packet, the UPF matches a packet header characteristic of the downlink packet with the information about the first service in the forwarding rule, to determine that the downlink packet is a packet of the first service. After determining that the downlink packet is the packet of the first service, the UPF may replicate the packet. In a possible implementation, the UPF sends an original packet to the UE through the first path that is between the UPF and the base station and that corresponds to the first access network tunnel information, and sends a replicated packet to the UE through the second path that is between the UPF and the base station and that corresponds to the second access network tunnel information. In another possible implementation, the UPF sends a replicated packet to the UE through the first path that is between the UPF and the base station and that corresponds to the first access network tunnel information, and sends an original packet to the UE through the second path that is between the UPF and the base station and that corresponds to the second access network tunnel information. In still another possible implementation, the UPF performs packet replication to obtain two packets, and sends the replicated packets to the UE through the first path and the second path that are between the UPF and the base station and that respectively correspond to the first access network tunnel information and the second access network tunnel information. In the foregoing several manners, the downlink packets transmitted through the dual paths are the same.

In addition, in an uplink direction, after receiving the first core network tunnel information and the second core network tunnel information that are included in the N2 SM information in step 504, the base station learns that the UE may subsequently transmit an uplink packet of the first service through the two paths respectively corresponding to the first core network tunnel information and the second core network tunnel information. The first core network tunnel information and the second core network tunnel information may be considered as information included in an uplink forwarding rule. The uplink forwarding rule indicates the base station to replicate a received uplink packet of the first service, and send uplink packets of the first service to the UPF through the first path corresponding to the first access network tunnel information and the second path corresponding to the second access network tunnel information.

Similarly, the uplink forwarding rule further includes the information about the first service. Details are not described herein again. After determining, based on the information about the first service, that an uplink packet is a packet of the first service, the base station may replicate the packet. In a possible implementation, the base station sends an original packet to the UPF through the first path corresponding to the first access network tunnel information, and sends a replicated packet to the UPF through the second path corresponding to the second access network tunnel information. In another possible implementation, the base station sends a replicated packet to the UPF through the first path corresponding to the first access network tunnel information, and sends an original packet to the UPF through the second path corresponding to the second access network tunnel information. In still another possible implementation, the base station performs packet replication to obtain two packets, sends one of the replicated packets to the UPF through the first path corresponding to the first access network tunnel information, and sends the other one of the replicated packets to the UPF through the second path corresponding to the second access network tunnel information. In the foregoing several manners, the uplink packets transmitted through the dual paths are the same.

Therefore, according to the packet transmission method in this embodiment of the present disclosure, the uplink/downlink packets of the first service (for example, the URLLC service) may be transmitted through the two paths. Similarly, the method in this embodiment of this application may further be used to transmit an uplink packet/a downlink packet of the first service through a plurality of (more than two) paths. Details are not described again. Therefore, reliability of packet transmission of the URLLC service is improved.

Figure 11A:
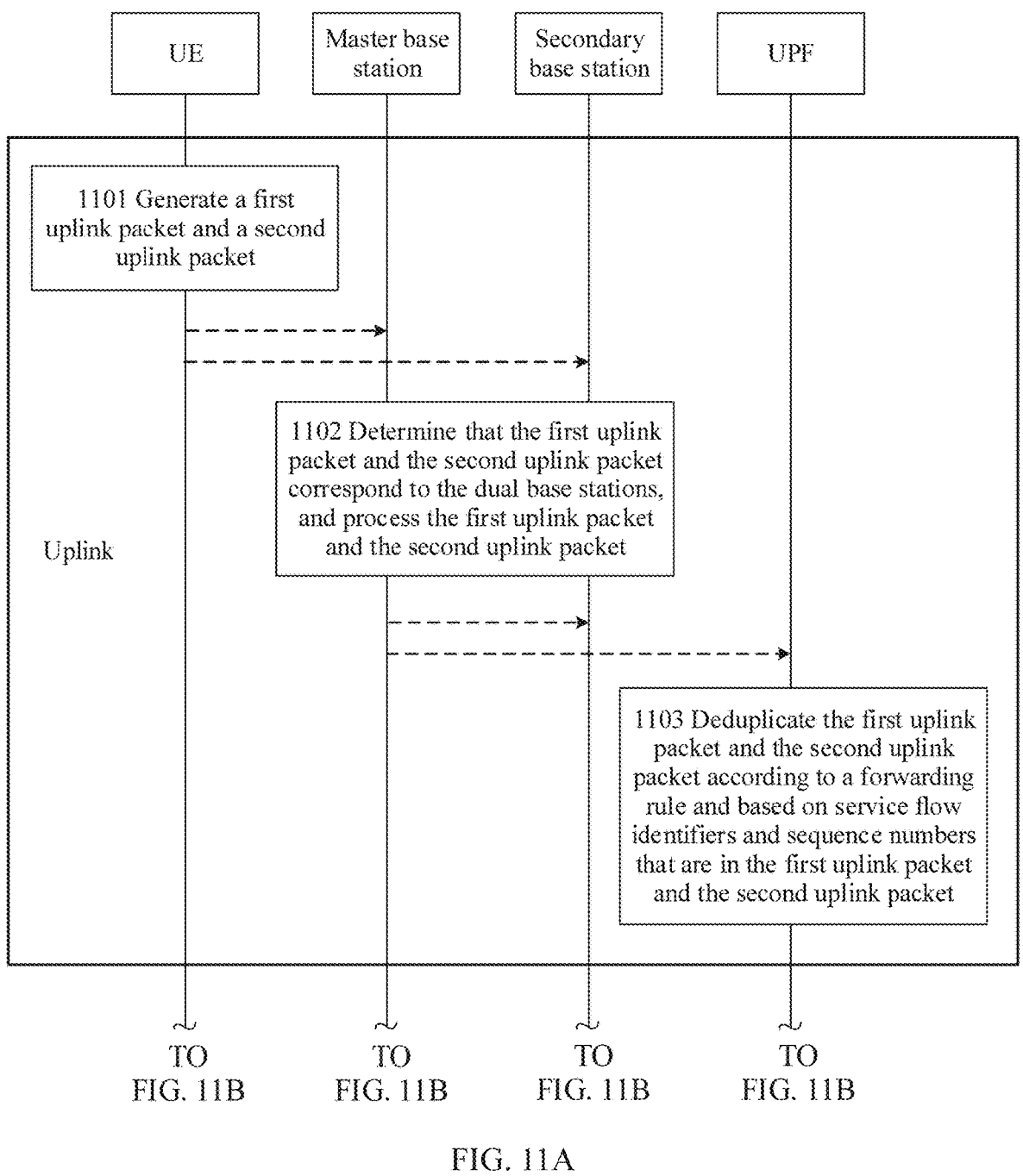
FIG. 11A and FIG. 11B are a signaling exchange diagram of a packet transmission method according to another embodiment of this application.
Figure 11B:
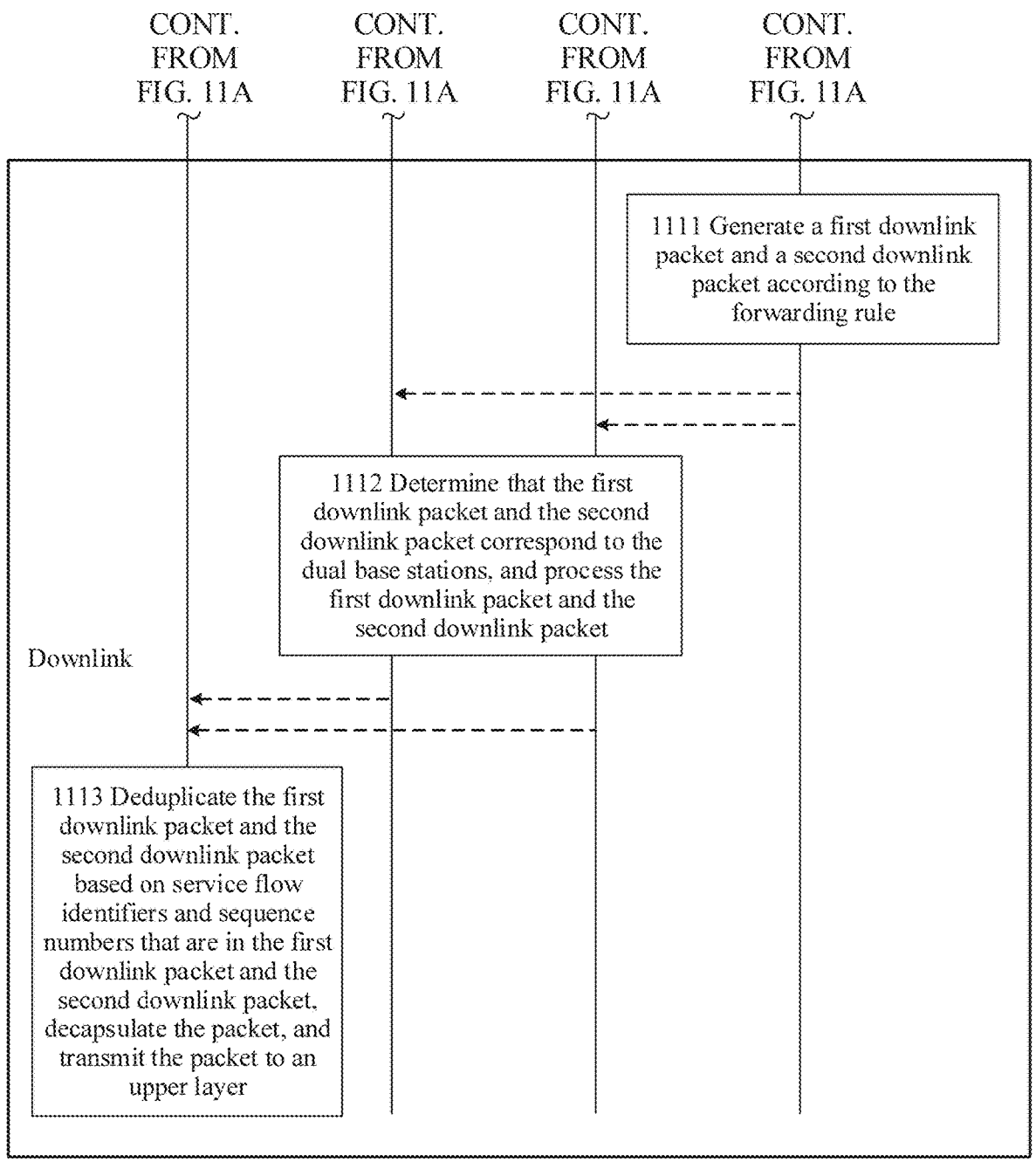

FIG. 11A and FIG. 11B are a signaling exchange diagram of a packet transmission method according to another embodiment of this application. FIG. 11A and FIG. 11B are applicable to a dual connectivity (dual base station) scenario. In this scenario, high-reliability packet transmission is implemented through two paths between a master base station and a UPF and between a secondary base station and the UPF. As shown in FIG. 11A and FIG. 11B, the method includes step 1101 to step 1103 in an uplink direction and/or step 1111 to step 1113 in a downlink direction. The following is an example.

Step 1101. For the uplink direction of dual connectivities, UE generates a first uplink packet and a second uplink packet.

The first uplink packet and the second uplink packet have a same sequence number and a same service flow identifier. For example, the UE generates the first uplink packet and the second uplink packet according to the indication received from the master base station in step 305 or 308.

For example, the UE may first replicate an uplink packet, and then add a same sequence number and a same service flow identifier, or the UE may first add a sequence number and a service flow identifier to an uplink packet, and then replicate the uplink packet. Regardless of which manner, the first uplink packet and the second uplink packet that are generated by the UE have a same sequence number and a same service flow identifier.

Then, the UE sends the first uplink packet to the master base station, and sends the second uplink packet to the secondary base station.

Step 1102. After receiving the first uplink packet, the master base station determines that the first uplink packet corresponds to the dual base stations, and processes the first uplink packet. Similarly, after receiving the second uplink packet, the secondary base station determines that the second uplink packet corresponds to the dual base stations, and processes the second uplink packet.

For example, because the master base station determines to add the secondary base station in step S306, after receiving the first uplink packet, the master base station may learn that the first uplink packet corresponds to the dual base stations, and further perform conventional processing on the first uplink packet. After receiving the second uplink packet, the secondary base station as a second base station in the dual connectivities may learn that the second uplink packet corresponds to the dual base stations, and further perform conventional processing on the second uplink packet.

The conventional processing herein includes but is not limited to decapsulation at a physical layer, a layer 2, and the like, encapsulation at a GTP-U layer, a user datagram protocol (UDP)/an IP layer, and the like, and QoS management.

Then, the master base station sends the processed first uplink packet to the UPF through a first tunnel in dual tunnels. The secondary base station sends the processed second uplink packet to the UPF through a second tunnel in the dual tunnels.

Step 1103. After receiving the first uplink packet and the second uplink packet, the UPF deduplicates the first uplink packet and the second uplink packet according to a forwarding rule and based on the service flow identifier and the sequence number that are in the first uplink packet and the second uplink packet.

For example, the UPF deduplicates, according to the forwarding rule, the first uplink packet and the second uplink packet that have the same service flow identifier and the same sequence number.

It should be noted that, when there are no repeated sequence numbers of different service flows, for example, the UE sequentially adds a sequence number to a packet in a packet sequence, the UPF may further deduplicate, according to the forwarding rule, the first uplink packet and the second uplink packet that have the same sequence number.

Step 1111. For the downlink direction of the dual connectivities, the UPF generates a first downlink packet and a second downlink packet according to the forwarding rule.

For example, the UPF adds a sequence number and a service flow identifier to the downlink packets according to the forwarding rule. In other words, the first downlink packet and the second downlink packet that are generated by the UPF have the same sequence number and the same service flow identifier.

For example, the UPF may first replicate a downlink packet, and then add a same sequence number and a same service flow identifier to the downlink packets, or the UPF may first add a sequence number and a service flow identifier to a downlink packet, and then replicate the downlink packet.

Then, the UPF sends the first downlink packet to the master base station, and sends the second downlink packet to the secondary base station.

Step 1112. After receiving the first downlink packet, the master base station determines that the first downlink packet corresponds to the dual base stations, and processes the first downlink packet. Similarly, after receiving the second downlink packet, the secondary base station determines that the second downlink packet corresponds to the dual base stations, and processes the second downlink packet.

How the master base station determines that the first downlink packet corresponds to the dual base stations and how the secondary base station determines that the second downlink packet corresponds to the dual base stations are not described in detail again.

The processing in step 1112 includes but is not limited to decapsulation at the UDP/IP layer, the GTP-U layer, and the like, encapsulation at the layer 2, the physical layer, and the like, and QoS management.

Then, the master base station sends the processed first downlink packet to the UE. The secondary base station sends the processed second downlink packet to the UE. The first downlink packet and the second downlink packet include a same second service flow identifier and a same second sequence number.

Step 1113. After receiving the first downlink packet and the second downlink packet from the master base station and the secondary base station respectively, the UE deduplicates the first downlink packet and the second downlink packet according to the indication from the master base station and based on the service flow identifier and the sequence number that are in the first downlink packet and the second downlink packet. For example, the UE deduplicates, according to the indication received from the master base station in step 305 or 308, the first downlink packet and the second downlink packet that have the same service flow identifier and the same sequence number.

It should be noted that, when there are no repeated sequence numbers of different service flows, for example, the UPF sequentially adds a sequence number to a packet in a packet sequence, the UE may further deduplicate, according to the indication received from the master base station, the first downlink packet and the second downlink packet that have the same sequence number.

Then, the UE performs decapsulation at the physical layer, the layer 2, and the like, and transmits a decapsulated packet to an upper layer.

Figure 12A:
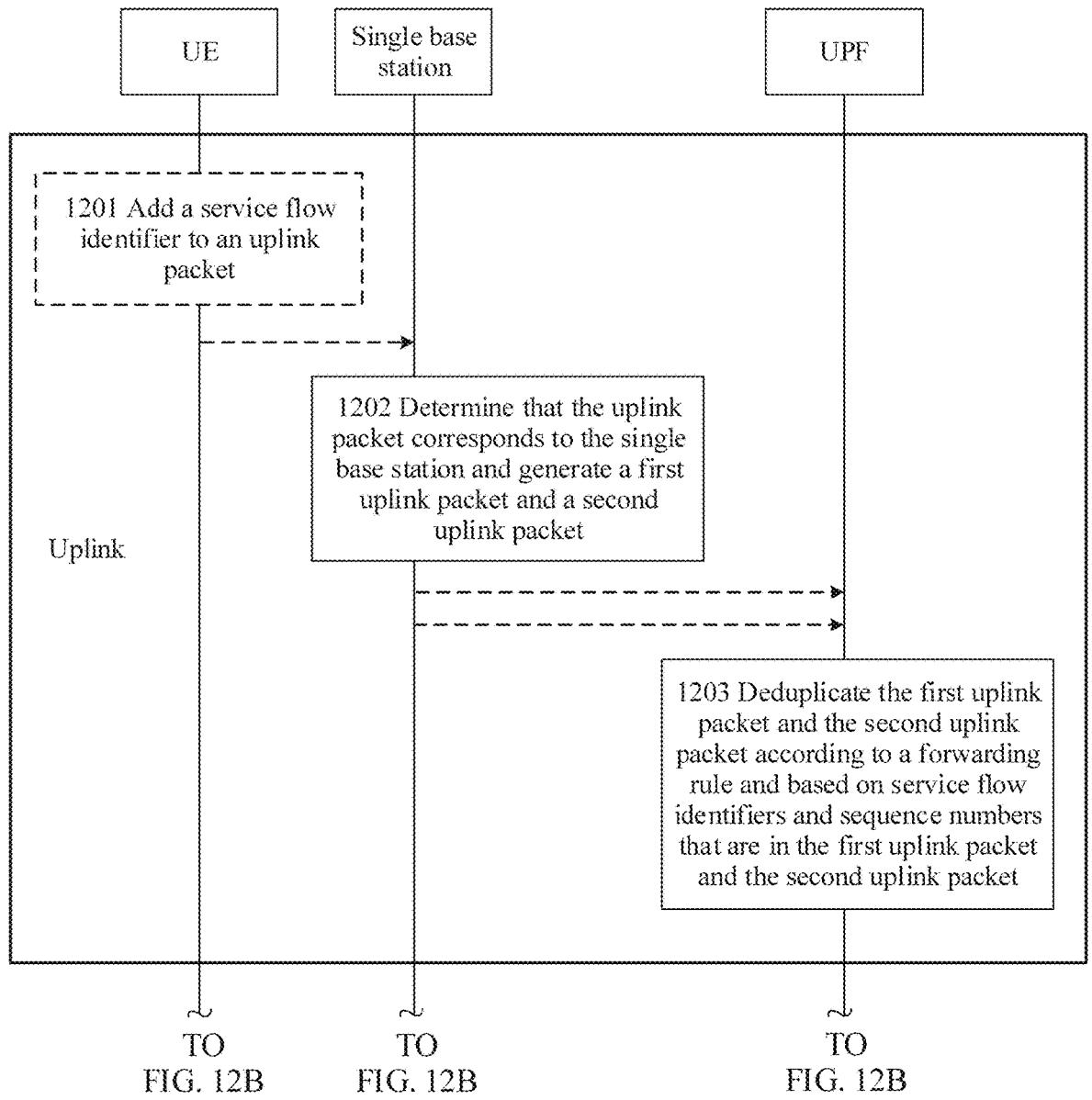
FIG. 12A and FIG. 12B are a signaling exchange diagram of a packet transmission method according to another embodiment of this application.
Figure 12B:
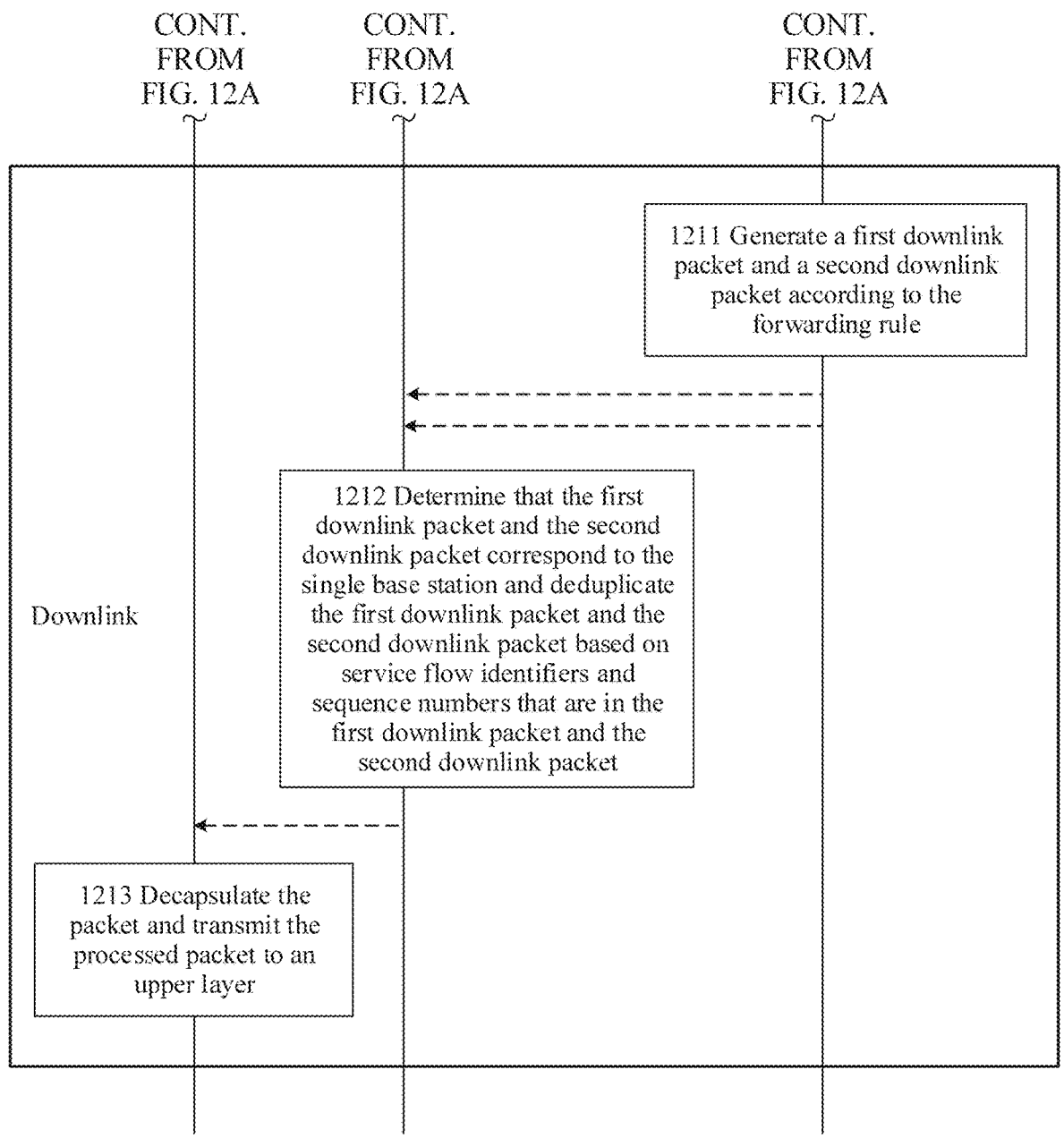

FIG. 12A and FIG. 12B are a signaling exchange diagram of a packet transmission method according to another embodiment of this application. FIG. 12A and FIG. 12B are applicable to a single connectivity (single base station) scenario. In this scenario, high-reliability packet transmission is implemented through two paths between the single base station and a UPF. As shown in FIG. 12A and FIG. 12B, the method includes step 1201 to step 1203 in an uplink direction and/or step 1211 to step 1213 in a downlink direction. The following is an example.

Step 1201. For the uplink direction of a single connectivity, UE adds a service flow identifier to an uplink packet.

Then, the UE sends the uplink packet to the base station.

Step 1202. After receiving the uplink packet, the base station determines that the uplink packet corresponds to the single base station, generates a first uplink packet and a second uplink packet, and processes the first uplink packet and the second uplink packet.

For example, if the base station determines, in the foregoing step procedure, not to add a secondary base station, the base station may learn, after receiving the uplink packet, that the uplink packet corresponds to the single base station, further generate the first uplink packet and the second uplink packet, and process the first uplink packet and the second uplink packet.

For example, the base station may first replicate an uplink packet, and then add a same sequence number and a same service flow identifier to the uplink packets, or the base station may first add a sequence number and a service flow identifier to an uplink packet, and then replicate the uplink packet. Regardless of which manner, the first uplink packet and the second uplink packet that are generated by the base station have a same sequence number and a same service flow identifier.

The processing herein includes but is not limited to decapsulation at a physical layer, a layer 2, and the like, encapsulation at a GTP-U layer, a UDP/an IP layer, and the like, and QoS management.

Then, the base station sends the processed first uplink packet to the UPF through a first tunnel in dual tunnels, and sends the processed second uplink packet to the UPF through a second tunnel in the dual tunnels.

Step 1203. After receiving the first uplink packet and the second uplink packet, the UPF deduplicates the first uplink packet and the second uplink packet according to a forwarding rule and based on the service flow identifier and the sequence number that are in the first uplink packet and the second uplink packet.

For example, the UPF deduplicates, according to the forwarding rule, the first uplink packet and the second uplink packet that have the same service flow identifier and the same sequence number.

It should be noted that, when there are no repeated sequence numbers of different service flows, for example, the base station sequentially adds a sequence number to a packet in a packet sequence, the UPF may further deduplicate, according to the forwarding rule, the first uplink packet and the second uplink packet that have the same sequence number.

Step 1211. For the downlink direction of the single connectivity, the UPF generates a first downlink packet and a second downlink packet according to the forwarding rule.

For step 1211, refer to the descriptions of step 1111. Details are not described herein again.

Then, the UPF sends the first downlink packet and the second downlink packet to the base station through the first tunnel and the second tunnel respectively.

Step 1212. After receiving the first downlink packet and the second downlink packet, the base station determines that the first downlink packet and the second downlink packet correspond to the single base station, deduplicates the first downlink packet and the second downlink packet according to an indication of the base station and based on the service flow identifier and the sequence number that are in the first downlink packet and the second downlink packet, and processes the deduplicated downlink packet.

How the base station determines that the first downlink packet and the second downlink packet correspond to the single base station is not described in detail again.

For example, the base station deduplicates the first downlink packet and the second downlink packet based on the service flow identifier and the sequence number that are in the first downlink packet and the second downlink packet. For example, the base station deduplicates the first downlink packet and the second downlink packet that have the same service flow identifier and the same sequence number.

It should be noted that, when there are no repeated sequence numbers of different service flows, for example, the UPF sequentially adds a sequence number to a packet in a packet sequence, the base station deduplicates the first downlink packet and the second downlink packet that have the same sequence number.

Subsequent processing includes but is not limited to decapsulation at the UDP/IP layer, the GTP-U layer, and the like, encapsulation at the layer 2, the physical layer, and the like, and QoS management.

Then, the base station sends the processed downlink packet to the UE.

Step 1213. After receiving the downlink packet from the base station, the UE performs decapsulation at the physical layer, the layer 2, and the like, and transmits a decapsulated packet to an upper layer.

Figure 15A:
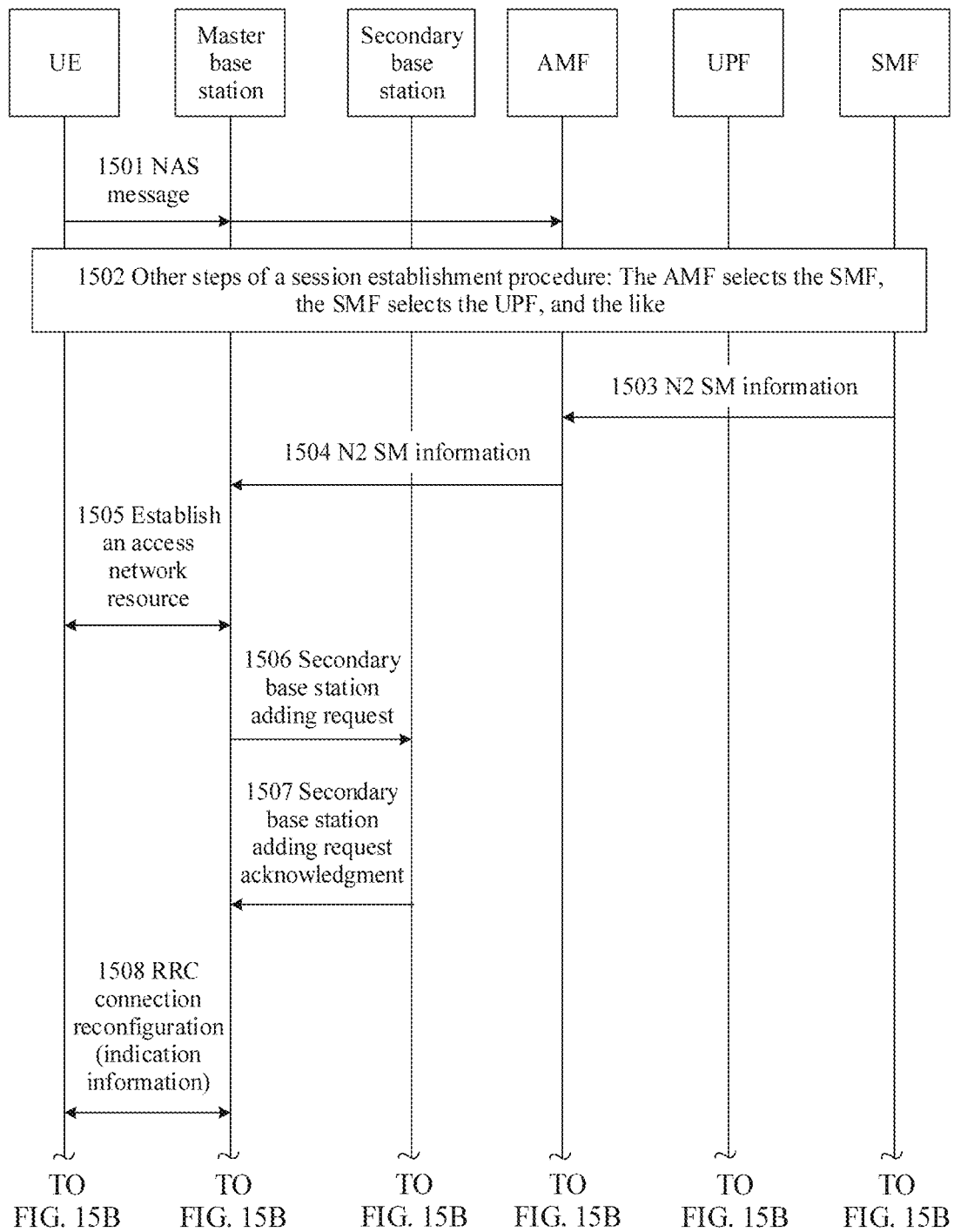
FIG. 15A and FIG. 15B are a signaling exchange diagram of a packet transmission method according to another embodiment of this application, where the method is applicable to a solution for enhancing a PDCP layer.
Figure 15B:
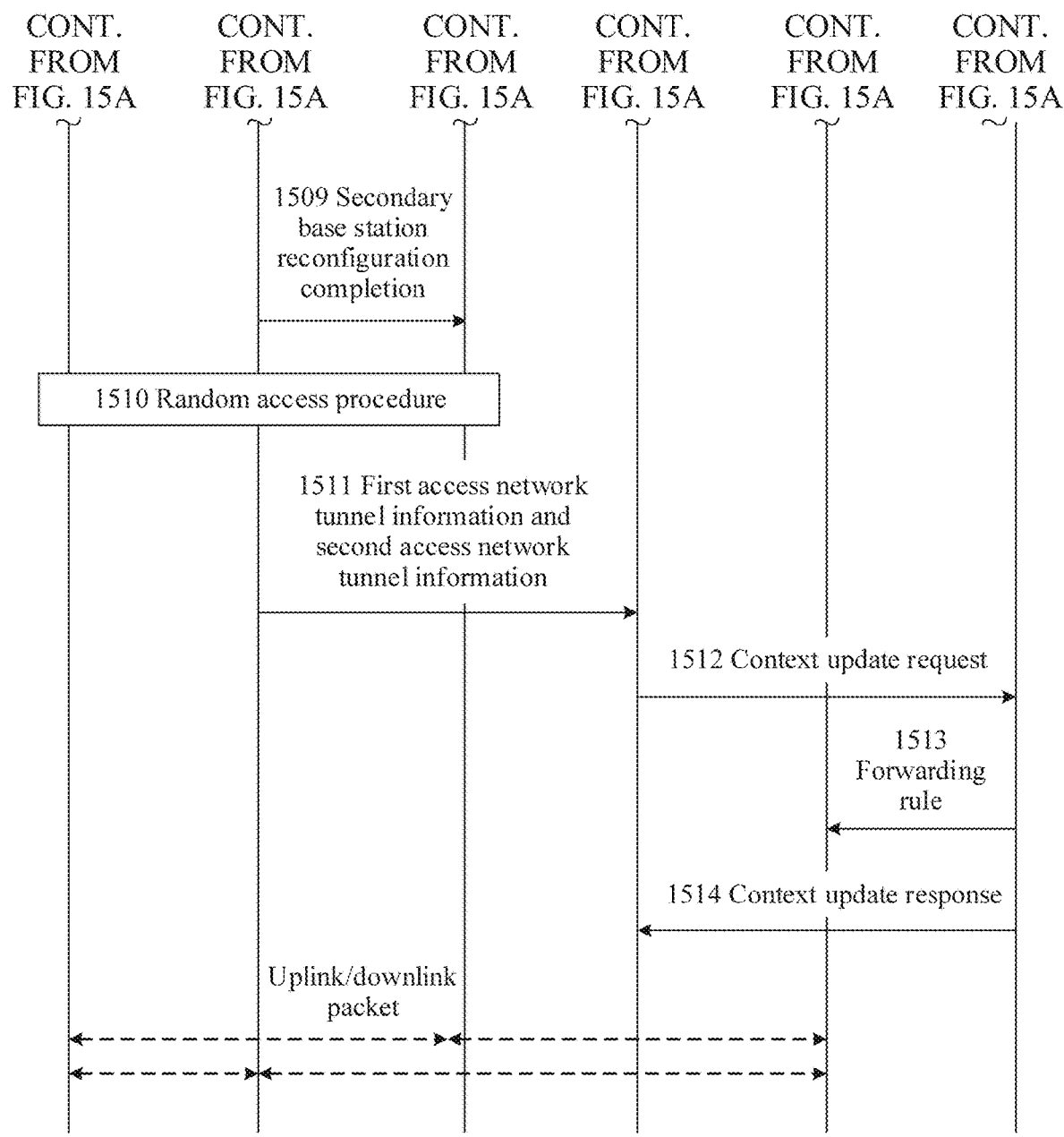

FIG. 15A and FIG. 15B are a signaling exchange diagram of another packet transmission method according to an embodiment of this application. FIG. 15A and FIG. 15B relate to interaction between UE, a master base station, a secondary base station, an AMF, an SMF, and a UPF. For example, the UE, the master base station, the secondary base station, the AMF, the SMF, and the UPF may be respectively the UE 201, the M-RAN 202, the S-RAN 203, the AMF 204, the SMF 205, and the UPF 206 in FIG. 2. FIG. 15A and FIG. 15B are described with reference to FIG. 3A and FIG. 3B.

For example, FIG. 15A and FIG. 15B are applicable to a case in which in an uplink direction, a PDCP layer of the UE is enhanced, and a packet can be replicated at the enhanced PDCP layer, in a downlink direction, the UPF can replicate a packet at a GTP-U layer such that dual-path packet transmission is implemented and packet transmission reliability is improved.

As shown in FIG. 15A and FIG. 15B, the method includes the following steps.

Step 1501. The UE sends, to the AMF via the master base station, a NAS message that carries a session establishment request, to request to establish a PDU session for the UE.

Step 1502. Other steps of a session establishment procedure are performed.

For example, the foregoing other steps include at least the AMF selects the SMF, and the SMF selects the UPF. Details are not described herein.

Step 1503. The SMF transmits N2 SM information to the AMF.

Step 1504. The AMF sends the N2 SM information to the master base station.

For step 1501 to step 1504, refer to the descriptions of step 301 to step 304 in FIG. 3A and FIG. 3B. Details are not described herein again.

Step 1505. The master base station initiates establishment of an access network resource between the master base station and the UE.

In other words, the master base station initiates establishment of a first radio bearer between the master base station and the UE. For example, the first radio bearer is a first data radio bearer (DRB), which is referred to as a DRB 1 for short below. In this step, the master base station sends identification information of the DRB 1 to the UE. The DRB 1 between the master base station and the UE is established through this step.

Step 1506. The master base station determines to add the secondary base station, and sends a secondary base station adding request to the secondary base station.

The master base station may determine, based on indication information, to transmit an uplink packet of a first service through dual paths, to determine that the secondary base station needs to be added. The first service includes a URLLC service. For example, any one or a combination of a QoS parameter, slice identification information, a DNN, and first core network tunnel information and second core network tunnel information that are included in the N2 SM information may be used as the indication information. The QoS parameter includes at least one of a 5QI and a QFI. For example, if the master base station determines, based on the QoS parameter in the N2 SM information, that the session requires high reliability, the master base station determines to add the secondary base station, or if the master base station determines, based on the slice identification information in the N2 SM information, that the session is associated with a slice in URLLC, the master base station determines to add the secondary base station, or if the master base station determines, based on the DNN in the N2 SM information, that the session is associated with a DN in URLLC, the master base station determines to add the secondary base station, or if the master base station directly determines, based on the first core network tunnel information and the second core network tunnel information in the N2 SM information, to transmit the uplink packet through the dual paths, the master base station determines to add the secondary base station. Because the first access network tunnel information and the second access network tunnel information need to be used for transmission of the downlink packet through the dual paths, it may further be considered that the indication information triggers determining of the first access network tunnel information and the second access network tunnel information. The first access network tunnel information may be determined by the master base station, and the second access network tunnel information may be determined by the secondary base station and sent to the master base station.

For details about the first access network tunnel information and the second access network tunnel information, refer to the descriptions of FIG. 3A and FIG. 3B. Details are not described herein again.

Step 1507. The secondary base station returns a secondary base station adding request acknowledgment to the master base station.

For example, the secondary base station adding request acknowledgment includes the second access network tunnel information determined by the secondary base station.

Optionally, if the first service is at a session granularity, the secondary base station adding request sent in step 1506 includes a session identifier of the first service. Therefore, the second access network tunnel information determined by the secondary base station is also at the session granularity and corresponds to the session identifier. If the first service is at a service flow granularity, the secondary base station adding request sent in step 1506 includes a service flow identifier (for example, a QFI) of a service flow of the first service. Therefore, the second access network tunnel information determined by the secondary base station is also at the service flow granularity and corresponds to the service flow identifier. From a perspective of a protocol stack, the master base station generates a PDCP entity for the service flow. Therefore, the service flow is associated with the PDCP entity. If the master base station determines to add the secondary base station, the secondary base station also generates a PDCP entity for the service flow.

Step 1508. The master base station initiates RRC connection reconfiguration to the UE.

In other words, the master base station initiates establishment of a second radio bearer between the secondary base station and the UE. For example, the second radio bearer is a DRB 2. In this step, the master base station sends identification information of the DRB 2 to the UE. The DRB 2 between the secondary base station and the UE is established through this step.

In step 1508, the master base station sends indication information to the UE, and the indication information indicates the UE to associate the first radio bearer and the second radio bearer with a same PDCP entity on the UE. That is, the first radio bearer and the second radio bearer are associated with each other. In other words, the master base station sends the indication information to the UE using an RRC message. Specifically, the indication information may be a new information element, or may be an identifier of the DRB 1, or may be another information element. This is not limited in this application.

The indication information indicates the UE to associate the first radio bearer and the second radio bearer with the same PDCP entity on the UE. It may also be understood that after receiving the indication information, the UE replicates an uplink packet at a PDCP layer (in an embodiment, adds a same sequence number at the PDCP layer), to obtain a first uplink packet and a second uplink packet, and then send the first uplink packet and the second uplink packet over two different radio bearers (for example, the DRB 1 and the DRB 2) associated with the PDCP entity respectively.

Step 1509. The master base station feeds back secondary base station reconfiguration completion to the secondary base station, to notify the secondary base station that the UE successfully completes the RRC connection reconfiguration.

Optionally, if the secondary base station has an RRC function, the foregoing step 1507 to step 1509 may be replaced with the following steps.

1507'. The secondary base station initiates an RRC connection establishment process to the UE.

In other words, the secondary base station initiates establishment of a second radio bearer between the secondary base station and the UE. For example, the second radio bearer is a DRB 2. The DRB 2 between the secondary base station and the UE is established through this step.

In step 1507', the secondary base station sends indication information to the UE, and the indication information indicates the UE to associate the first radio bearer and the second radio bearer with a same PDCP entity on the UE. That is, the first radio bearer and the second radio bearer are associated with each other. In other words, the secondary base station sends the indication information to the UE using an RRC message. Specifically, the indication information may be a newly added information element, or may be an identifier of the DRB 1, or may be another information element. This is not limited in this application. Therefore, the indication information indicating the UE to associate the first radio bearer and the second radio bearer with the same PDCP entity on the UE may be sent by the master base station to the UE, or may be sent by the secondary base station to the UE. This is not limited in this application.

1508'. The secondary base station returns a secondary base station adding request acknowledgment to the master base station. For details, refer to the descriptions of step 1507. Details are not described again.

Step 1510. Random access procedure is performed.

Optionally, in another embodiment, the master base station may determine, before step 1505, whether the secondary base station needs to be added. For how the master base station determines whether a secondary base station needs to be added, refer to the descriptions of step 1506. Details are not described herein again. If the master base station determines to add the secondary base station (in an embodiment, transmit a packet in a dual connectivity manner), the master base station may send, to the UE through step 1508 or step 1507', the indication information for associating the two DRBs with one PDCP entity.

It may be understood that the UE may process the uplink packet in various manners, and a plurality of processed uplink packets have a same sequence number. For example, the UE may first add a sequence number to a first uplink packet, and then replicate the first uplink packet to which the sequence number is added, to obtain a second uplink packet having the same sequence number, or the UE may first replicate a first uplink packet to obtain a second uplink packet, and then add a same sequence number to the first uplink packet and the second uplink packet. This is not limited in this application.

Optionally, the master base station further indicates the UE to deduplicate received downlink packets that have a same sequence number and correspond to a same service flow identifier.

Optionally, in still another embodiment, the N2 SM information transmitted in the foregoing step 1503 and step 1504 further includes indication information, and the indication information indicates the base station (namely, the master base station) to send, to the UE, the indication information for associating the first radio bearer and the second radio bearer with the same PDCP entity on the UE. For example, when the SMF determines, based on the QFI in the N2 SM information sent by the UE to the SMF, that the session requires high reliability, and/or determines, based on the slice identification information in the N2 SM information, that the session is associated with a slice in URLLC, and/or determines, based on the DNN in the N2 SM information, that the session is associated with a DN in URLLC, and/or determines, based on subscription data of the UE, that the UE is UE in URLLC, the SMF sends the indication information to the base station, and after the base station receives the indication information, the base station sends, to the UE, the indication information for associating the first radio bearer and the second radio bearer with the same PDCP entity on the UE. In this way, the base station may not perform determining, thereby simplifying an operation on a base station side.

Step 1511. The master base station sends the first access network tunnel information and the second access network tunnel information to the AMF.

Step 1512. The AMF sends a context update request to the SMF.

Step 1513. The SMF sends a downlink forwarding rule to the UPF.

Step 1514. The SMF sends a context update response to the AMF.

For step 1511 to step 1514, refer to the descriptions of step 311 to step 314 in FIG. 3A and FIG. 3B. Details are not described herein again.

Then, the UE may generate a first packet and a second packet based on the indication information, where the first packet and the second packet have a same sequence number. The UE sends the first packet to the master base station over the first radio bearer, and sends the second packet to the secondary base station over the second radio bearer. For example, the UE replicates a packet at the PDCP layer based on the indication information, to obtain the first packet and the second packet. In addition, the UE may deduplicate, based on the indication information, the downlink packets that are from the first radio bearer and the second radio bearer and that have the same sequence number.

Therefore, according to the packet transmission method in this embodiment of the present disclosure, the uplink packet of the first service (for example, the URLLC service) may be transmitted through the two paths. Similarly, the method in this embodiment of this application may further be used to transmit the uplink packet of the first service through a plurality of (more than two) paths. Details are not described again. Therefore, reliability of packet transmission of the URLLC service is improved.

Figure 16:
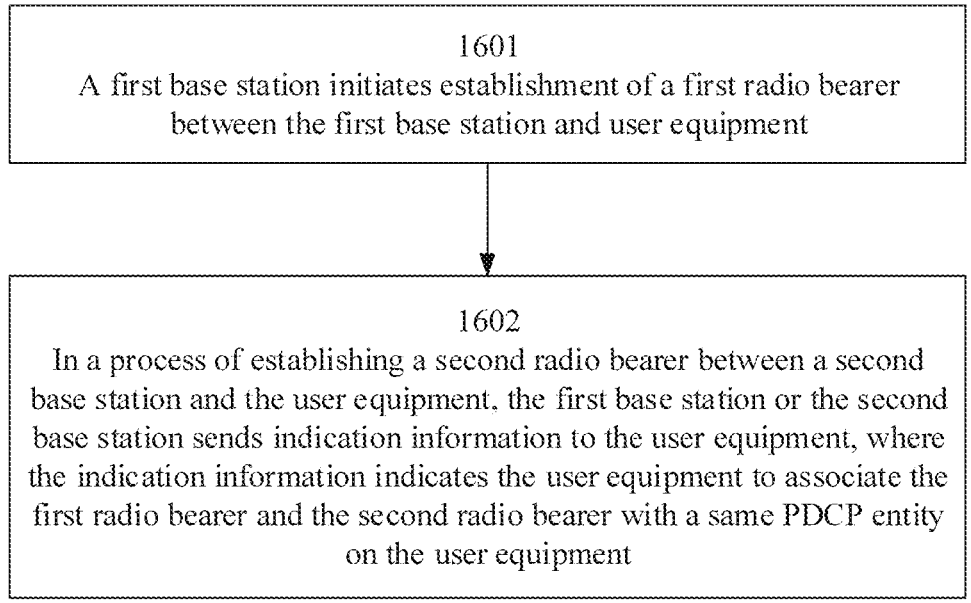
FIG. 16 is a flowchart of a packet transmission method on a base station side according to another embodiment of this application.

With reference to the descriptions of FIG. 15A and FIG. 15B, an embodiment of this application provides a packet transmission method. As shown in FIG. 16, the method includes the following steps.

Step 1601. A first base station initiates establishment of a first radio bearer between the first base station and UE.

For example, the first base station may be the master base station in FIG. 15A and FIG. 15B, and the first radio bearer may be the DRB 1. For step 1601, refer to the descriptions of step 1505 in FIG. 15A and FIG. 15B. Details are not described again.

Step 1602. In a process of establishing a second radio bearer between a second base station and the UE, the first base station or the second base station sends indication information to the UE, where the indication information indicates the UE to associate the first radio bearer and the second radio bearer with a same PDCP entity on the UE.

For example, the first base station or the second base station sends the indication information to the UE using an RRC layer message.

For example, the second base station may be the secondary base station in FIG. 15A and FIG. 15B, and the second radio bearer may be the DRB 2. For step 1602, refer to the descriptions of step 1508 or 1507' in FIG. 15A and FIG. 15B. Details are not described again.

According to the foregoing method, after receiving the indication information, the UE replicates a packet at a PDCP layer (in an embodiment, adds a same sequence number at the PDCP layer), to obtain a first uplink packet and a second uplink packet, and then sends the first uplink packet and the second uplink packet over two different radio bearers (for example, the DRB 1 and the DRB 2) associated with the PDCP entity respectively. Therefore, according to the packet transmission method in this embodiment of the present disclosure, an uplink packet of a first service (for example, a URLLC service) may be transmitted through two paths. Similarly, the method in this embodiment of this application may further be used to transmit the uplink packet of the first service through a plurality of (more than two) paths. Details are not described again. Therefore, reliability of packet transmission of the URLLC service is improved.

Figure 17:
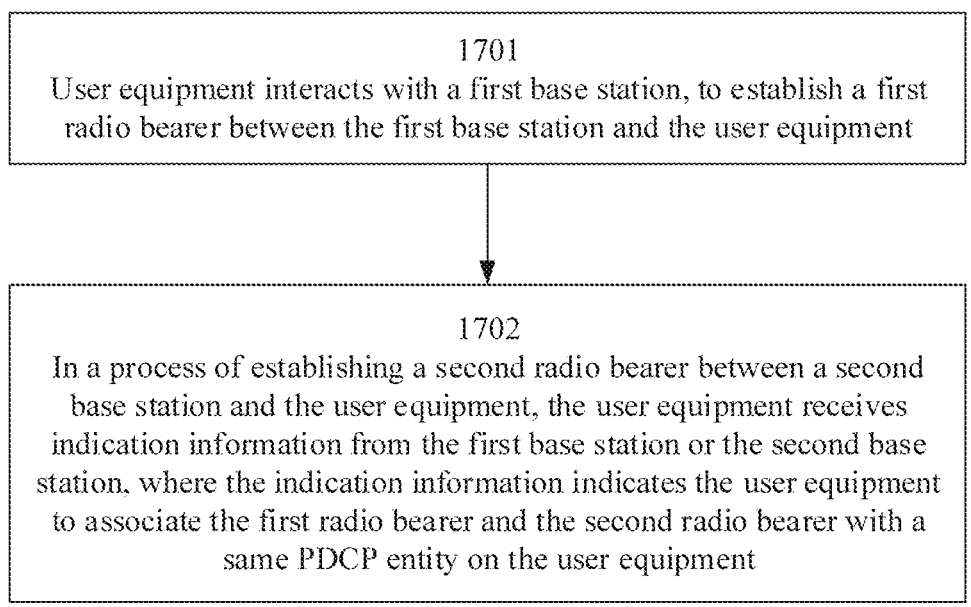
FIG. 17 is a flowchart of a packet transmission method on a UE side according to another embodiment of this application.

With reference to the descriptions of FIG. 15A and FIG. 15B, an embodiment of this application provides a packet transmission method. As shown in FIG. 17, the method includes the following steps.

Step 1701. UE interacts with a first base station, to establish a first radio bearer between the first base station and the UE.

For example, the first base station may be the master base station in FIG. 15A and FIG. 15B, and the first radio bearer may be the DRB 1. For step 1701, refer to the descriptions of step 1505 in FIG. 15A and FIG. 15B. Details are not described again.

Step 1702. In a process of establishing a second radio bearer between a second base station and the UE, the UE receives indication information from the first base station or the second base station, where the indication information indicates the UE to associate the first radio bearer and the second radio bearer with a same PDCP entity on the UE.

For example, the second base station may be the secondary base station in FIG. 15A and FIG. 15B, and the second radio bearer may be the DRB 2. For step 1702, refer to the descriptions of step 1508 or 11507' in FIG. 15A and FIG. 15B. Details are not described again.

That is, the UE receives the indication information from the first base station or the second base station using an RRC layer message.

Step 1703. The UE generates a first packet and a second packet based on the indication information, where the first packet and the second packet have a same sequence number.

For example, the UE replicates a packet at a PDCP layer based on the indication information, to obtain the first packet and the second packet.

Step 1704. The UE sends the first packet to the first base station over the first radio bearer, and sends the second packet to the second base station over the second radio bearer.

According to the foregoing method, after receiving the indication information, the UE replicates an uplink packet at the PDCP layer (in an embodiment, adds a same sequence number at the PDCP layer), to obtain a first uplink packet and a second uplink packet, sends the first uplink packet and the second uplink packet over two different radio bearers (for example, the DRB 1 and the DRB 2) associated with the PDCP entity respectively, and deduplicates, at the PDCP layer, downlink packets that are from the DRB 1 and the DRB 2 and that have a same sequence number. Therefore, according to the packet transmission method in this embodiment of the present disclosure, an uplink packet of a first service (for example, a URLLC service) may be transmitted through two paths. Similarly, the method in this embodiment of this application may further be used to transmit the uplink packet of the first service through a plurality of (more than two) paths. Details are not described again. Therefore, reliability of packet transmission of the URLLC service is improved.

Figure 18A:
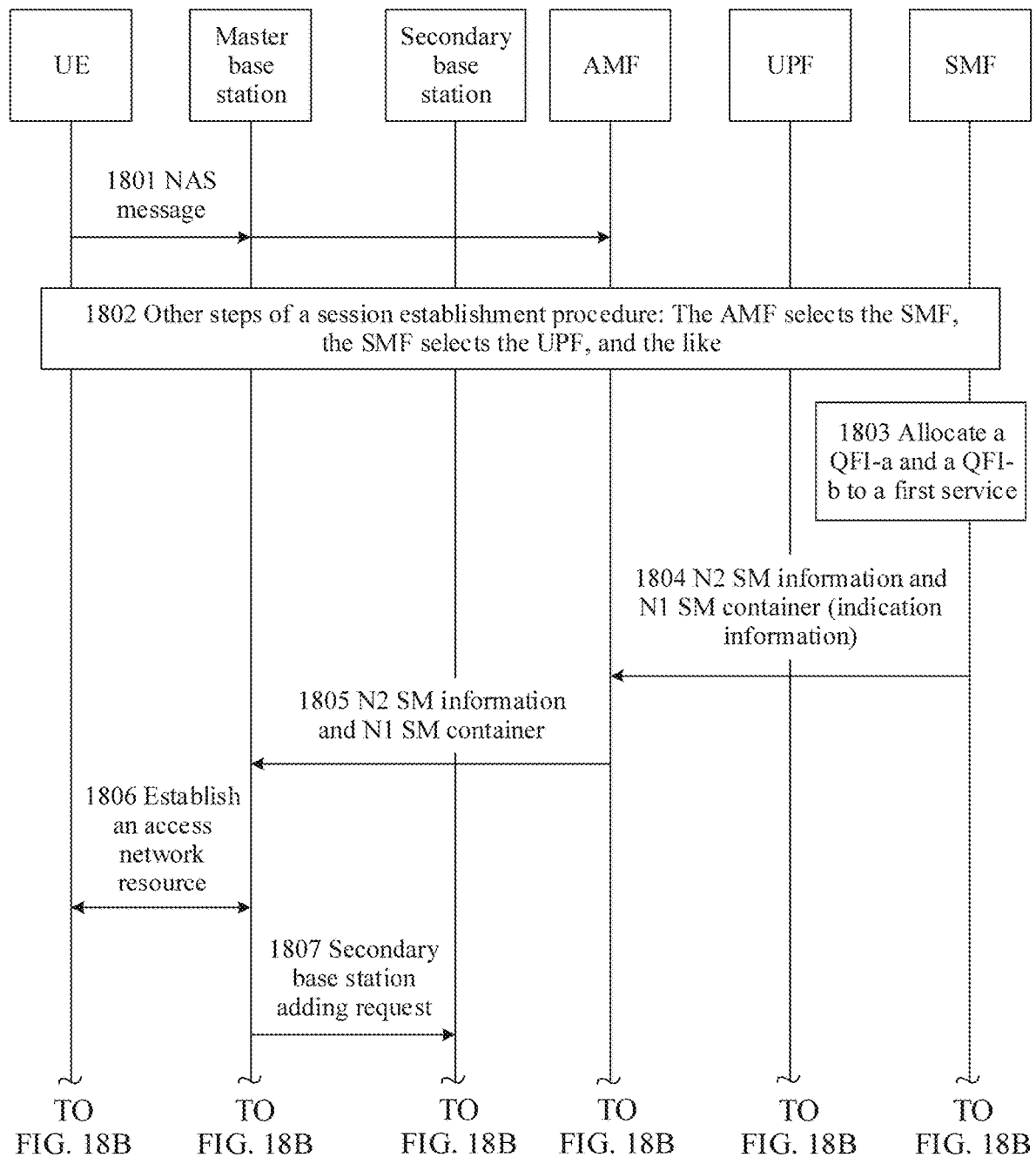
FIG. 18A and FIG. 18B are a signaling exchange diagram of a packet transmission method according to another embodiment of this application, where the method is applicable to a solution for an HRP layer.
Figure 18B:
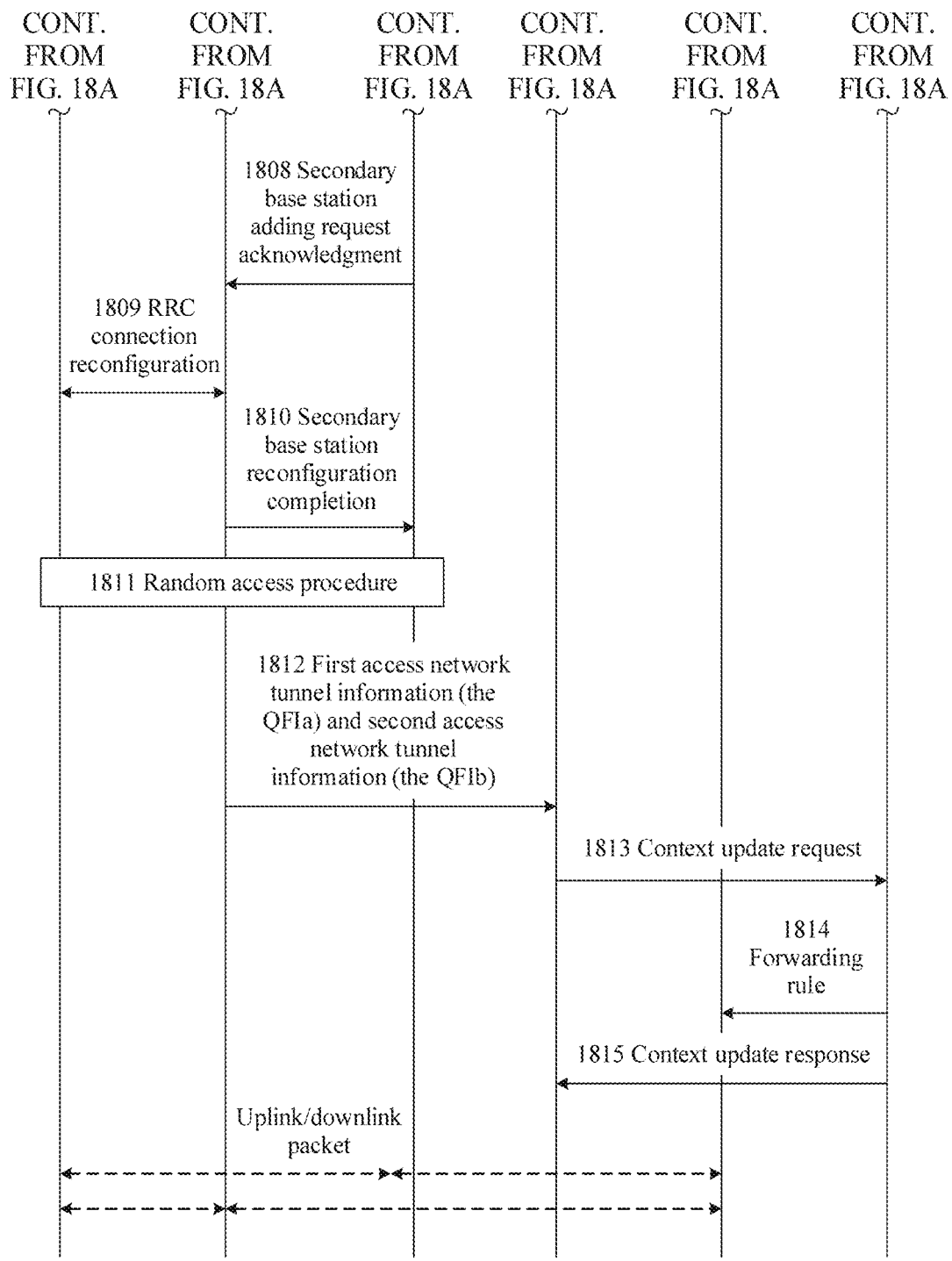

FIG. 18A and FIG. 18B are a signaling exchange diagram of another packet transmission method according to an embodiment of this application. FIG. 18A and FIG. 18B relate to interaction between UE, a master base station, a secondary base station, an AMF, an SMF, and a UPF. For example, the UE, the master base station, the secondary base station, the AMF, the SMF, and the UPF may be respectively the UE 201, the M-RAN 202, the S-RAN 203, the AMF 204, the SMF 205, and the UPF 206 in FIG. 2. FIG. 18A and FIG. 18B are described with reference to FIG. 3A and FIG. 3B.

For example, FIG. 18A and FIG. 18B are applicable to a case in which in an uplink direction, the UE replicates a packet at a new protocol layer above an SDAP layer, in a downlink direction, the UPF replicates a packet at a new protocol layer on a GTP-U layer such that dual-path packet transmission is implemented and packet transmission reliability is improved. For example, the new protocol layer may be referred to as a HRP layer.

As shown in FIG. 18A and FIG. 18B, the method includes the following steps.

Step 1801. The UE sends, to the AMF via the master base station, a NAS message that carries a session establishment request, to request to establish a PDU session for the UE.

Step 1802. Other steps of a session establishment procedure are performed.

For example, the foregoing other steps include at least the AMF selects the SMF, and the SMF selects the UPF. Details are not described herein.

For step 1801 and step 1802, refer to the descriptions of step 301 and step 302 in FIG. 3A and FIG. 3B. Details are not described herein again.

Step 1803. The SMF allocates, to a first service, two service flow identifiers, namely, a first service flow identifier and a second service flow identifier. The first service includes a URLLC service. The service flow identifier may include at least one of a session identifier, a QFI, and a 5-tuple. For example, the two service flow identifiers are respectively a QFI-a and a QFI-b.

Step 1804. The SMF transmits N2 SM information and an N1 SM container to the AMF.

For example, the SMF sends the N2 SM information to the AMF by invoking an N1N2 message transfer service of the AMF. In addition, the SMF may further send, to the AMF by invoking the service, the N1 SM container including a session accept message.

Step 1805. The AMF sends the received N2 SM information and the received N1 SM container to the master base station.

For example, the AMF sends an N2 session request to the master base station, and the N2 session request includes the N2 SM information and a NAS message. The NAS message includes the PDU session identifier and the N1 SM container. The master base station sends the NAS message to the UE in a process of establishing an access network resource.

The N1 SM container includes the session accept message to be sent to the UE. The session accept message includes a QoS rule. For example, the QoS rule includes a QoS rule identifier, the first service flow identifier, the second service flow identifier, a packet filter, and indication information.

The N2 SM information includes at least the PDU session identifier and core network tunnel information. The core network tunnel information includes first core network tunnel information and second core network tunnel information. For details, refer to the descriptions of FIG. 3A and FIG. 3B. Details are not described herein again. The N2 SM information may further include a QoS parameter, the QFI-a, the QFI-b, slice identification information (for example, S-NSSAI), a session-AMBR, and a PDU session type. Optionally, the N2 SM information may further include a DNN.

The UE may receive the indication information using the N1 SM container. In the uplink direction, the UE may generate a first uplink packet and a second uplink packet based on the indication information, send the first uplink packet over a first radio bearer, and send the second uplink packet over a second radio bearer. In addition, the first uplink packet and the second uplink packet have a same first sequence number. The first radio bearer corresponds to the QFI-a, and the second radio bearer corresponds to the QFI-b. That the UE sends the first uplink packet over the first radio bearer may also be described as that the UE sends the first uplink packet over a radio bearer corresponding to the QFI-a. That the UE sends the second uplink packet over the second radio bearer may also be described as that the UE sends the second uplink packet over a radio bearer corresponding to the QFI-b. For example, the indication information indicates the UE to replicate an uplink packet to obtain the first uplink packet and the second uplink packet, and send the first uplink packet and the second uplink packet over different radio bearers. In addition, in the downlink direction, the UE may deduplicate, based on the indication information, downlink packets that are from the first radio bearer and the second radio bearer and that have a same sequence number. It may alternatively be described as follows. The UE performs the following operation on downlink packet from the radio bearer corresponding to the QFI-a and the downlink packet from the radio bearer corresponding to the QFI-b, if the downlink packets have a same sequence number, deduplicating the downlink packets.

For example, the UE determines, using the packet filter, packets corresponding to the QFI-a and the QFI-b, and replicates the packets at the HRP layer based on the indication information. The replicated uplink packets have a same sequence number and respectively correspond to the QFI-a and the QFI-b such that the first uplink packet corresponding to the QFI-a and the second uplink packet corresponding to the QFI-b are obtained. Then, the first uplink packet and the second uplink packet are transmitted to the SDAP layer. The UE sends, at the SDAP layer based on a correspondence between a QFI and a PDCP entity, the first uplink packet to a PDCP entity 1, and sends the second uplink packet to a PDCP entity 2, where the PDCP entity 1 corresponds to the QFI-a, and the PDCP entity 2 corresponds to the QFI-b. Similarly, after the first uplink packet and the second uplink packet are processed at another protocol layer such as a radio link control (RLC) layer or a physical layer, the UE sends the first uplink packet to the M-RAN over the DRB 1, and sends the second uplink packet to the S-RAN over the DRB 2. The DRB 1 corresponds to the PDCP entity 1, and the DRB 2 corresponds to the PDCP entity 2. After receiving the two uplink packets over the DRB 1 and the DRB 2 respectively, the master base station and the secondary base station add QFIs to the uplink packets based on a correspondence between a DRB and a QFI or based on QFIs carried in headers of the uplink packets. Specifically, the master base station adds the QFI-a to the first uplink packet, the secondary base station adds the QFI-b to the second uplink packet, and the master base station and the secondary base station send the uplink packets to the UPF. Therefore, the UPF receives the first uplink packet and the second uplink packet, and the first uplink packet and the second uplink packet respectively have the QFI-a and the QFI-b and have the same sequence number.

It should be noted that, another implementation of determining, by the UE using the packet filter, packets corresponding to the QFI-a and the QFI-b is that the UE determines, using the packet filter, a QFI (which may be the QFI-a or the QFI-b) corresponding to a packet. Because the QFI-a and the QFI-b are two service flow identifiers allocated by the SMF to a same service, it may be understood that the QFI-a and the QFI-b are associated such that the UE replicates an uplink packet based on the indication information, where one uplink packet corresponds to the QFI-a, and the other uplink packet corresponds to the QFI-b.

In other words, the first uplink packet sent by the UE corresponds to the QFI-a, the second uplink packet sent by the UE corresponds to the QFI-b, and the first uplink packet and the second uplink packet have the same sequence number. The first uplink packet received by the UPF includes the QFI-a, the second uplink packet received by the UPF includes the QFI-b, and the first uplink packet and the second uplink packet have the same sequence number. The sequence numbers and the service flow identifiers of the first uplink packet and the second uplink packet that are received by the UPF may be at different protocol layers. For example, the sequence number is at the HRP layer, and the service flow identifier is at the GTP-U layer.

In a possible implementation, the indication information sent by the SMF to the UE may indicate that the first uplink packet corresponds to the QFI-a, and the second uplink packet corresponds to the QFI-b. In another possible implementation, the UE may further add the QFI-a to the first uplink packet and add the QFI-b to the second uplink packet at the HRP layer. Further, the indication information sent by the SMF to the UE may indicate the UE to add the QFI-a to the first uplink packet and add the QFI-b to the second uplink packet.

It may also be understood that the UE associates the first uplink packet and the second uplink packet that are obtained after the replication with different DRBs, PDCP entities, or SDAP configurations. One PDCP entity or SDAP configuration corresponds to one DRB (for example, the DRB 1), and the other PDCP entity or SDAP configuration corresponds to the other DRB (for example, the DRB 2). The SDAP configuration is a parameter at a radio bearer granularity (namely, a DRB granularity), and is allocated by an access network side based on the bearer granularity and sent to the UE in an RRC reconfiguration process.

In addition, in the downlink direction, when the UE receives a first downlink packet and a second downlink packet from the master base station and the secondary base station respectively, where the first downlink packet and the second downlink packet have a same sequence number and respectively correspond to the QFI-a and the QFI-b, the UE deduplicates the first downlink packet and the second downlink packet based on the indication information. Therefore, further, optionally, the indication information sent by the SMF to the UE may further indicate the UE to deduplicate the first downlink packet and the second downlink packet. The first downlink packet and the second downlink packet have the same sequence number, and are respectively associated with the QFI-a and the QFI-b.

Step 1806. The master base station initiates establishment of the access network resource between the master base station and the UE.

In other words, the master base station initiates establishment of the first radio bearer between the master base station and the UE. For example, the first radio bearer is the DRB 1. In this step, the master base station sends identification information of the DRB 1 to the UE. The DRB 1 between the master base station and the UE is established through this step. In addition, in this step, the master base station forwards the NAS message in step 1805 to the UE.

Step 1807. The master base station determines to add the secondary base station, and sends a secondary base station adding request to the secondary base station.

The master base station may determine, based on the indication information, to transmit the uplink packet of the first service through dual paths, to determine that the secondary base station needs to be added. The first service includes the URLLC service. For example, any one or a combination of the QoS parameter, the slice identification information, the DNN, and the first core network tunnel information and the second core network tunnel information that are included in the N2 SM information may be used as the indication information. The QoS parameter includes at least one of a 5QI and a QFI. Because the first access network tunnel information and the second access network tunnel information need to be used for transmission of the downlink packet through the dual paths, it may further be considered that the indication information triggers determining of the first access network tunnel information and the second access network tunnel information. The first access network tunnel information may be determined by the master base station, and the second access network tunnel information may be determined by the secondary base station and sent to the master base station.

For details about the first access network tunnel information and the second access network tunnel information, refer to the descriptions of FIG. 3A and FIG. 3B. Details are not described herein again.

In this step, the secondary base station adding request carries the QFI-b and the second core network tunnel information.

Step 1808. The secondary base station returns a secondary base station adding request acknowledgment to the master base station.

For example, the secondary base station adding request acknowledgment includes the second access network tunnel information determined by the secondary base station.

In other words, the secondary base station adding request sent in step 1807 includes the service flow identifier QFI-b of the first service. Therefore, the second access network tunnel information determined by the secondary base station is also at a service flow granularity and corresponds to the QFI-b. From a perspective of a protocol stack, if the master base station determines to add the secondary base station, the master base station generates a PDCP entity for the QFI-a, and after receiving the secondary base station adding request, the secondary base station generates a PDCP entity for the QFI-b. Therefore, the two PDCP entities are respectively associated with the QFI-a and the QFI-b.

Step 1809. The master base station initiates RRC connection reconfiguration to the UE.

In other words, the master base station initiates establishment of the second radio bearer between the secondary base station and the UE. For example, the second radio bearer is the DRB 2. In this step, the master base station sends identification information of the DRB 2 to the UE. The DRB 2 between the secondary base station and the UE is established through this step.

Step 1810. The master base station feeds back secondary base station reconfiguration completion to the secondary base station, to notify the secondary base station that the UE successfully completes the RRC connection reconfiguration.

Optionally, if the secondary base station has an RRC function, the foregoing step 1808 to step 1810 may be replaced with the following steps.

1808'. The secondary base station initiates an RRC connection establishment process to the UE.

In other words, the secondary base station initiates establishment of the second radio bearer between the secondary base station and the UE. For example, the second radio bearer is the DRB 2. In this step, the secondary base station sends identification information of the DRB 2 to the UE. The DRB 2 between the secondary base station and the UE is established through this step.

1809'. The secondary base station returns a secondary base station adding request acknowledgment to the master base station. For details, refer to the descriptions of step 1808. Details are not described again.

Step 1811. Random access procedure is performed.

Step 1812. The master base station sends the first access network tunnel information and the second access network tunnel information to the AMF. The first access network tunnel information corresponds to the QFI-a, and the second access network tunnel information corresponds to the QFI-b. Optionally, the master base station further sends, to the AMF, a correspondence between the QFI-a and the first access network tunnel information and a correspondence between the QFI-b and the second access network tunnel information.

For example, the master base station returns an N2 session response to the AMF. The N2 session response includes the PDU session identifier and the N2 SM information. The N2 SM information includes the first access network tunnel information and the second access network tunnel information. Optionally, the N2 SM information may further include the correspondence between the QFI-a and the first access network tunnel information and the correspondence between the QFI-b and the second access network tunnel information.

Step 1813. The AMF sends a context update request to the SMF, to forward the received N2 SM information to the SMF.

For example, the AMF sends an Nsmf_PDUSession_UpdateSMContext request by invoking an SM context update service of the SMF. The AMF forwards, to the SMF using the request, the N2 SM information received in step 1812.

Step 1814. The SMF sends a forwarding rule to the UPF.

For example, the SMF sends an N4 session modification request to the UPF, and the session modification request includes the forwarding rule. The UPF returns an N4 session modification response. The forwarding rule may include an uplink forwarding rule and a downlink forwarding rule.

The uplink forwarding rule indicates the UPF to deduplicate the two received uplink packets that respectively have the QFI-a and the QFI-b and have the same sequence number. Therefore, in the uplink direction, when the UPF receives the first uplink packet and the second uplink packet, the first uplink packet has the first service flow identifier and the first sequence number, and the second uplink packet has the second service flow identifier and the first sequence number. The UPF deduplicates the first uplink packet and the second uplink packet according to the uplink forwarding rule.

The downlink forwarding rule includes the first access network tunnel information and the second access network tunnel information. The downlink forwarding rule further includes the QFI-a corresponding to the first access network tunnel information and the QFI-b corresponding to the second access network tunnel information. The downlink forwarding rule indicates the UPF to replicate a received downlink packet of the first service (add the QFI-a and the sequence number to the first downlink packet, and add the QFI-b and the same sequence number to the second downlink packet), and send the downlink packets of the first service through the two paths respectively corresponding to the first access network tunnel information and the second access network tunnel information, in an embodiment, send the first downlink packet to the master base station through a first path corresponding to the first access network tunnel information, and send the second downlink packet to the secondary base station through a second path corresponding to the second access network tunnel information. Therefore, in the downlink direction, the UPF generates the first downlink packet and the second downlink packet (for example, replicates a packet at the HRP layer, adds the QFI-a and a sequence number to the first downlink packet, and adds the QFI-b and the same sequence number to the second downlink packet) according to the downlink forwarding rule, sends the first downlink packet to a first base station, and sends the second downlink packet to a second base station, where the first downlink packet has the first service flow identifier and a second sequence number, and the second downlink packet has the second service flow identifier and the second sequence number.

Step 1815. The SMF sends a context update response to the AMF.

Therefore, according to the packet transmission method in this embodiment of the present disclosure, the uplink/downlink packets of the first service (for example, the URLLC service) may be transmitted through the two paths. Similarly, the method in this embodiment of this application may further be used to transmit an uplink packet/a downlink packet of the first service through a plurality of (more than two) paths. Details are not described again. Therefore, reliability of packet transmission of the URLLC service is improved.

In addition, when a UE side does not include the new protocol layer HRP layer, the foregoing operation at the HRP layer may alternatively be performed at a PDU layer above the SDAP layer. This is not limited in this application.

Figure 19A:
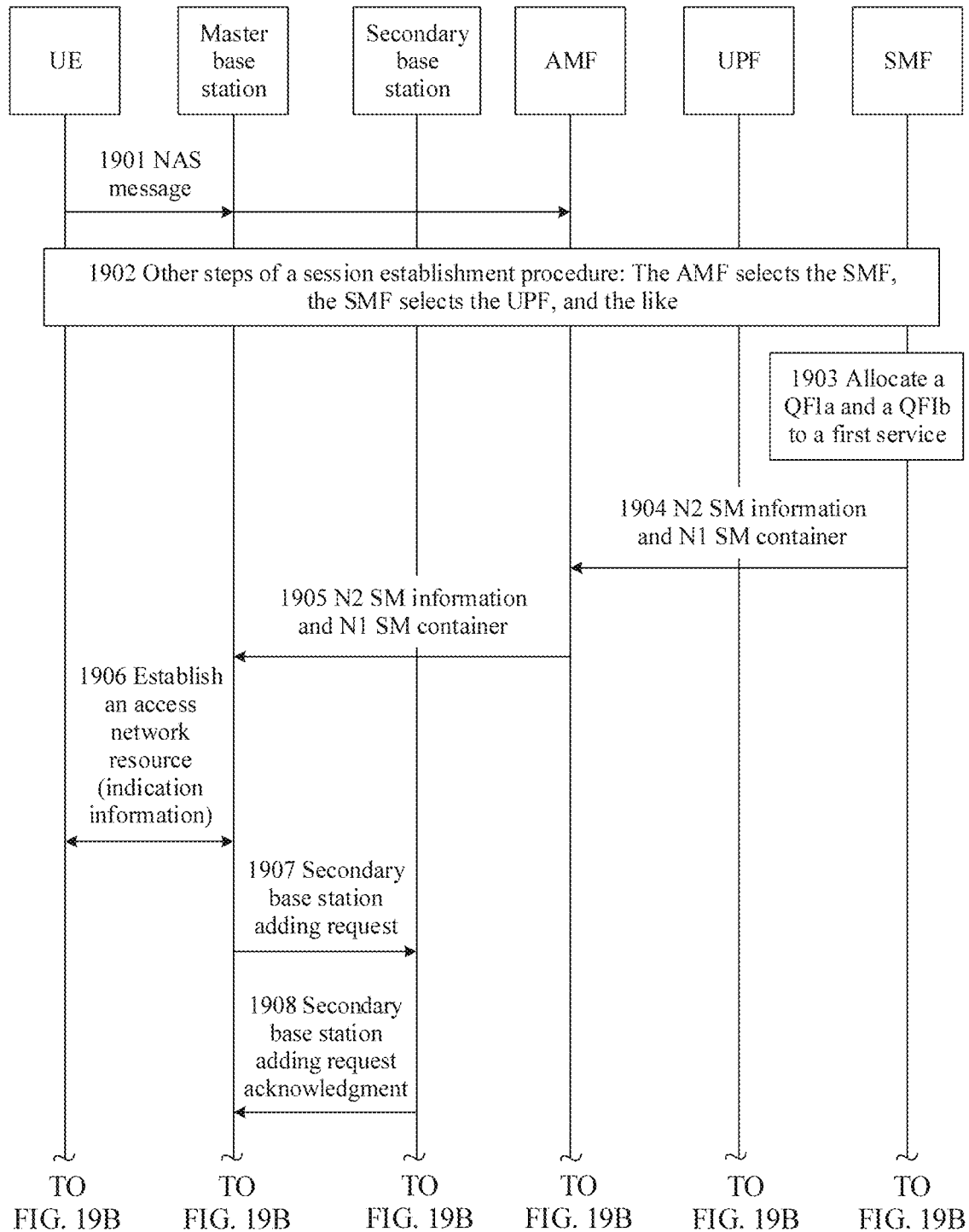
FIG. 19A and FIG. 19B are a signaling exchange diagram of a packet transmission method according to another embodiment of this application, where the method is applicable to a solution for an SDAP layer.
Figure 19B:
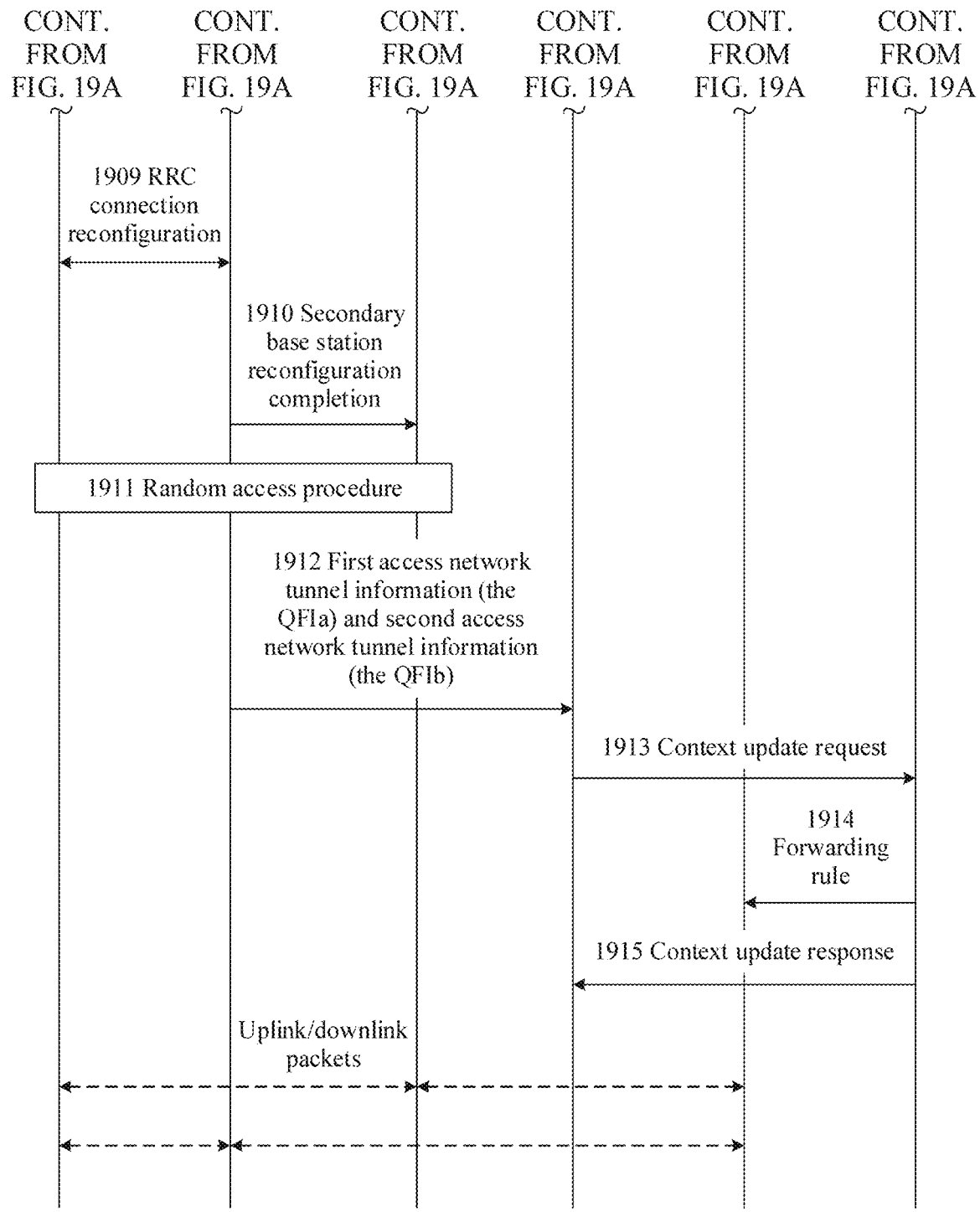

FIG. 19A and FIG. 19B are a signaling exchange diagram of another packet transmission method according to an embodiment of this application. FIG. 19A and FIG. 19B relate to interaction between UE, a master base station, a secondary base station, an AMF, an SMF, and a UPF. For example, the UE, the master base station, the secondary base station, the AMF, the SMF, and the UPF may be respectively the UE 201, the M-RAN 202, the S-RAN 203, the AMF 204, the SMF 205, and the UPF 206 in FIG. 2. FIG. 19A and FIG. 19B are described with reference to FIG. 18A and FIG. 18B.

For example, FIG. 19A and FIG. 19B are applicable to a case in which in an uplink direction, an SDAP layer of the UE is enhanced, and a packet can be replicated at the enhanced SDAP layer, in a downlink direction, the UPF can replicate a packet at a GTP-U layer such that dual-path packet transmission is implemented and packet transmission reliability is improved.

A difference between FIG. 19A, FIG. 19B, FIG. 18A and FIG. 18B lies in that in FIG. 18A and FIG. 18B, because an access network is unaware of the HRP layer, the SMF indicates, using the NAS message, the UE to process the packet of the URLLC service, while in FIG. 19A and FIG. 19B, because the SDAP layer is enhanced, the master base station may indicate, using an AS layer message, the UE to process the packet of the URLLC service.

As shown in FIG. 19A and FIG. 19B, the method includes the following steps.

Step 1901. The UE sends, to the AMF via the master base station, a NAS message that carries a session establishment request, to request to establish a PDU session for the UE.

Step 1902. Other steps of a session establishment procedure are performed.

For example, the foregoing other steps include at least the AMF selects the SMF, and the SMF selects the UPF. Details are not described herein.

Step 1903. The SMF allocates, to a first service, two service flow identifiers, namely, a first service flow identifier and a second service flow identifier.

For step 1901 to step 1903, refer to the descriptions of step 1801 to step 1803 in FIG. 18A and FIG. 18B. Details are not described herein again.

Step 1904. The SMF transmits N2 SM information and an N1 SM container to the AMF.

For example, the SMF sends the N2 SM information to the AMF by invoking an N1N2 message transfer service of the AMF. In addition, the N1 SM container including a session accept message may further be sent to the AMF by invoking the service.

Step 1905. The AMF sends the received N2 SM information and the received N1 SM container to the master base station.

For example, the AMF sends an N2 session request to the master base station, and the N2 session request includes the N2 SM information and a NAS message. The NAS message includes the PDU session identifier and the N1 SM container.

The N1 SM container includes the session accept message to be sent to the UE. The session accept message includes a QoS rule. For example, the QoS rule includes a QoS rule identifier, the first service flow identifier, the second service flow identifier, and a packet filter.

The N2 SM information includes at least the PDU session identifier and core network tunnel information. The core network tunnel information includes first core network tunnel information and second core network tunnel information. For details, refer to the descriptions of FIG. 3A and FIG. 3B. Details are not described herein again. The N2 SM information may further include a QoS parameter, a QFI-a, a QFI-b, slice identification information (for example, S-NSSAI), a session-AMBR, and a PDU session type. Optionally, the N2 SM information may further include a DNN.

Step 1906. The master base station initiates establishment of an access network resource between the master base station and the UE.

In other words, the master base station initiates establishment of a first radio bearer between the master base station and the UE. For example, the first radio bearer is a DRB 1. In this step, the master base station sends identification information of the DRB 1 to the UE. The DRB 1 between the master base station and the UE is established through this step. In addition, in an embodiment, the master base station further sends indication information to the UE using the AS layer message.

The UE may receive the indication information using the AS layer message. In the uplink direction, the UE may generate a first uplink packet and a second uplink packet based on the indication information, send the first uplink packet to the master base station over the first radio bearer, and send the second uplink packet to the secondary base station over a second radio bearer, where the first uplink packet and the second uplink packet have a same first sequence number. For example, the indication information indicates the UE to replicate an uplink packet to obtain the first uplink packet and the second uplink packet, and send the first uplink packet and the second uplink packet over different radio bearers.

For example, the UE determines, using the packet filter, packets corresponding to the QFI-a and the QFI-b, replicates the packets based on the indication information, and adds a same sequence number at the SDAP layer, to obtain the first uplink packet corresponding to the QFI-a and the second uplink packet corresponding to the QFI-b, and the UE sends, at the SDAP layer based on a correspondence between a QFI and a PDCP entity, the first uplink packet to a PDCP entity 1 and sends the second uplink packet to a PDCP entity 2, where the PDCP entity 1 corresponds to the QFI-a, and the PDCP entity 2 corresponds to the QFI-b. Similarly, after the first uplink packet and the second uplink packet are processed at another protocol layer such as an RLC layer or a physical layer, the first uplink packet is sent to the M-RAN over the DRB 1, and the second uplink packet is sent to the S-RAN over the DRB 2. The DRB 1 corresponds to the PDCP entity 1, and the DRB 2 corresponds to the PDCP entity 2. After receiving the two uplink packets over the DRB 1 and the DRB 2 respectively, the master base station and the secondary base station add QFIs to the uplink packets based on a correspondence between a DRB and a QFI or based on QFIs carried in headers of the uplink packets. Specifically, the master base station adds the QFI-a to the first uplink packet, the secondary base station adds the QFI-b to the second uplink packet, and the master base station and the secondary base station send the uplink packets to the UPF. Therefore, the UPF receives the first uplink packet and the second uplink packet, and the first uplink packet and the second uplink packet respectively have the QFI-a and the QFI-b and have the same sequence number.

In other words, the first uplink packet sent by the UE corresponds to the QFI-a, the second uplink packet corresponds to the QFI-b, and the first uplink packet and the second uplink packet have the same sequence number. The first uplink packet received by the UPF includes the QFI-a, the second uplink packet includes the QFI-b, and the first uplink packet and the second uplink packet have the same sequence number.

In a possible implementation, the indication information sent by the SMF to the UE may indicate that the first uplink packet corresponds to the QFI-a, and the second uplink packet corresponds to the QFI-b. In another possible implementation, the UE may further add the QFI-a to the first uplink packet and add the QFI-b to the second uplink packet at the SDAP layer. Further, the indication information sent by the SMF to the UE may indicate the UE to add the QFI-a to the first uplink packet and add the QFI-b to the second uplink packet.

In addition, in the downlink direction, when the UE receives a first downlink packet and a second downlink packet from the master base station and the secondary base station respectively, where the first downlink packet and the second downlink packet have a same sequence number and respectively correspond to the QFI-a and the QFI-b, the UE deduplicates the first downlink packet and the second downlink packet based on the indication information. Therefore, further, optionally, the indication information sent by the SMF to the UE may further indicate the UE to deduplicate the first downlink packet and the second downlink packet. The first downlink packet and the second downlink packet have the same sequence number, and are respectively associated with the QFI-a and the QFI-b.

In another embodiment, the indication information may not be carried in step 1906, and the indication information may be sent to the UE in the following step 1909. In still another embodiment, when the secondary base station has an RRC function, the indication information may alternatively be sent to the UE through the following step 1908'. This is not limited in this application.

Step 1907. The master base station determines to add the secondary base station, and sends a secondary base station adding request to the secondary base station.

Step 1908. The secondary base station returns a secondary base station adding request acknowledgment to the master base station.

Step 1909. The master base station initiates RRC connection reconfiguration to the UE.

In other words, the master base station initiates establishment of the second radio bearer between the secondary base station and the UE. For example, the second radio bearer is the DRB 2. In this step, the secondary base station sends identification information of the DRB 2 to the UE. The DRB 2 between the secondary base station and the UE is established through this step.

Step 1910. The master base station feeds back secondary base station reconfiguration completion to the secondary base station, to notify the secondary base station that the UE successfully completes the RRC connection reconfiguration.

For step 1907 to step 1910, refer to the descriptions of step 1807 to step 1810 in FIG. 18A and FIG. 18B. Details are not described herein again.

Optionally, if the secondary base station has the RRC function, the foregoing step 1908 to step 1910 may be replaced with the following steps.

1908'. The secondary base station initiates an RRC connection establishment process to the UE. For details, refer to the descriptions of 1808'. Details are not described again.

1909'. The secondary base station returns a secondary base station adding request acknowledgment to the master base station. For details, refer to the descriptions of step 1808. Details are not described again.

Step 1911. Random access procedure.

Step 1912. The master base station sends the first access network tunnel information and the second access network tunnel information to the AMF. Optionally, the master base station further sends, to the AMF, a correspondence between the QFI-a and the first access network tunnel information and a correspondence between the QFI-b and the second access network tunnel information.

Step 1913. The AMF sends a context update request to the SMF, to forward the received N2 SM information to the SMF.

Step 1914. The SMF sends a forwarding rule to the UPF.

Step 1915. The SMF sends a context update response to the AMF.

For step 1912 to step 1915, refer to the descriptions of step 1812 to step 1815 in FIG. 18A and FIG. 18B. Details are not described herein again.

Therefore, according to the packet transmission method in this embodiment of the present disclosure, the uplink/downlink packets of the first service (for example, the URLLC service) may be transmitted through the two paths. Similarly, the method in this embodiment of this application may further be used to transmit an uplink packet/a downlink packet of the first service through a plurality of (more than two) paths. Details are not described again. Therefore, reliability of packet transmission of the URLLC service is improved.

Figure 20:
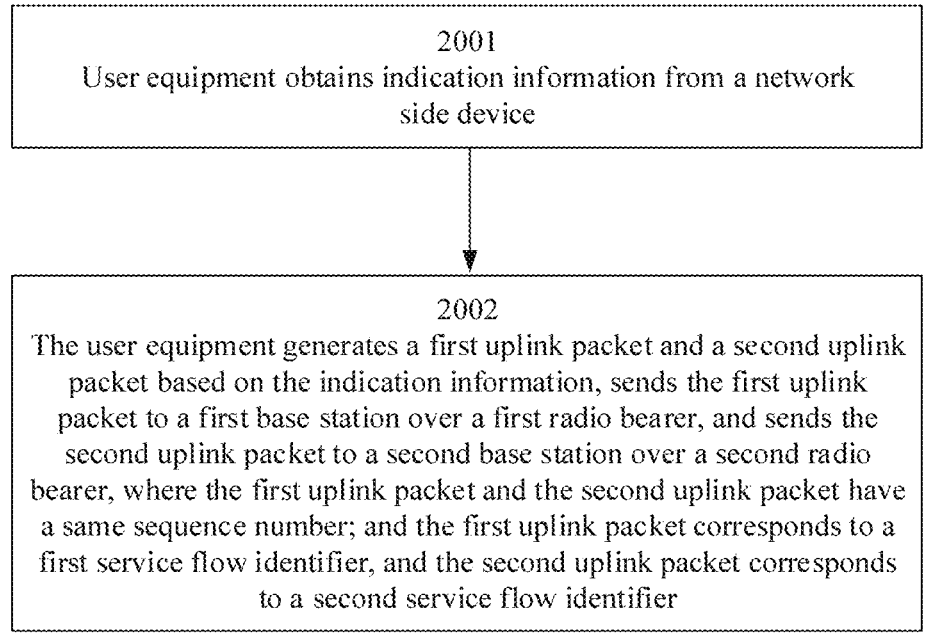
FIG. 20 is a flowchart of a packet transmission method on a UE side according to another embodiment of this application.

With reference to the descriptions of FIG. 18A, FIG. 18B, FIG. 19A, and FIG. 19B, an embodiment of this application provides a packet transmission method. As shown in FIG. 20, the method includes the following steps.

Step 2001. UE obtains indication information from a network side device.

For example, if the network side device is an SMF, the UE may obtain the indication information from the SMF. Refer to step 1804 to step 1806 in FIG. 18A and FIG. 18B. Alternatively, if the network side device is a base station, the UE may obtain the indication information from the master base station. For details, refer to step 1906 in FIG. 19A and FIG. 19B. Details are not described again. For example, the indication information indicates the UE to replicate an uplink packet to obtain a first uplink packet and a second uplink packet, and send the first uplink packet and the second uplink packet over different radio bearers. The first uplink packet and the second uplink packet have a same sequence number.

Step 2002. The UE generates the first uplink packet and the second uplink packet based on the indication information, sends the first uplink packet to a first base station over a first radio bearer, and sends the second uplink packet to a second base station over a second radio bearer, where the first uplink packet and the second uplink packet have the same sequence number, and the first uplink packet corresponds to a first service flow identifier, and the second uplink packet corresponds to a second service flow identifier.

For example, the first base station may be the master base station in FIG. 18A, FIG. 18B, FIG. 19A, or FIG. 19B, the second base station may be the secondary base station in FIG. 18A, FIG. 18B, FIG. 19A, or FIG. 19B, the first radio bearer may be the DRB 1 in FIG. 18A, FIG. 18B, FIG. 19A, or FIG. 19B, and the second radio bearer may be the DRB 2 in FIG. 18A, FIG. 18B, FIG. 19A, or FIG. 19B.

For example, the UE replicates a packet at a first protocol layer based on the indication information, to obtain the first uplink packet and the second uplink packet. For example, if the first protocol layer includes an HRP layer, the UE obtains the indication information from the SMF using an NAS message. Refer to the descriptions of FIG. 18A and FIG.

18B. Alternatively, if the first protocol layer includes an SDAP layer, the UE obtains the indication information from the base station using an AS message. Refer to the descriptions of FIG. 19A and FIG. 19B.

Optionally, the UE may add the first service flow identifier to the first uplink packet, and add the second service flow identifier to the second uplink packet. In other words, the first uplink packet includes the first service flow identifier, and the second uplink packet includes the second service flow identifier. Further, optionally, the indication information further indicates the UE to add the first service flow identifier to the first uplink packet and add the second service flow identifier to the second uplink packet.

In addition, in a downlink direction, the UE receives a first downlink packet and a second downlink packet from the first base station and the second base station respectively, where the first downlink packet has a second sequence number and corresponds to the first service flow identifier, and the second downlink packet has the second sequence number and corresponds to the second service flow identifier. The UE deduplicates the first downlink packet and the second downlink packet based on the indication information.

Optionally, the indication information further indicates the UE to deduplicate the two downlink packets that have the same sequence number and that respectively have the first service flow identifier and the second service flow identifier.

It should be noted that, an operation in the downlink direction does not depend on an uplink solution. In other words, an operation on a downlink side of the UE may also constitute an independent solution.

Similarly, the method in this embodiment of this application may further be used to transmit an uplink packet/a downlink packet of a first service through a plurality of (more than two) paths. Details are not described again. Therefore, reliability of packet transmission of a URLLC service is improved.

Figure 21:
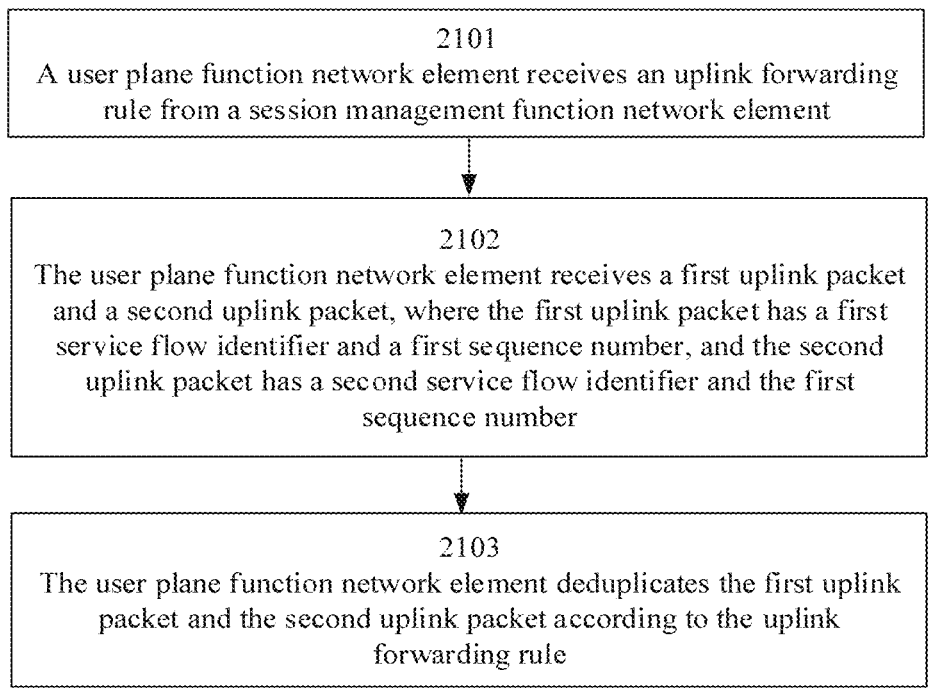
FIG. 21 is a flowchart of a packet transmission method on a UPF side according to another embodiment of this application.

With reference to the descriptions of FIG. 18A, FIG. 18B, FIG. 19A, and FIG. 19B, an embodiment of this application provides a packet transmission method. As shown in FIG. 21, the method includes the following steps.

Step 2101. A UPF network element receives an uplink forwarding rule from a SMF network element. For example, the uplink forwarding rule indicates the UPF network element to deduplicate two uplink packets that have a same sequence number and that respectively have a first service flow identifier and a second service flow identifier.

For example, the UPF network element may be the UPF in FIG. 18A, FIG. 18B, FIG. 19A, or FIG. 19B, and the SMF network element may be the SMF in FIG. 18A, FIG. 18B, FIG. 19A, or FIG. 19B. For step 2101, refer to the descriptions of step 1814 in FIG. 18A and FIG. 18B or step 1914 in FIG. 19A and FIG. 19B. Details are not described again.

Step 2102. The UPF network element receives a first uplink packet and a second uplink packet, where the first uplink packet has the first service flow identifier and a first sequence number, and the second uplink packet has the second service flow identifier and the first sequence number.

Step 2103. The UPF network element deduplicates the first uplink packet and the second uplink packet according to the uplink forwarding rule.

In addition, in a downlink direction, the UPF network element receives a downlink forwarding rule from the SMF network element, generates a first downlink packet and a second downlink packet according to the downlink forwarding rule, sends the first downlink packet to a first base station, and sends the second downlink packet to a second base station, where the first downlink packet has the first service flow identifier and a second sequence number, and the second downlink packet has the second service flow identifier and the second sequence number.

Optionally, the generating, by the UPF network element, a first downlink packet and a second downlink packet according to the downlink forwarding rule includes replicating, by the UPF network element, a packet at a first protocol layer according to the downlink forwarding rule, to obtain the first downlink packet and the second downlink packet, where the first protocol layer includes an HRP layer or a GTP-U layer.

It should be noted that, an operation in the downlink direction does not depend on an uplink solution. In other words, an operation on a downlink side of the UPF may also constitute an independent solution.

Similarly, the method in this embodiment of this application may further be used to transmit an uplink packet/a downlink packet of a first service through a plurality of (more than two) paths. Details are not described again. Therefore, reliability of packet transmission of a URLLC service is improved.

Figure 6:
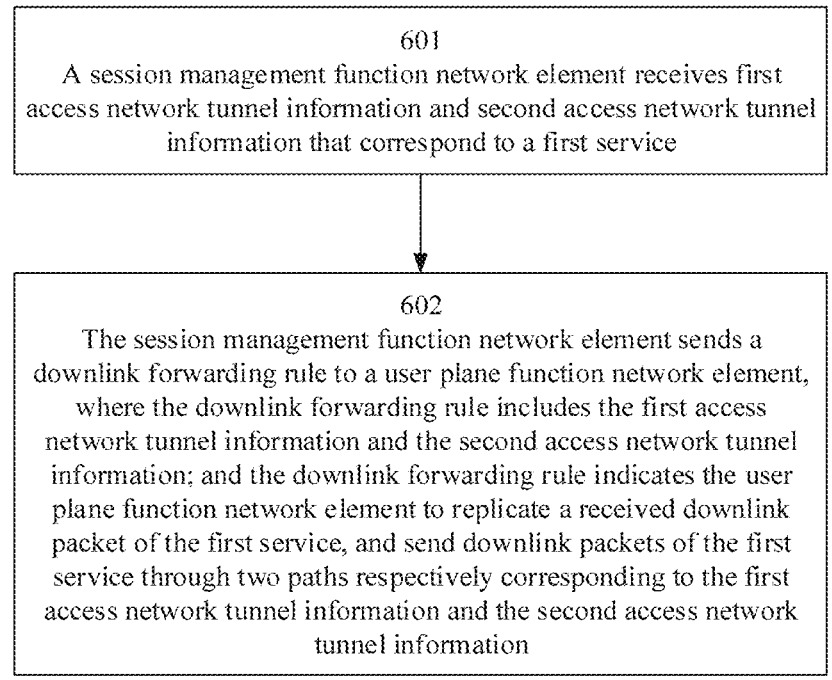
FIG. 6 is a flowchart of a packet transmission method according to an embodiment of this application.

With reference to the descriptions of FIG. 3A, FIG. 3B, and FIG. 5, an embodiment of this application provides a packet transmission method. As shown in FIG. 6, the method includes the following steps.

Step 601. An SMF network element receives first access network tunnel information and second access network tunnel information that correspond to a first service.

For example, the SMF network element may be the SMF in FIG. 3A, FIG. 3B, or FIG. 5.

For example, after receiving N2 SM information including the first access network tunnel information and the second access network tunnel information, an access and mobility management network element forwards the N2 SM information to the SMF network element. Specifically, for step 601, refer to the descriptions of step 311 and step 312 in FIG. 3A and FIG. 3B or the descriptions of step 507 and step 508 in FIG. 5. Details are not described herein again.

Step 602. The SMF network element sends a downlink forwarding rule to a UPF network element, where the downlink forwarding rule includes the first access network tunnel information and the second access network tunnel information, and the downlink forwarding rule indicates the UPF network element to replicate a received downlink packet of the first service, and send downlink packets of the first service through two paths respectively corresponding to the first access network tunnel information and the second access network tunnel information.

For example, the UPF network element may be the UPF in FIG. 3A, FIG. 3B, or FIG. 5. For example, in a dual connectivity scenario, the two paths may be a first path between the UPF network element and a master base station, and a second path between the UPF network element and a secondary base station. In a single connectivity scenario, the two paths may be a first path and a second path between the UPF network element and a base station.

For step 602, refer to the descriptions of step 313 in FIG. 3A and FIG. 3B or step 509 in FIG. 5. Details are not described herein again.

According to the foregoing method, for a specific first service (for example, a URLLC service requiring high reliability), the SMF network element sends, to the UPF network element, the downlink forwarding rule including the first access network tunnel information and the second access network tunnel information such that after subsequently receiving a downlink packet of the first service, the UPF network element replicates the downlink packet of the first service, and sends downlink packets of the first service through the two paths respectively corresponding to the first access network tunnel information and the second access network tunnel information. In this way, reliability of packet transmission of the first service is improved.

Similarly, the method in this embodiment of this application may further be used to transmit an uplink packet/a downlink packet of the first service through a plurality of (more than two) paths. Details are not described again. Therefore, reliability of packet transmission of the URLLC service is improved.

Optionally, if the first service is at a service flow granularity, the downlink forwarding rule further includes a service flow identifier of the first service and a session identifier, or if the first service is at a session granularity, the downlink forwarding rule further includes a session identifier of the first service. Therefore, for services at different granularities, downlink forwarding rules for corresponding granularities may be provided such that the UPF network element can implement more accurate and efficient packet transmission.

Optionally, the method further includes sending, by the SMF network element, indication information to a base station, where the indication information triggers determining of the first access network tunnel information and the second access network tunnel information. In other words, after receiving the indication information, the base station learns that the first access network tunnel information and the second access network tunnel information need to be determined. For example, the indication information may include at least one of the following a QoS parameter, slice identification information, a DN name, and first core network tunnel information and second core network tunnel information. The QoS parameter includes at least one of a 5QI and a QFI. The base station that receives the indication information herein may be the master base station in the dual connectivity scenario or the base station in the single connectivity scenario.

Optionally, the method further includes sending, by the SMF network element, an uplink forwarding rule to the base station, where the uplink forwarding rule includes the first core network tunnel information and the second core network tunnel information, and the uplink forwarding rule indicates the base station to replicate a received uplink packet of the first service, and send uplink packets of the first service to the UPF network element through two paths respectively corresponding to the first core network tunnel information and the second core network tunnel information. The base station herein is the base station in the single connectivity scenario.

Similarly, if the first service is at the service flow granularity, the uplink forwarding rule further includes the service flow identifier of the first service and the session identifier, or the first service is at the session granularity, the uplink forwarding rule further includes the session identifier of the first service.

Optionally, the method further includes allocating, by the SMF network element, a first service flow identifier and a second service flow identifier to the first service, and sending the first service flow identifier and the second service flow identifier to UE. Refer to the descriptions of step 1803 in FIG. 18A and FIG. 18B or step 1903 in FIG. 19A and FIG. 19B. Details are not described again.

Optionally, the method further includes sending, by the SMF network element, the uplink forwarding rule to the UPF network element, where the uplink forwarding rule indicates the UPF network element to deduplicate two uplink packets that have a same sequence number and that respectively have the first service flow identifier and the second service flow identifier. Refer to the descriptions of step 1814 in FIG. 18A and FIG. 18B or step 1914 in FIG. 19A and FIG. 19B. Details are not described again.

Optionally, the method further includes sending, by the SMF network element, indication information to the UE using a NAS message, where the indication information indicates the UE to replicate an uplink packet to obtain a first uplink packet and a second uplink packet, and send the first uplink packet and the second uplink packet over different radio bearers, where the first uplink packet and the second uplink packet have a same sequence number. Further, optionally, the indication information further indicates that the first uplink packet corresponds to a QFI-a, and the second uplink packet corresponds to a QFI-b. For details, refer to the descriptions of step 1804 to step 1806 in FIG. 18A and FIG. 18B. Details are not described again.

Optionally, the method further includes adding, by the UE, the first service flow identifier to the first uplink packet (for example, at an HRP layer), and adding the second service flow identifier to the second uplink packet. For example, the indication information further indicates the UE to add the first service flow identifier to the first uplink packet and add the second service flow identifier to the second uplink packet.

Optionally, the downlink packets of the first service that are sent through the two paths respectively corresponding to the first access network tunnel information and the second access network tunnel information include a first downlink packet and a second downlink packet, where the first downlink packet and the second downlink packet include a same first sequence number. The first downlink packet corresponds to the first service flow identifier, and the second downlink packet corresponds to the second service flow identifier. Optionally, the first downlink packet sent by the UE includes the first service flow identifier, and the second downlink packet includes the second service flow identifier. Refer to the descriptions of FIG. 18A, FIG. 18B, FIG. 19A, or FIG. 19B. Details are not described again.

Optionally, the indication information further indicates the UE to deduplicate the first downlink packet and the second downlink packet. The first downlink packet and the second downlink packet have the same sequence number, and are respectively associated with the first service flow identifier and the second service flow identifier.

Figure 7:
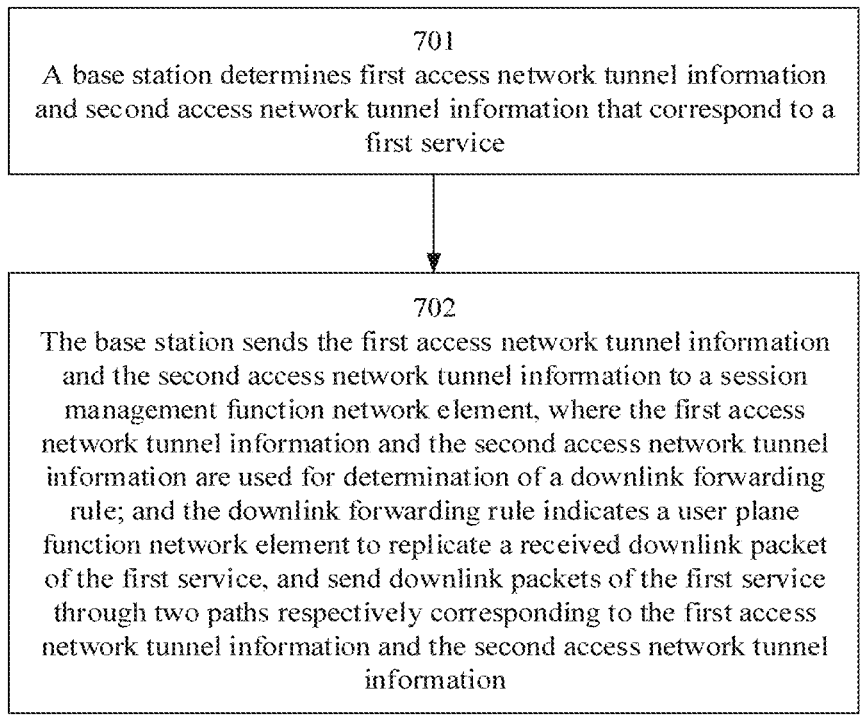
FIG. 7 is another flowchart of a packet transmission method according to an embodiment of this application.

An embodiment of this application further provides a packet transmission method. As shown in FIG. 7, the method includes the following steps.

Step 701. A base station determines first access network tunnel information and second access network tunnel information that correspond to a first service.

For example, the base station may be the master base station in FIG. 3A and FIG. 3B or the base station in FIG. 5.

For step 701, refer to the descriptions of step 306 and step 307 in FIG. 3A and FIG. 3B or step 506 in FIG. 5. Details are not described herein again.

Step 702. The base station sends the first access network tunnel information and the second access network tunnel information to an SMF network element, where the first access network tunnel information and the second access network tunnel information are used for determination of a downlink forwarding rule, and the downlink forwarding rule indicates a UPF network element to replicate a received downlink packet of the first service, and send downlink packets of the first service through two paths respectively corresponding to the first access network tunnel information and the second access network tunnel information.

For example, the SMF network element may be the SMF in FIG. 3A, FIG. 3B, or FIG. 5. In a dual connectivity scenario, the two paths may be a first path between the UPF network element and a master base station, and a second path between the UPF network element and a secondary base station. In a single connectivity scenario, the two paths may be a first path and a second path between the UPF network element and the base station.

For step 702, refer to the descriptions of step 311 and step 312 in FIG. 3A and FIG. 3B or step 507 and step 508 in FIG. 5. Details are not described herein again.

According to the foregoing method, the base station sends the first access network tunnel information and the second access network tunnel information to the SMF network element. For a specific first service (for example, a URLLC service requiring high reliability), the SMF network element sends, to the UPF network element, the downlink forwarding rule including the first access network tunnel information and the second access network tunnel information such that after subsequently receiving a downlink packet of the first service, the UPF network element replicates the downlink packet of the first service, and sends downlink packets of the first service through the two paths respectively corresponding to the first access network tunnel information and the second access network tunnel information. In this way, reliability of packet transmission of the first service is improved.

Similarly, the method in this embodiment of this application may further be used to transmit an uplink packet/a downlink packet of the first service through a plurality of (more than two) paths. Details are not described again. Therefore, reliability of packet transmission of the URLLC service is improved.

Optionally, if the first service is at a service flow granularity, the downlink forwarding rule further includes a service flow identifier of the first service and a session identifier, or if the first service is at a session granularity, the downlink forwarding rule further includes a session identifier of the first service. Therefore, for services at different granularities, downlink forwarding rules for corresponding granularities may be provided such that the UPF network element can implement more accurate and efficient packet transmission.

Optionally, the method further includes receiving, by the base station, indication information from the SMF network element, where the indication information triggers determining of the first access network tunnel information and the second access network tunnel information. Step 701 includes determining, by the base station, the first access network tunnel information and the second access network tunnel information based on the indication information. In other words, after receiving the indication information, the base station learns that the first access network tunnel information and the second access network tunnel information need to be determined. For example, the indication information may include at least one of the following a QoS parameter, slice identification information, a DN name, and first core network tunnel information and second core network tunnel information. The QoS parameter includes at least one of a 5QI and a QFI.

Optionally, the method further includes receiving, by the base station, an uplink forwarding rule from the SMF network element, where the uplink forwarding rule includes the first core network tunnel information and the second core network tunnel information, and replicating, by the base station, a received uplink packet of the first service according to the uplink forwarding rule, and sending uplink packets of the first service to the UPF network element through two paths respectively corresponding to the first core network tunnel information and the second core network tunnel information. The base station herein is the base station in the single connectivity scenario.

Similarly, if the first service is at the service flow granularity, the uplink forwarding rule further includes the service flow identifier of the first service and the session identifier, or if the first service is at the session granularity, the uplink forwarding rule further includes the session identifier of the first service.

Optionally, the method further includes sending, by the base station, indication information to UE using an AS message, where the indication information indicates the UE to replicate an uplink packet to obtain a first uplink packet and a second uplink packet, and send the first uplink packet and the second uplink packet over different radio bearers, and the first uplink packet and the second uplink packet have a same sequence number. Further, optionally, the indication information further indicates that the first uplink packet corresponds to a QFI-a, and the second uplink packet corresponds to a QFI-b. Refer to the descriptions of step 1906 in FIG. 19A and FIG. 19B. Details are not described again.

Optionally, the method further includes sending, by the base station to the SMF network element, a first service flow identifier corresponding to the first access network tunnel information and a second service flow identifier corresponding to the second access network tunnel information.

Optionally, the method further includes indicating, by the base station, the UE to add a service flow identifier to the first uplink packet.

Optionally, the method further includes, when the base station determines to transmit a packet in a dual connectivity manner, indicating, by the base station, the UE to generate two second uplink packets, where the two second uplink packets have a same sequence number and a same service flow identifier.

Optionally, the method further includes indicating, by the base station, the UE to deduplicate received downlink packets that have a same sequence number and a same service flow identifier. For example, in a dual connectivity (or dual base station) downlink scenario, the base station indicates the UE to deduplicate received downlink packets that have a same sequence number and a same service flow identifier.

Optionally, the method further includes receiving, by the base station, the downlink packets of the first service through the two paths respectively corresponding to the first access network tunnel information and the second access network tunnel information, and deduplicating the downlink packets that have the same sequence number and service flow identifier. For example, in a single connectivity (or single base station) downlink scenario, the base station deduplicates the downlink packets that have a same sequence number and a same service flow identifier.

Figure 13:
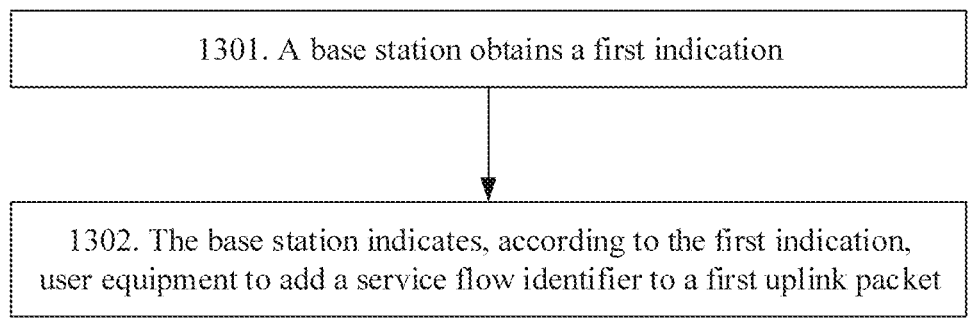
FIG. 13 is a flowchart of a packet transmission method according to another embodiment of this application.

With reference to the descriptions of FIG. 3A, FIG. 3B, FIG. 5, FIG. 12A, and FIG. 12B, an embodiment of this application further provides a packet transmission method. As shown in FIG. 13, the method includes the following steps.

Step 1301. A base station obtains a first indication.

The first indication includes capability information or indication information that is from a session management network element.

For example, the indication information indicates the base station to indicate the UE to add a service flow identifier to an uplink packet of a first session or an uplink packet of a first service flow of a first session.

The capability information indicates at least one of the following, whether the base station (namely, the master base station) has a capability of transmitting or receiving a packet in a dual connectivity manner, whether a neighboring base station (namely, a base station, for example, the secondary base station, having an Xn interface with the base station) of the base station has the capability of transmitting or receiving a packet in the dual connectivity manner, and whether another base station (for example, the secondary base station) that has the capability of transmitting or receiving a packet in the dual connectivity manner is deployed in a slice associated with the base station.

Step 1302. The base station indicates, according to the first indication, the UE to add a service flow identifier to a first uplink packet.

The service flow identifier may include at least one of a session identifier, a QFI, and a 5-tuple.

For example, when the first indication includes the indication information, the base station indicates, based on the received indication information, the UE to add the service flow identifier to the first uplink packet.

When the first indication includes the capability information, the indicating, by the base station according to the first indication, the UE to add a service flow identifier to a first uplink packet includes, when the capability information meets a first condition, indicating, by the base station, the UE to add the service flow identifier to the first uplink packet, where the first condition includes at least one of the following the capability information indicates that the base station has the capability of transmitting or receiving a packet in the dual connectivity manner, the capability information indicates that the neighboring base station of the base station has the capability of transmitting or receiving a packet in the dual connectivity manner, and the capability information indicates that the other base station having the capability of transmitting or receiving a packet in the dual connectivity manner is deployed in the slice associated with the base station.

For example, for step 1301 and step 1302, refer to the descriptions of FIG. 3A and FIG. 3B. Details are not described herein again.

Therefore, when the dual connectivity manner is used or the dual connectivity manner may be used subsequently, the base station indicates the UE to add the service flow identifier to the uplink packet. In this way, for the UE, a same protocol stack format is used for the single connectivity manner and the dual connectivity manner. After the UE is subsequently switched to the dual connectivity manner, the UE may directly perform processing based on the protocol stack format, to avoid complex operations and signaling exchanges, and reduce a latency, thereby improving user experience.

Optionally, the method further includes, when the base station determines to transmit or receive a packet in the dual connectivity manner, indicating, by the base station, the UE to generate two second uplink packets, where the two second uplink packets have a same sequence number and a same service flow identifier.

Optionally, the method further includes indicating, by the base station, the UE to deduplicate received downlink packets that have a same sequence number and a same service flow identifier. For example, in a dual connectivity (or dual base station) downlink scenario, the base station indicates the UE to deduplicate received downlink packets that have a same sequence number and a same service flow identifier.

Optionally, the method further includes receiving, by the base station, downlink packets of a first service through the two paths respectively corresponding to the first access network tunnel information and the second access network tunnel information, and deduplicating downlink packets that have a same sequence number and a same service flow identifier. For example, in a single connectivity (or single base station) downlink scenario, the base station deduplicates downlink packets that have a same sequence number and a same service flow identifier. For this step, refer to the descriptions of step 1212 in FIG. 12A and FIG. 12B.

Figure 14:
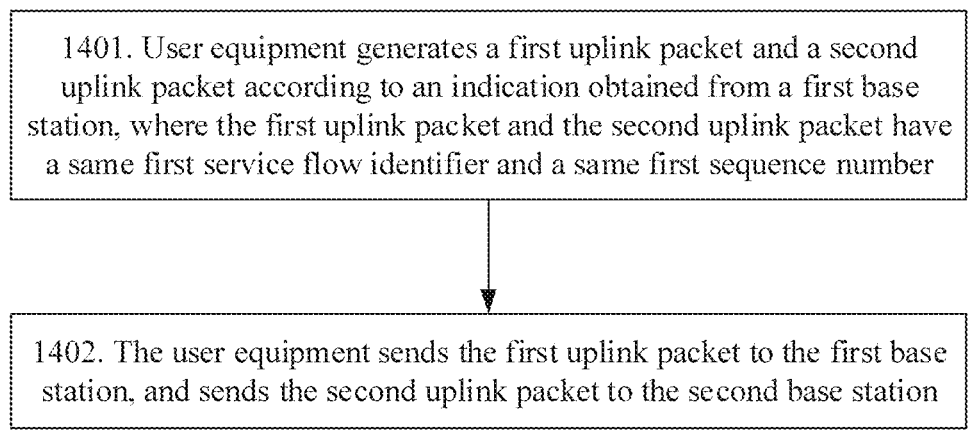
FIG. 14 is a flowchart of a packet transmission method according to another embodiment of this application.

With reference to the descriptions of FIG. 3A, FIG. 3B, FIG. 11A, and FIG. 11B, an embodiment of this application further provides a packet transmission method. This method is applicable to a dual connectivity scenario. As shown in FIG. 14, the method includes the following steps.

Step 1401. UE generates a first uplink packet and a second uplink packet according to an indication obtained from a first base station, where the first uplink packet and the second uplink packet have a same first service flow identifier and a same first sequence number.

Step 1402. The UE sends the first uplink packet to the first base station, and sends the second uplink packet to a second base station.

For step 1401 and step 1402, refer to the descriptions of step 1101 in FIG. 3A, FIG. 3B, FIG. 11A, and FIG. 11B.

Therefore, for a dual connectivity manner, the UE adds the service flow identifier and the sequence number to the uplink packet according to the indication of the base station. For a packet of a specific service (for example, a URLLC service requiring high reliability), the UE replicates a packet. In this way, reliability of packet transmission of the specific service is improved.

Optionally, the method further includes receiving, by the UE, a first downlink packet and a second downlink packet from the first base station and the second base station respectively, where the first downlink packet and the second downlink packet include a same second service flow identifier and a same second sequence number, and deduplicating, by the UE, the first downlink packet and the second downlink packet according to the indication of the base station. For this step, refer to the descriptions of step 1113 in FIG. 11A and FIG. 11B.

In the foregoing embodiments provided in this application, the solutions of the communication methods provided in the embodiments of this application are separately described from a perspective of each network element and from a perspective of interaction between the network elements. It may be understood that, to implement the foregoing functions, each of the network elements, for example, the foregoing SMF network element and the base station, includes a corresponding hardware structure and/or software module for performing each function. A person skilled in the art should easily be aware that, in combination with units and algorithm steps of the examples described in the embodiments disclosed in this specification, this application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

Figure 8:
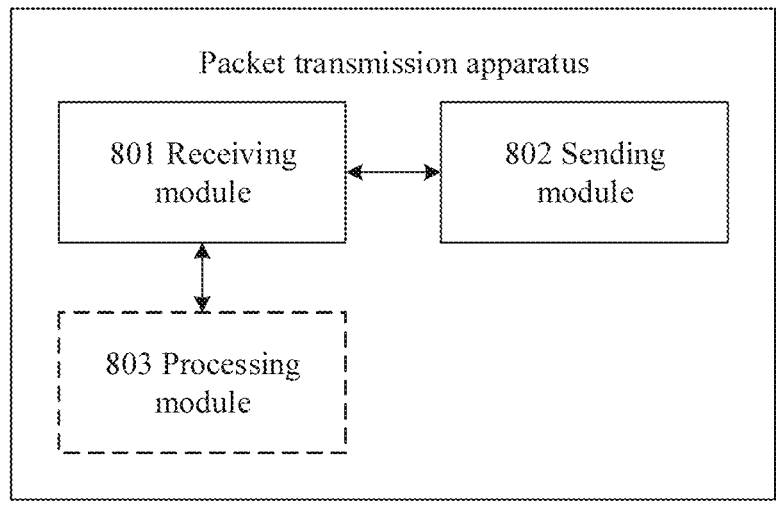
FIG. 8 is a schematic structural diagram of a packet transmission apparatus according to an embodiment of this application.

For example, when the network element implements a corresponding function using a software module, a packet transmission apparatus may include a receiving module 801 and a sending module 802, as shown in FIG. 8. The apparatus may be an SMF network element or a chip.

The apparatus may be configured to perform an operation of the SMF in FIG. 3A, FIG. 3B, FIG. 5, FIG. 18A, FIG. 18B, FIG. 19A, or FIG. 19B, or the SMF network element in FIG. 6. For example, the receiving module 801 is configured to receive first access network tunnel information and second access network tunnel information that correspond to a first service. The sending module is configured to send a downlink forwarding rule to a UPF network element, where the downlink forwarding rule includes the first access network tunnel information and the second access network tunnel information, and the downlink forwarding rule indicates the UPF network element to replicate a received downlink packet of the first service, and send downlink packets of the first service through two paths respectively corresponding to the first access network tunnel information and the second access network tunnel information.

Therefore, for a specific first service (for example, a URLLC service requiring high reliability), the SMF network element sends, to the UPF network element, the downlink forwarding rule including the first access network tunnel information and the second access network tunnel information such that after subsequently receiving a downlink packet of the first service, the UPF network element replicates the downlink packet of the first service, and sends downlink packets of the first service through the two paths respectively corresponding to the first access network tunnel information and the second access network tunnel information. In this way, reliability of packet transmission of the first service is improved.

Optionally, if the first service is at a service flow granularity, the downlink forwarding rule further includes a service flow identifier of the first service and a session identifier, or if the first service is at a session granularity, the downlink forwarding rule further includes a session identifier of the first service.

Optionally, the sending module 802 is further configured to send indication information to a base station, where the indication information triggers determining of the first access network tunnel information and the second access network tunnel information. For example, the indication information includes at least one of the following a QoS parameter, slice identification information, a DN name, and first core network tunnel information and second core network tunnel information.

Optionally, the sending module 802 is configured to send an uplink forwarding rule to the base station, where the uplink forwarding rule includes the first core network tunnel information and the second core network tunnel information, and the uplink forwarding rule indicates the base station to replicate a received uplink packet of the first service, and send uplink packets of the first service to the UPF network element through two paths respectively corresponding to the first core network tunnel information and the second core network tunnel information. Further, optionally, if the first service is at the service flow granularity, the uplink forwarding rule further includes the service flow identifier of the first service and the session identifier, or if the first service is at the session granularity, the uplink forwarding rule further includes the session identifier of the first service.

Optionally, the downlink packets of the first service that are sent through the two paths respectively corresponding to the first access network tunnel information and the second access network tunnel information include a first downlink packet and a second downlink packet, where the first downlink packet and the second downlink packet have a same sequence number, the first downlink packet further includes a first service flow identifier, and the second downlink packet further includes a second service flow identifier.

Optionally, the sending module 802 is further configured to send an uplink forwarding rule to the UPF network element, where the uplink forwarding rule indicates the UPF network element to deduplicate two uplink packets that have a same sequence number and that respectively have the first service flow identifier and the second service flow identifier.

Optionally, the sending module 802 is further configured to send indication information to UE using a NAS message, where the indication information indicates the UE to replicate an uplink packet to obtain a first uplink packet and a second uplink packet, and send the first uplink packet and the second uplink packet over different radio bearers, where the first uplink packet and the second uplink packet have a same sequence number. For example, the first uplink packet corresponds to the first service flow identifier, and the second uplink packet corresponds to the second service flow identifier.

The apparatus may further include a processing module 803. For example, the processing module 803 is configured to allocate the first service flow identifier and the second service flow identifier to the first service, and send the first service flow identifier and the second service flow identifier to the UE. The receiving module 801, the sending module 802, and the processing module 803 in the apparatus may further implement another operation or function of the SMF or the SMF network element in the foregoing method. Details are not described herein again.

Figure 9:
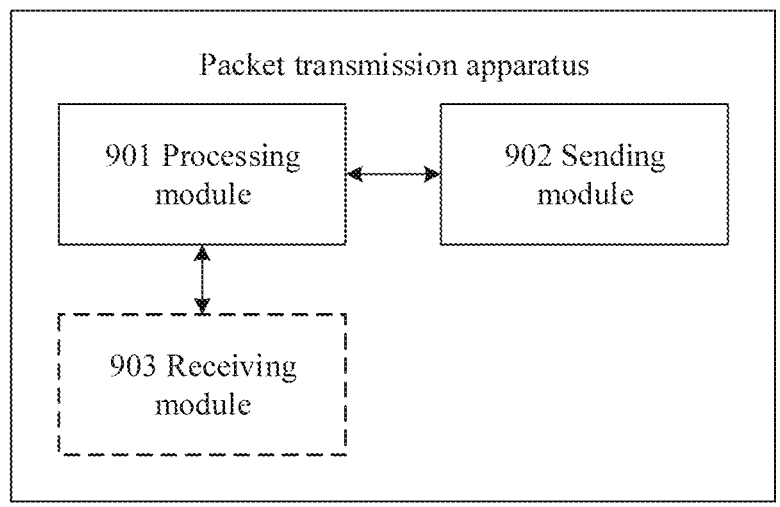
FIG. 9 is a schematic structural diagram of another packet transmission apparatus according to an embodiment of this application.

As shown in FIG. 9, another packet transmission apparatus may include a processing module 901 and a sending module 902. Optionally, the apparatus further includes a receiving module 903.

In an embodiment, the apparatus may be a base station or a chip. The apparatus may be configured to perform an operation of the master base station in FIG. 3A, FIG. 3B, FIG. 18A, FIG. 18B, FIG. 19A, or FIG. 19B, or the base station in FIG. 5 or FIG. 7. For example, the processing module 901 is configured to determine first access network tunnel information and second access network tunnel information that correspond to a first service. The sending module 902 is configured to send the first access network tunnel information and the second access network tunnel information to an SMF network element, where the first access network tunnel information and the second access network tunnel information are usable for determination of a downlink forwarding rule, and the downlink forwarding rule indicates a UPF network element to replicate a received downlink packet of the first service, and send downlink packets of the first service through two paths respectively corresponding to the first access network tunnel information and the second access network tunnel information.

Therefore, the base station sends the first access network tunnel information and the second access network tunnel information to the SMF network element. For a specific first service (for example, a URLLC service requiring high reliability), the SMF network element sends, to the UPF network element, the downlink forwarding rule including the first access network tunnel information and the second access network tunnel information such that after subsequently receiving a downlink packet of the first service, the UPF network element replicates the downlink packet of the first service, and sends downlink packets of the first service through the two paths respectively corresponding to the first access network tunnel information and the second access network tunnel information. In this way, reliability of packet transmission of the first service is improved.

Optionally, if the first service is at a service flow granularity, the downlink forwarding rule further includes a service flow identifier of the first service and a session identifier, or if the first service is at a session granularity, the downlink forwarding rule further includes a session identifier of the first service.

Optionally, the receiving module 903 is configured to, before the processing module 901 determines the first access network tunnel information and the second access network tunnel information that correspond to the first service, receive indication information from the SMF network element, where the indication information triggers the base station to determine the first access network tunnel information and the second access network tunnel information. The processing module 901 is configured to determine the first access network tunnel information and the second access network tunnel information based on the indication information. For example, the indication information includes at least one of the following a QoS parameter, slice identification information, a DN name, and first core network tunnel information and second core network tunnel information.

Optionally, the receiving module 903 is configured to receive an uplink forwarding rule from the SMF network element, where the uplink forwarding rule includes the first core network tunnel information and the second core network tunnel information. The processing module 901 is configured to replicate a received uplink packet of the first service according to the uplink forwarding rule, and the sending module 902 is configured to send uplink packets of the first service to the UPF network element through two paths respectively corresponding to the first core network tunnel information and the second core network tunnel information. Further, optionally, if the first service is at the service flow granularity, the uplink forwarding rule further includes the service flow identifier of the first service and the session identifier, or if the first service is at the session granularity, the uplink forwarding rule further includes the session identifier of the first service.

Optionally, the sending module 902 is further configured to send indication information to UE using an AS message, where the indication information indicates the UE to replicate an uplink packet to obtain a first uplink packet and a second uplink packet, and send the first uplink packet and the second uplink packet over different radio bearers.

In another embodiment, the processing module 901 is configured to control the sending module 902 to initiate establishment of a first radio bearer between a first base station and the UE. In a process of establishing a second radio bearer between a second base station and the UE, the sending module 902 or a sending module in the second base station sends indication information to the UE, where the indication information indicates the UE to associate the first radio bearer and the second radio bearer with a same PDCP entity on the UE. For example, the first base station or the second base station sends the indication information to the UE using a RRC layer message.

In addition, the processing module 901, the sending module 902, and the receiving module 903 in the apparatus may further implement another operation or function of the base station or the master base station (for example, in FIG. 11A, FIG. 11B, FIG. 12A, FIG. 12B, or FIG. 13) in the foregoing method. Details are not described herein again.

In another embodiment, the apparatus may be UE or a chip. The apparatus may be configured to perform an operation of the UE in FIG. 11A, FIG. 11B, FIG. 15A, FIG. 15B, FIG. 17, FIG. 18A, FIG. 18B, FIG. 19A, FIG. 19B, or FIG. 20. For example, the processing module 901 is configured to generate a first uplink packet and a second uplink packet according to an indication obtained from a first base station, where the first uplink packet and the second uplink packet have a same first service flow identifier and a same first sequence number. The sending module 902 is configured to send the first uplink packet to the first base station, and send the second uplink packet to a second base station.

Therefore, for a dual connectivity manner, the UE adds the service flow identifier and the sequence number to the uplink packet according to the indication of the base station. For a packet of a specific service (for example, a URLLC service requiring high reliability), the UE replicates a packet. In this way, reliability of packet transmission of the specific service is improved.

Optionally, the receiving module 903 is configured to receive a first downlink packet and a second downlink packet from the first base station and the second base station respectively, where the first downlink packet and the second downlink packet include a same second service flow identifier and a same second sequence number. The processing module 901 is further configured to deduplicate the first downlink packet and the second downlink packet according to the indication of the base station.

For another example, the sending module 902 and/or the receiving module 903 are/is configured to interact with a first base station, to establish a first radio bearer between the first base station and UE. In a process of establishing a second radio bearer between a second base station and the UE, the receiving module 903 is configured to receive indication information from the first base station or the second base station, where the indication information indicates the UE to associate the first radio bearer and the second radio bearer with a same PDCP entity on the UE. The processing module 901 is configured to generate a first packet and a second packet based on the indication information, where the first packet and the second packet have a same sequence number. The sending module 902 is configured to send the first packet to the first base station over the first radio bearer, and send the second packet to the second base station over the second radio bearer. For example, the generating, by the UE, a first packet and a second packet based on the indication information includes replicating, by the UE, a packet at a PDCP layer based on the indication information, to obtain the first packet and the second packet.

Alternatively, for another example, the receiving module 903 is configured to obtain indication information from a network side device, and the processing module 901 is configured to generate a first uplink packet and a second uplink packet based on the indication information, send the first uplink packet to a first base station over a first radio bearer, and send the second uplink packet to a second base station over a second radio bearer, where the first uplink packet and the second uplink packet have a same sequence number. The first uplink packet corresponds to a first service flow identifier, and the second uplink packet corresponds to a second service flow identifier.

Optionally, the generating, by the UE, a first uplink packet and a second uplink packet based on the indication information includes replicating, by the UE, a packet at a first protocol layer based on the indication information, to obtain the first uplink packet and the second uplink packet. For example, the first protocol layer includes a HRP layer, and the UE obtains the indication information from an SMF network element using a NAS message, or the first protocol layer includes a SDAP layer, and the UE obtains the indication information from the first base station using an AS message.

Optionally, the receiving module 903 is further configured to receive a first downlink packet and a second downlink packet from the first base station and the second base station respectively, where the first downlink packet has a second sequence number and corresponds to the first service flow identifier, and the second downlink packet has the second sequence number and corresponds to the second service flow identifier, and the processing module 901 is further configured to deduplicate the first downlink packet and the second downlink packet based on the indication information.

In another embodiment, the apparatus may be a UPF or a chip. The apparatus may be configured to perform an operation of the UPF in FIG. 18A, FIG. 18B, FIG. 19A, FIG. 19B, FIG. 20, or FIG. 21. For example, the receiving module 903 is configured to receive an uplink forwarding rule from an SMF network element, and receive a first uplink packet and a second uplink packet, where the first uplink packet has a first service flow identifier and a first sequence number, and the second uplink packet has a second service flow identifier and the first sequence number, and the processing module 901 is configured to deduplicate the first uplink packet and the second uplink packet according to the uplink forwarding rule.

Optionally, the uplink forwarding rule indicates a UPF network element to deduplicate the two uplink packets that have the same sequence number and that respectively have the first service flow identifier and the second service flow identifier.

Optionally, the receiving module 903 is further configured to receive a downlink forwarding rule from the SMF network element, the processing module 901 is further configured to generate a first downlink packet and a second downlink packet according to the downlink forwarding rule, and the sending module 902 is configured to send the first downlink packet to a first base station, and send the second downlink packet to a second base station, where the first downlink packet has the first service flow identifier and a second sequence number, the second downlink packet has the second service flow identifier and the second sequence number. For example, to generate the first downlink packet and the second downlink packet according to the downlink forwarding rule, the processing module 901 is configured to replicate a packet at a first protocol layer according to the downlink forwarding rule, to obtain the first downlink packet and the second downlink packet, where the first protocol layer includes a HRP layer or a GTP-U layer.

Figure 10:
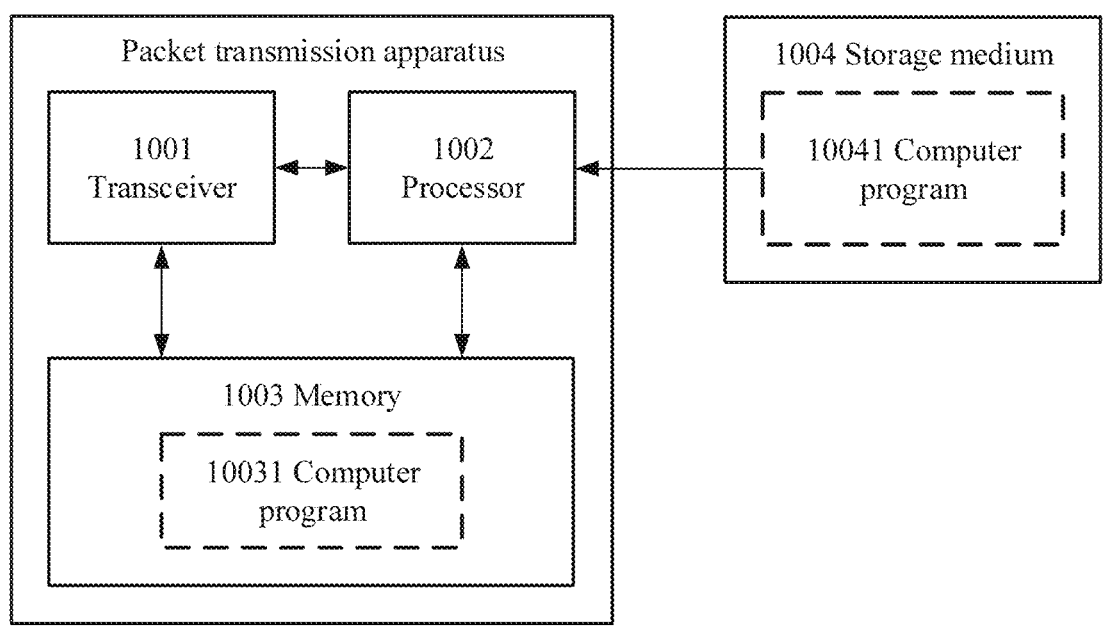
FIG. 10 is another schematic structural diagram of a packet transmission apparatus according to an embodiment of this application.

FIG. 10 is another possible schematic structural diagram of the packet transmission apparatus in the foregoing embodiment. The apparatus includes a transceiver 1001 and a processor 1002, as shown in FIG. 10.

For example, the processor 1002 may be a general-purpose microprocessor, a data processing circuit, an application-specific integrated circuit (ASIC), or a field-programmable gate array (FPGA) circuit. The apparatus may further include a memory 1003. For example, the memory is a random-access memory (RAM). The memory is configured to couple to the processor 1002, and store a computer program 10031 necessary for the apparatus.

In addition, the communication method in the foregoing embodiment further provides a computer-readable storage medium 1004 (for example, a hard disk). The computer-readable storage medium stores a computer program 10041 of the foregoing apparatus, and the computer program 10041 may be loaded into the processor 1002.

When the computer program 10031 or 10041 is run on a computer (for example, the processor 1002), the computer may be enabled to perform the foregoing method.

For example, in an embodiment, the processor 1002 is configured to perform an operation or a function of the SMF network element (for example, an SMF). The transceiver 1004 is configured to implement communication between the apparatus and a UPF network element, a base station (or a master base station), or another CP network element (for example, an AMF).

In another embodiment, the processor 1002 is configured to perform an operation or a function of the base station (or the master base station). The transceiver 1004 is configured to implement communication between the apparatus and a UPF network element and between the apparatus and an SMF network element (for example, an SMF).

In still another embodiment, the processor 1002 is configured to perform an operation or a function of the UE. The transceiver 1004 is configured to implement communication between the apparatus and a base station and between the apparatus and a UPF network element.

In still another embodiment, the processor 1002 is configured to perform an operation or a function of the UPF. The transceiver 1004 is configured to implement communication between the apparatus and a base station and between the apparatus and an SMF network element.

The processor that is of the packet transmission apparatus and that is configured to perform this application may be a central processing unit (CPU), a general-purpose processor, a digital signal processor (DSP), an ASIC, a FPGA or another programmable logical device, a transistor logical device, a hardware component, or any combination thereof. The processor may implement or execute various example logical blocks, modules, and circuits described with reference to content disclosed in this application. The processor may be a combination of one or more processors implementing a computing function, for example, a combination of one or more microprocessors, or a combination of a DSP and a microprocessor.

Method or algorithm steps described in combination with the content disclosed in this application may be implemented by hardware, or may be implemented by the processor by executing a software instruction. The software instruction may be formed by a corresponding software module. The software module may be stored in a RAM memory, a flash memory, a ROM memory, an erasable programmable ROM (EPROM) memory, an electrically erasable programmable ROM (EEPROM) memory, a register, a hard disk, a removable magnetic disk, a compact disc-ROM (CD-ROM), or a storage medium of any other form well-known in the art. For example, a storage medium is coupled to the processor such that the processor can read information from the storage medium and write information into the storage medium. Certainly, the storage medium may alternatively be a component of the processor. The processor and the storage medium may be located in an ASIC. In addition, the ASIC may be located in a communications apparatus. Certainly, the processor and the storage medium may exist in the communications apparatus as discrete components.

All or some of the foregoing embodiments may be implemented by software, hardware, firmware, or any combination thereof. When software is used to implement the embodiments, the embodiments may be implemented completely or partially in a form of a computer program product. The computer program product includes one or more computer instructions. When the computer program instructions are loaded and executed on a computer, the procedures or functions according to the embodiments of the present disclosure are all or partially generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital versatile disc (DVD)), a semiconductor medium (for example, a solid-state drive (SSD)), or the like.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A method comprising:
   receiving, by a session management device, first access network tunnel information and second access network tunnel information from a base station;
   sending, by the session management device, the first access network tunnel information and the second access network tunnel information to a user plane device;
   indicating, by the session management device to the user plane device, to perform downlink packet duplication for a first quality of service (QoS) flow;
   duplicating, by the user plane device in response to the indicating, a first downlink packet of the first QoS flow to obtain a second downlink packet; and
   simultaneously sending, by the user plane device to the base station, the first downlink packet through a first path corresponding to the first access network tunnel information and connecting the user plane device and the base station and the second downlink packet through a second path corresponding to the second access network tunnel information and connecting the user plane device and the base station.

2. The method of claim 1, wherein indicating to perform downlink packet duplication comprises indicating, to perform downlink packet duplication based on a forwarding rule.

3. The method of claim 2, wherein the forwarding rule comprises the first access network tunnel information and the second access network tunnel information.

4. The method of claim 3, wherein the first path and the second path are usable for packet transmission for at least one QoS flow in a session.

5. The method of claim 4, wherein the forwarding rule further comprises a service flow identifier of the first QoS flow and a session identifier associated with the session.

6. The method of claim 1, wherein the first downlink packet and the second downlink packet have a same sequence number and a same service flow identifier.

7. The method of claim 1, wherein duplicating the first downlink packet comprises duplicating, by the user plane device, the first downlink packet of the first QoS flow in a General Packet Radio Service Tunneling Protocol-user plane (GTP-U) layer to obtain the second downlink packet.

8. The method of claim 1, further comprising:
   receiving, by the session management device, first core network tunnel information from the user plane device;
   receiving, by the session management device, second core network tunnel information from the user plane device;
   sending, by the session management device, the first core network tunnel information to the base station;
   sending, by the session management device, the second core network tunnel information to the base station; and
   indicating, by the session management device, the base station to perform uplink packet duplication for the first QoS flow.

9. The method of claim 8, wherein the first core network tunnel information and the second core network tunnel information trigger the base station to allocate the first access network tunnel information and the second access network tunnel information.

10. The method of claim 8, further comprising:
    duplicating, by the base station in response to indicating, by the session management device, the base station to perform uplink packet duplication for the first QoS flow, a first uplink packet of the first QoS flow to obtain a second uplink packet; and
    simultaneously sending, by the base station to the user plane device, the first uplink packet through the first path corresponding to the first core network tunnel information and the second uplink packet through the second path corresponding to the second core network tunnel information.

11. The method of claim 10, wherein the first uplink packet and the second uplink packet have a same sequence number and a same service flow identifier.

12. The method of claim 10, further comprising:
    indicating, by the session management device to the user plane device, to perform uplink packet elimination for the first QoS flow;
    simultaneously receiving, by the user plane device, the first uplink packet through the first path and the second uplink packet through the second path; and
    eliminating, by the user plane device in response to the indicating, the first uplink packet and the second uplink packet.

13. The method of claim 12, wherein eliminating the first uplink packet and the second uplink packet comprises eliminating the first uplink packet and the second uplink packet based on a same sequence number.

14. The method of claim 12, wherein indicating the user plane device to perform uplink packet elimination comprises indicating to the user plane device to perform uplink packet elimination based on a forwarding rule.

15. A system comprising:

a session management device configured to:

receive first access network tunnel information and second access network tunnel information from a base station;

send the first access network tunnel information and the second access network tunnel information to a user plane device; and indicate the user plane device to perform downlink packet duplication for a first quality of service (QoS) flow; and the user plane device configured to:

duplicate, in response to the indicating, a first downlink packet of the first QoS flow to obtain a second downlink packet;

simultaneously send, to the base station, the first downlink packet through a first path corresponding to the first access network tunnel information and connecting the user plane device and the base station and the second downlink packet through a second path corresponding to the second access network tunnel information and connecting the user plane device and the base station.

16. The system of claim 15, wherein the session management device is further configured to indicate the user plane device to perform downlink packet duplication based on a forwarding rule.

17. The system of claim 16, wherein the forwarding rule comprises the first access network tunnel information and the second access network tunnel information.

18. The system of claim 17, wherein the first path and the second path are usable for packet transmission for at least one QoS flow in a session.

19. The system of claim 18, wherein the forwarding rule further comprises a service flow identifier of the first QoS flow and a session identifier associated with the session.

20. The system of claim 15, wherein the first downlink packet and the second downlink packet have a same sequence number and a same service flow identifier.

21. The system of claim 15, wherein the user plane device is further configured to duplicate the first downlink packet of the first QoS flow in a General Packet Radio System Tunneling Protocol-user plane (GTP-U) layer to obtain the second downlink packet.

22. The system of claim 15, wherein the session management device is further configured to:

receive first core network tunnel information from the user plane device;

receive second core network tunnel information from the user plane device;

send the first core network tunnel information to the base station;

send the second core network tunnel information to the base station; and indicate the base station to perform uplink packet duplication for the first QoS flow.

23. The system of claim 22, wherein the first core network tunnel information and the second core network tunnel information are configured to trigger the base station to allocate the first access network tunnel information and the second access network tunnel information.

24. The system of claim 22, further comprising the base station, wherein the base station is configured to:

duplicate a first uplink packet of the first QoS flow to obtain a second uplink packet in response to indicating the base station to perform uplink packet duplication for the first QoS flow; and simultaneously send, to the user plane device, the first uplink packet through the first path corresponding to the first core network tunnel information and the second uplink packet through the second path corresponding to the second core network tunnel information.

25. The system of claim 24, wherein the first uplink packet and the second uplink packet have a same sequence number and a same service flow identifier.

26. The system of claim 24, wherein the session management device is further configured to indicate the user plane device to perform uplink packets elimination for the first QoS flow, and wherein the user plane device is further configured to:

simultaneously receive the first uplink packet through the first path and the second uplink packet through the second path; and eliminate the first uplink packet and the second uplink packet in response to the indicating.

27. The system of claim 26, wherein the user plane device is further configured to eliminate the first uplink packet and the second uplink packet based on a same sequence number.

28. The system of claim 26, wherein the session management device is further configured to indicate the user plane device to perform uplink packet elimination for the first QoS flow based on a forwarding rule.

* * * * *